(12) United States Patent
Okada et al.

(10) Patent No.: US 12,354,326 B2
(45) Date of Patent: Jul. 8, 2025

(54) IMAGE RECOGNITION APPARATUS, IMAGE RECOGNITION METHOD, AND A LEARNING DATA SET GENERATION APPARATUS

(71) Applicant: DENSO TEN Limited, Kobe (JP)

(72) Inventors: Yasutaka Okada, Kobe (JP); Ryusuke Seki, Kobe (JP); Yuki Katayama, Kobe (JP)

(73) Assignee: DENSO TEN Limited, Kobe (JP)

( * ) Notice: Subject to any disclaimer, the term of this patent is extended or adjusted under 35 U.S.C. 154(b) by 358 days.

(21) Appl. No.: 17/893,792

(22) Filed: Aug. 23, 2022

(65) Prior Publication Data

US 2023/0245422 A1 Aug. 3, 2023

(30) Foreign Application Priority Data

Feb. 3, 2022 (JP) .................................. 2022-015322
Feb. 3, 2022 (JP) .................................. 2022-015323
Feb. 3, 2022 (JP) .................................. 2022-015325

(51) Int. Cl.
*G06V 10/764* (2022.01)
*G06V 10/22* (2022.01)
*G06V 10/774* (2022.01)
*G06V 10/82* (2022.01)

(52) U.S. Cl.
CPC ............ *G06V 10/764* (2022.01); *G06V 10/22* (2022.01); *G06V 10/774* (2022.01); *G06V 10/82* (2022.01)

(58) Field of Classification Search
None
See application file for complete search history.

(56) References Cited

U.S. PATENT DOCUMENTS

2022/0300739 A1* 9/2022 Xie ........................... G06T 5/00
2023/0196787 A1* 6/2023 Agrawal ................ G06V 20/58
382/103

FOREIGN PATENT DOCUMENTS

JP 2019-061505 A 4/2019

OTHER PUBLICATIONS

Walambe R, Marathe A, Kotecha K, Ghinea G. Lightweight Object Detection Ensemble Framework for Autonomous Vehicles in Challenging Weather Conditions. Comput Intell Neurosci. Oct. 7, 2021;2021:5278820. doi: 10.1155/2021/5278820 (Year: 2021).*
Alqaysi H, Fedorov I, Qureshi FZ, O'Nils M. A Temporal Boosted YOLO-Based Model for Birds Detection around Wind Farms. Journal of Imaging. 2021; 7(11):227 (Year: 2021).*

(Continued)

*Primary Examiner* — Anand P Bhatnagar
(74) *Attorney, Agent, or Firm* — Oliff PLC

(57) ABSTRACT

In an image recognition apparatus, a processor performs, based on an input image and using an image recognition model, a plurality of object detection processes to detect as an object detection region a region in the input image where a recognition target object is judged to be present. In the plurality of object detection processes, a plurality of mutually different image recognition models are used. The processor generates inference result data according to the degree of overlap among a plurality of object detection regions detected in the plurality of object detection processes.

12 Claims, 36 Drawing Sheets

(56) References Cited

OTHER PUBLICATIONS

Lyu, Z., Gutierrez, N., Rajguru, A., Beksi, W.J. (2020). Probabilistic Object Detection via Deep Ensembles. In: Bartoli, A., Fusiello, A. (eds) Computer Vision—ECCV 2020 Workshops. ECCV 2020. Lecture Notes in Computer Science, vol. 12540. Springer, Cham. (Year: 2020).*

T. Huang, J. A. Noble, and A. I. L. Namburete, 'Omni-Supervised Learning: Scaling Up to Large Unlabelled Medical Datasets', in Proceedings of the International Conference on Medical Image Computing and Computer-Assisted Intervention, MICCAI'17, pp. 572-580, (2018) (Year: 2018).*

S. Schmidt, Q. Rao, J. Tatsch and A. Knoll, "Advanced Active Learning Strategies for Object Detection," 2020 IEEE Intelligent Vehicles Symposium (IV), Las Vegas, NV, USA, 2020, pp. 871-876, doi: 10.1109/IV47402.2020.9304565 (Year: 2020).*

J. Lee, S.-K. Lee and S.-I. Yang, "An Ensemble Method of CNN Models for Object Detection," 2018 International Conference on Information and Communication Technology Convergence (ICTC), Jeju, Korea (South), 2018, pp. 898-901, doi: 10.1109/ICTC.2018.8539396 (Year: 2018).*

H. Wang, Y. Yu, Y. Cai, X. Chen, L. Chen and Y. Li, "Soft-Weighted-Average Ensemble Vehicle Detection Method Based on Single-Stage and Two-Stage Deep Learning Models," in IEEE Transactions on Intelligent Vehicles, vol. 6, No. 1, pp. 100-109, Mar. 2021, doi: 10.1109/TIV.2020.3010832 (Year: 2021).*

Singh, B. and Davis, L.S., 2018. An analysis of scale invariance in object detection snip. In Proceedings of the IEEE conference on computer vision and pattern recognition (pp. 3578-3587) (Year: 2018).*

Zhou, H., Li, Z., Ning, C. and Tang, J., 2017. Cad: Scale invariant framework for real-time object detection. In Proceedings of the IEEE international conference on computer vision workshops (pp. 760-768) (Year: 2017).*

Walambe R, Marathe A, Kotecha K. Multiscale Object Detection from Drone Imagery Using Ensemble Transfer Learning. Drones. 2021; 5(3):66. Doi: 10.3390/drones5030066 (Year: 2021).*

* cited by examiner

EX1_1 (SINGLE-CLASS)

EX2_2 (SINGLE-CLASS)

IMAGE RECOGNITION APPARATUS, IMAGE RECOGNITION METHOD, AND A LEARNING DATA SET GENERATION APPARATUS

This nonprovisional application claims priority under 35 U.S.C. § 119(a) on Patent Application No. 2022-15322 filed in Japan on Feb. 3, 2022, Patent Application No. 2022-15323 filed in Japan on Feb. 3, 2022, and Patent Application No. 2022-15325 filed in Japan on Feb. 3, 2022, the entire contents of which are hereby incorporated by reference.

BACKGROUND OF THE INVENTION

1. Field of the Invention

The present invention relates to an image recognition apparatus, an image recognition method, and a learning data set generation apparatus.

2. Description of Related Art

Image recognition technologies for recognizing a recognition target object within an input image are in practical use (see, for example, Patent Document 1 identified below). In image recognition technologies, based on an input image, an inference is made using an image recognition model to recognize a recognition target object. One among image recognition technologies is object detection using an image recognition model. Object detection allows detection of a region where a recognition target object is present in an input image.

Patent Document 1: JP-A-2019-61505

Object detection using an image recognition model does not always yield a correct result: an inference result based on object detection may contain an error. There is demand for development of a technology that yields satisfactory inference results. Or a scheme that suggests an error if an inference result is likely to contain an error would be useful. On the other hand, different recognition target objects in an input image can have varying image sizes. For example, in a configuration where a shot image of a recognition target object obtained using a camera is used as an input image, the image size of the recognition target object in the input image varies greatly with the distance from the camera to the recognition target object. It is not easy to construct a single image recognition model that allows correct detection of recognition target objects with any image sizes. There is demand for development of a technology that allows recognition (detection) of recognition target objects with any image sizes with satisfactory accuracy.

SUMMARY OF THE INVENTION

An object of the present invention is to provide an image recognition apparatus and an image recognition method that contribute to derivation of satisfactory inference results, and to provide a learning data set generation apparatus that employs such an image recognition apparatus and an image recognition method.

Another object of the present invention is to provide an image recognition apparatus and an image recognition method that can suggest a likelihood of an error in connection with object detection, and to provide a learning data set generation apparatus that employs such an image recognition apparatus and an image recognition method.

Yet another object of the present invention is to provide an image recognition apparatus and an image recognition method that can recognize (detect) recognition target objects with varying image sizes with satisfactory accuracy, and to provide a learning data set generation apparatus that employs such an image recognition apparatus and an image recognition method.

According to one aspect of the present invention, in an image recognition apparatus that includes a processor configured to make an inference to recognize a recognition target object in an input image, the processor is configured to: perform, based on the input image and using mutually different image recognition models, a plurality of object detection processes to detect as an object detection region a region in the input image where the recognition target object is judged to be present; and generate inference result data indicating the result of the inference in accordance with the degree of overlap among a plurality of object detection regions detected in the plurality of object detection processes.

According to another aspect of the present invention, in an image recognition apparatus that includes a processor configured to make an inference to recognize a recognition target object in an input image, the processor is configured to: perform, based on the input image and using a plurality of mutually different image recognition models, a plurality of object detection processes to detect as an object detection region a region in the input image where the recognition target object is judged to be present; generate inference result data indicating the result of the inference based on the results of the plurality of object detection processes; and be capable of attaching attention information to the result of each object detection process in accordance with the degree of overlap among a plurality of object detection regions detected in the plurality of object detection processes.

According to yet another aspect of the present invention, in an image recognition apparatus that includes a processor configured to make an inference to recognize a recognition target object in an input image, the processor is configured to: perform, based on the input image and using a plurality of image recognition models, a plurality of object detection processes to detect as an object detection region a region in the input image where the recognition target object is judged to be present; generate inference result data indicating the result of the inference based on the results of the plurality of object detection processes. Each of the image recognition models is a model capable of detecting the recognition target object with a particular image size, and the plurality of image recognition models are directed to mutually different particular image sizes.

According to one aspect of the present invention, it is possible to provide an image recognition apparatus and an image recognition method that contribute to derivation of satisfactory inference results, and to provide a learning data set generation apparatus that employs such an image recognition apparatus and an image recognition method.

According to another aspect of the present invention, it is possible to provide an image recognition apparatus and an image recognition method that can suggest likelihood of an error in connection with object detection, and to provide a learning data set generation apparatus that employs such an image recognition apparatus and an image recognition method.

According to yet another aspect of the present invention, it is possible to provide an image recognition apparatus and an image recognition method that can recognize (detect) recognition target objects with varying image sizes with satisfactory accuracy, and to provide a learning data set generation apparatus that employs such an image recognition apparatus and an image recognition method.

DETAILED DESCRIPTION OF PREFERRED EMBODIMENTS

Examples of implementation of the present invention will be described specifically below with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, components, and the like are occasionally used with omission or abbreviation of the names of the information, signals, physical quantities, components, and the like corresponding to those symbols and reference signs. In the present description, the terms "information" and "data" are synonymous with each other and are used interchangeably.

Basic Embodiment

Figure 1:
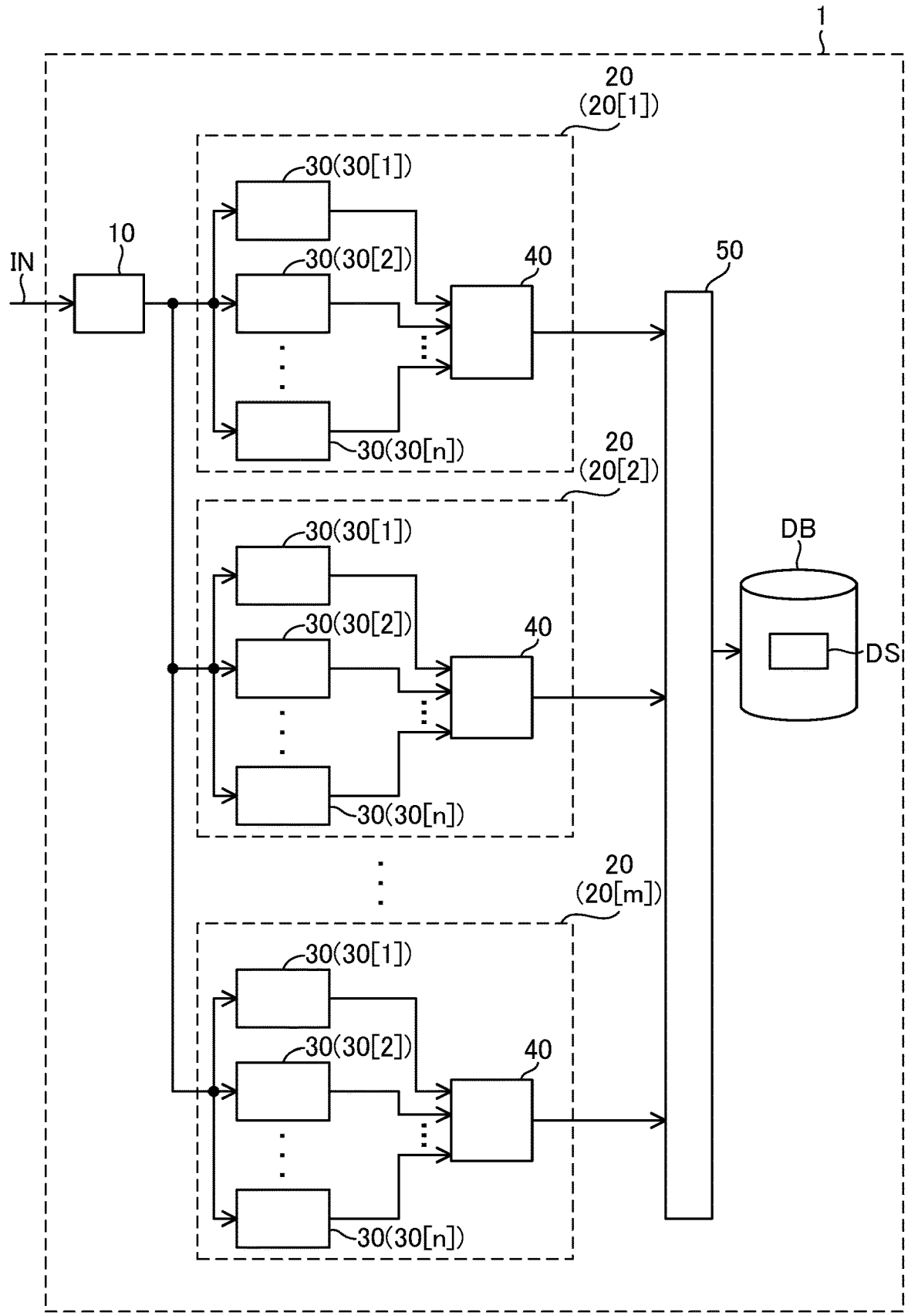
FIG. 1 is a functional block diagram of a data processing apparatus according to a basic embodiment of the present invention.

A basic embodiment of the present invention will be described. FIG. 1 is a functional block diagram of a data processing apparatus 1 according to the basic embodiment. The data processing apparatus 1 functions as a learning data set generation apparatus that generates a learning data set DS needed to perform supervised machine learning. The functional blocks referred to by the reference signs "10", "20", "30", "40", and "50" are functional blocks provided in the data processing apparatus 1. That is, the data processing apparatus 1 includes an image acquirer 10, one or more inference blocks 20, and a data storer 50. Each inference block 20 includes two or more object detectors 30 and an integrator 40. The data processing apparatus 1 further includes a database DB. The database DB may be provided outside the data processing apparatus 1. Through the operation of the image acquirer 10, the inference blocks 20, and the data storer 50, a learning data set DS is generated and is stored in the database DB.

The data processing apparatus 1 is fed with an input image IN. The image acquirer 10 is fed with, and thereby acquires, the input image IN. More precisely, feeding or acquiring an input image IN denotes feeding or acquiring data representing the input image IN (hereinafter referred to as the image data of the input image IN). The image acquirer 10 feeds the input image IN to each inference block 20.

Figure 2:
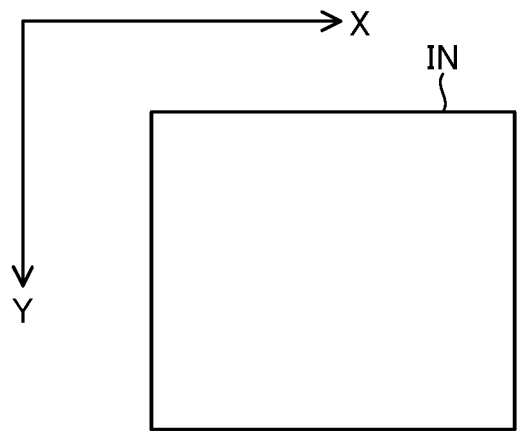
FIG. 2 is a diagram showing a relationship of an input image with XY coordinate plane according to the basic embodiment of the present invention.

Referring to FIG. 2, the input image IN is a two-dimensional still image. Here, imagine a two-dimensional plane on which the input image IN is defined, and let two axes parallel to the two-dimensional plane be X-axis and Y-axis. X- and Y-axis are orthogonal to each other. X-axis is parallel to the horizontal direction of the input image IN, and Y-axis is parallel to the vertical direction of the input image IN. In the following description, the two-dimensional plane parallel to the X- and Y-axis will be referred to as XY coordinate plane. The input image IN is composed of a plurality of pixels arrayed in a matrix (along both X- and Y-axis) on the XY coordinate plane.

The data processing apparatus 1 includes a total of m inference blocks 20. Here, m is any integer of 2 or more but may be 1. The total of m inference blocks 20 comprise a first to an mth inference block 20. Wherever distinction is needed among the first to mth inference blocks 20, the jth inference block 20 will be referred to specifically as the inference block 20[$j$]. Here, j is a natural number of m or less. In the following description, it is generally assumed that m≥2.

Each inference block 20 includes a total of n object detectors 30 and one integrator 40. Here, n is any integer of 2 or more. In each inference block 20, the total of n object detectors 30 comprise a first to an nth object detector 30. Wherever distinction is needed among the first to nth object detectors 30, the ith object detector 30 will be referred to specifically as the object detector 30[$i$]. Here, i is a natural number of n or less. Between any two different inference blocks 20, the number of n may or may not be equal. Specifically, for example, the number of object detectors 30 provided in the inference block 20[1] and the number of object detectors 30 provided the inference block 20[2] may both be two; for another example, the number of object detectors 30 provided in the inference block 20[1] and the number of object detectors 30 provided the inference block 20[2] may be two and three respectively.

In each inference block 20, using the object detectors 30, an object of a particular kind that is present in the input image IN can be recognized (in other words, detected). An object that can be a target of recognition in each inference block 20 will be referred to a recognition target object.

Each object detector 30 is fed with the input image IN (i.e., fed with the image data of the input image IN) from the image acquirer 10. Based on the input image IN, each object detector 30 performs an object detection process. An object detection process may be referred to simply as object detection. An object detection process based on the input image IN is, more precisely, an object detection process based on the image data of the input image IN. In each object detector 30, through an object detection process, a recognition target object in the input image IN is detected. That is, in each object detector 30, through an object detection process, a region in the input image IN where a recognition target object is judged to be present is set as an object detection region. In the present description, setting an object detection region and detecting an object detection region are synonymous with each other and are used interchangeably.

Each object detector 30 has an image recognition model constructed to enable an object detection process, and the object detection process is performed using the image recognition model. An image recognition model itself may be understood to constitute an object detector 30. An image recognition model is, for example, a learned model obtained through machine learning for object detection (i.e., a learned model based on artificial intelligence).

Figure 3:
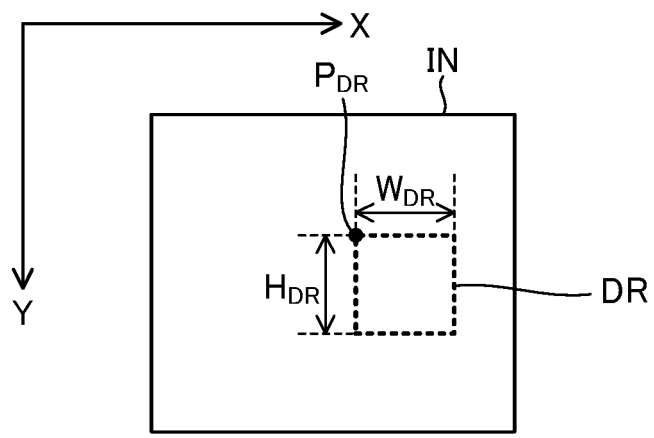
FIG. 3 is a diagram illustrating data (position/shape data) identifying the position and shape of an object detection region set in an input image according to the basic embodiment of the present invention.
Figure 4:
FIG. 4 is a diagram showing input and output information with respect to an object detector according to the basic embodiment of the present invention.

Referring to FIGS. 3 and 4, a description will be given of information that is derived through an object detection process. In FIG. 3, the rectangular region indicated by broken lines and identified by the symbol "DR" is an object detection region. An object detection region is generally called a "bounding box". For the sake of concrete description, here, information that identifies the position and shape of an object detection region will be described with respect to an object detection region identified as the object detection region DR. It should however be noted that any description of the object detection region DR applies equal to any object detection region.

The object detection region DR is part of the entire image region of the input image IN, and the position and shape of the object detection region DR are determined by origin coordinates $P_{DR}$, a width $W_{DR}$, and a height $H_{DR}$. The object detection region DR has a rectangular outline. The four sides of the rectangular are parallel to X- and Y-axis, and of those sides of the rectangular, the dimension of the sides parallel to the X-axis direction is the width $W_{DR}$, and the dimension of the sides parallel to the Y-axis direction is the height $H_{DR}$. Here, the X-axis direction is taken as the width direction, and the Y-axis direction is taken as the height direction. That is, the dimension of the object detection region DR in the X-axis direction is the width $W_{DR}$, and the dimension of the object detection region DR in the Y-axis direction is the height $H_{DR}$. The coordinates (on XY coordinate plane) of, of all the vertices of the rectangular as the outline of the object detection region DR, the vertex located at the negative side along X-axis and at the negative side along Y-axis are the origin coordinates $P_{DR}$. The object detection region DR is a rectangular region that expands, as seen from the origin coordinates $P_{DR}$, toward the positive side along X-axis and toward the positive side along Y-axis.

FIG. 4 shows input and output information with respect to one object detector 30. Any object detector 30 performs an object detection process on the input image IN, and generates and outputs object detection data as information that represents the result of the object detection process. When, through the object detection process, a recognition target object is detected in the input image IN, the object detector 30 derives class data CLS indicating the kind of the detected recognition target object, position/shape data PP with respect to the detected recognition target object, and a reliability SCR representing the probability of the result of the object detection process. That is, the object detection data generated and output when, through the object detection process, a recognition target object is detected in the input image IN includes class data CLS, position/shape data PP, and a reliability SCR. The reliability SCR represents the probability of a detection result concluding an object in the object detection region DR being an object indicated by the class data CLS, and is generally called a "confidence score".

The higher the probability, the greater the reliability SCR. The reliability SCR has a value of zero or more but one or less. The reliability SCR may be understood as the probability of the class data CLS and the object detection region DR that are detected.

A plurality of kinds of recognition target object can be dealt with. For example, in a case where the kinds of recognition target object include a first kind, a second kind, and a third kind, the first, second, and third kinds can be "vehicle", "human", and "traffic light" respectively. What is assumed as a vehicle is typically a vehicle such as an automobile that travels on a road surface, and what is assumed as a human is typically a pedestrian present on a road or the like. A traffic light is one for traffic control. Within one inference block 20, while the recognition target objects of the object detectors 30[1] to 30[n] are the same, the recognition target objects of the plurality of inference blocks 20 are different. This will be discussed in detail later. For one example, in a case where the recognition target object of the object detectors 30[1] to 30[n] in the inference block 20[1] is "vehicle", the recognition target object of the object detectors 30[1] to 30[n] in the inference block 20[2] can be "human".

In the following description, any object detector 30 to which attention is being paid in the course of description will be referred to as the object detector 30 of interest. The class data CLS derived through the object detection process by the object detector 30 of interest indicates the kind of the recognition target object that the object detector 30 of interest has detected in the input image IN. This sort of class data is generally called label data, or simply a label. The position/shape data PP derived through object detection process by the object detector 30 of interest is information that identifies the position and shape of the object detection region DR with respect to the recognition target object that the object detector 30 of interest has detected in the input image IN, and is expressed by origin coordinates $P_{DR}$, a width $W_{DR}$, and a height $H_{DR}$.

Figure 5:
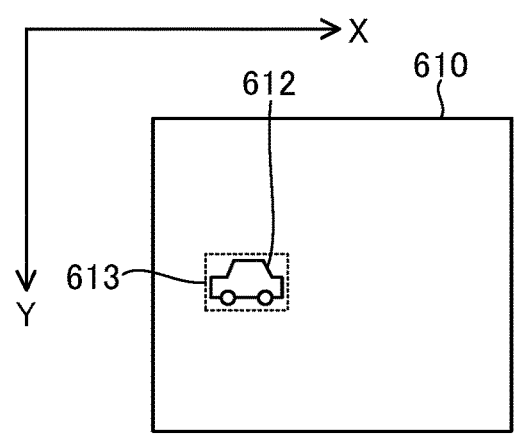
FIG. 5 is a diagram showing an example of an input image according to the basic embodiment of the present invention.

In FIG. 5, an image 610 is one example of the input image IN. The input image 610 includes an image of a vehicle 612. Consider a case where the recognition target objects of the object detector 30 of interest include vehicle and, as a result of the object detector 30 of interest performing an object detection process on the input image 610, an object detection region 613 is set as the object detection region DR. The object detection region 613 is a region in the input image 610 where the image of the vehicle 612 is present. In this case, in association with the input image 610, the object detector 30 of interest generates and outputs object detection data that includes class data CLS indicating that the detected object is a vehicle, position/shape data PP with respect to the object detection region 613, and a reliability SCR with respect to the detection of the object detection region 613.

If no image data of a recognition target object is present in the input image IN, the object detection process by the object detector 30 of interest detects no recognition target object in the input image IN (though erroneous detection may occur). If an image data of a recognition target object is present in the input image IN, the object detection process by the object detector 30 of interest is expected to detect the recognition target object in the input image IN. However, even if an image data of a recognition target object is present in the input image IN, the object detection process by the object detector 30 of interest may detect no recognition target object in the input image IN. When the object detection process by the object detector 30 of interest detects no recognition target object in the input image IN, the object detector 30 of interest sets no object detection region, and the object detector 30 of interest generates and outputs "0" object detection data. "0" object detection data is data that includes none of class data CLS, position/shape data PP, and a reliability SCR, and is data that indicates detection of no recognition target object.

Figure 6:
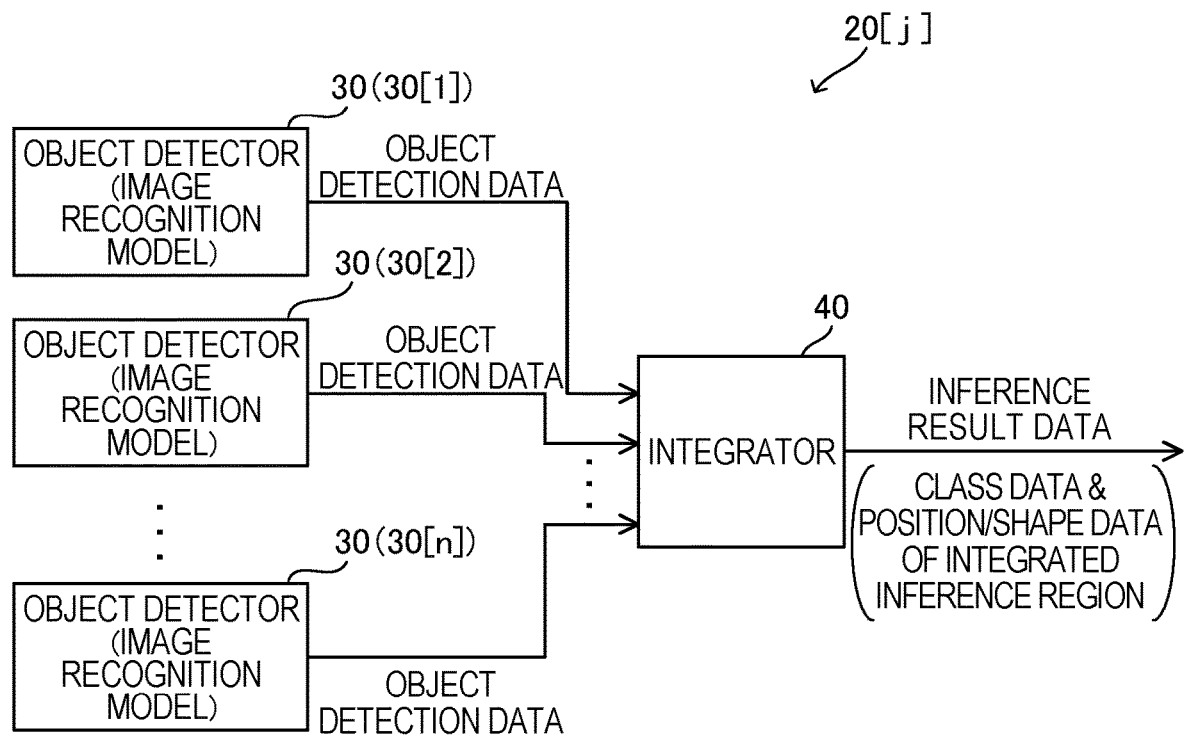
FIG. 6 is a diagram illustrating a relationship of a plurality of object detectors with an integrator according to the basic embodiment of the present invention.

Referring to FIG. 6, the operation of the inference block 20[$j$] will be described. Any description of the inference block 20[$j$] can apply equally to each of the inference blocks 20[1] to 20[$m$]. While each object detector 30 performs an object detection process, the detection result is not always correct. Accordingly, in the inference block 20[$j$], the integrator 40 performs an integration process to integrate together a total of n sets of object detection data output from the object detectors 30[1] to 30[$n$] and generates and outputs the result of the integration process as inference result data. In the integration process, which will be described in detail later, typically, for example, out of the total of n sets of object detection data output from the object detectors 30[1] to 30[$n$], the set of object detection data that corresponds to the maximum reliability SCR can be chosen as inference result data.

Each inference block 20 performs an inference process on the input image IN. In the inference process on the input image IN, an inference is made to recognize a recognition target object in the input image IN. The data that represents the result of the inference is the inference result data. Making an inference here denotes feeding the input image IN into a learned model for object detection obtained through machine learning (that is, the image recognition model in each object detector 30) and thereby detecting and inferring a recognition target object in the input image IN.

The inference process performed in one inference block 20[$j$] involves the object detection processes by the object detectors 30[1] to 30[$n$] within the inference block 20[$j$] (i.e., n threads of object detection processes) and the integration process by the integrator 40 within the inference block 20[$j$]. That is, in the data processing apparatus 1, the inference blocks 20[1] to 20[$m$] each perform an inference process. In each inference process, the object detection processes by the object detectors 30[1] to 30[$n$] (i.e., n threads of object detection processes) and the integration process for generating inference result data are performed. The integration process for generating the inference result data is performed based on the results of the object detection processes by the object detectors 30[1] to 30[$n$] (i.e., the object detection data generated in the object detectors 30[1] to 30[$n$] respectively).

In the inference block 20[$j$], the inference result data includes class data that indicates the kind of an object in an integrated inference region and position/shape data that identifies the position and shape of the integrated inference region (see FIG. 6). The integrated inference region is a region within the input image IN. In the inference block 20[$j$], through the inference process, a region where a recognition target object is present is identified, and the identified region corresponds to the integrated inference region. During the inference process, the integrator 40 sets the integrated inference region.

Figure 7:
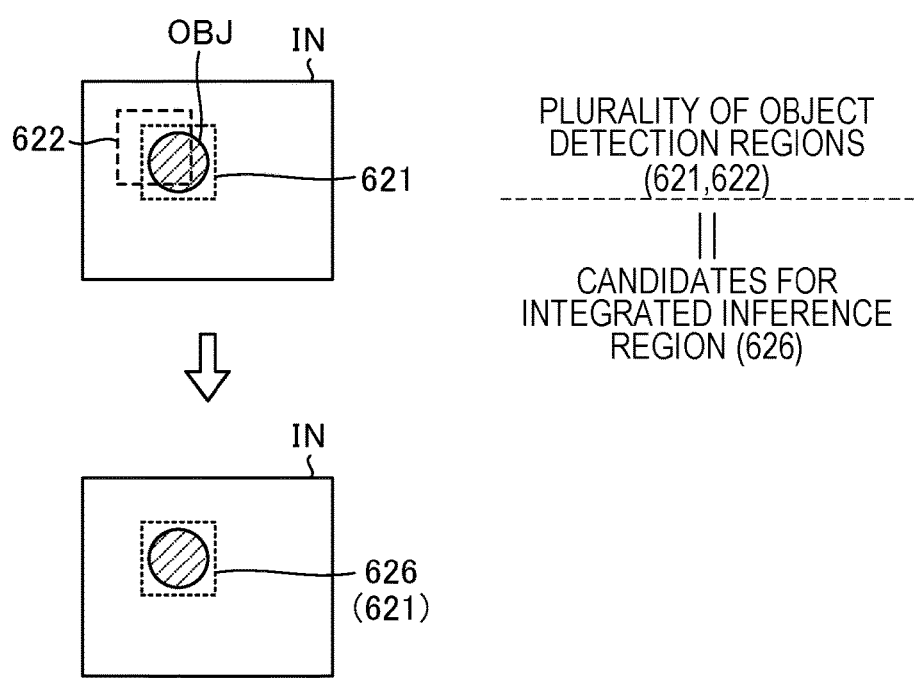
FIG. 7 is a diagram illustrating a relationship of a plurality of object detection regions with an integrated inference region based on them according to the basic embodiment of the present invention.

Referring to FIG. 7, a description will be given of the relationship of object detection regions set by an object detector 30 with an integrated inference region set by the integrator 40. In the inference block 20[$j$], for any object OBJ in one input image IN, the object detectors 30[1] to 30[$n$] set up to a total of n object detection regions. Here, the object OBJ is assumed to be the recognition target object in the inference block 20[$j$]. In the example of FIG. 7, two regions 621 and 622 are set as object detection regions for the object OBJ. The set object detection regions each serve as a candidate for the integrated inference region, and the integrator 40 can choose either of the candidates as the integrated inference region. In the example in FIG. 7, the object detection region 621 is chosen as the integrated inference region 626.

When in the inference block 20[$j$] the object detection region 621 is chosen as the integrated inference region 626, then the inference result data is generated based on the object detection data from the object detector 30 that has set the object detection region 621. Specifically, for example, when in the inference block 20[$j$] the object detector 30[1] sets the object detection region 621, the class data CLS and the position/shape data PP (see FIG. 4) in the object detection data from the object detector 30[1] are taken as the class data and the position/shape data in the inference result data from the integrator 40. Here, the reliability SCR in the object detection data from the object detector 30[1] may also be included in the inference result data.

The data storer 50 is fed with the inference result data from the inference blocks 20[1] to 20[$m$] (see FIG. 1). The inference result data from the inference blocks 20[1] to 20[$m$] are, more precisely, the inference result data from the integrators 40 in the inference blocks 20[1] to 20[$m$]. Based on the inference result data from the inference blocks 20[1] to 20[$m$], the data storer 50 generates a learning data set DS, and stores the learning data set DS in the database DB.

A large number of input images IN (e.g., 100,000 input images IN) are prepared, and accumulating inference result data based on one input image IN after another in association with those input images IN in the database DB produces the learning data set DS.

Figure 8:
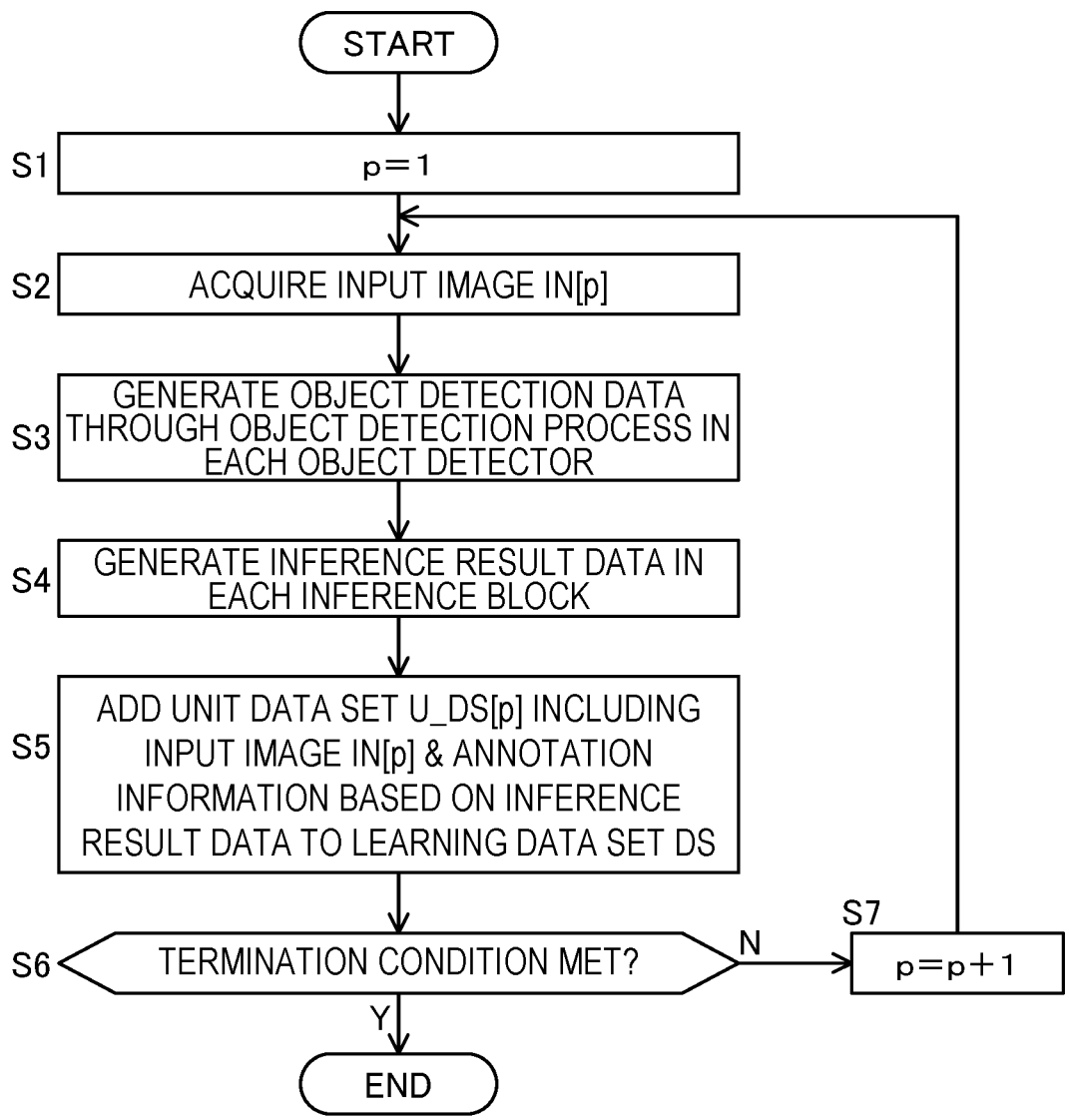
FIG. 8 is an operation flow chart of a data processing apparatus according to the basic embodiment of the present invention.

FIG. 8 is an operation flow chart of the data processing apparatus 1. First, at step S1, a variable "p" managed by the data processing apparatus 1 (an arithmetic processor 2, described later; see FIG. 10) is substituted with "1". Subsequently, the operations at steps S2, S3, S4, and S5 are performed in this order. At step S2, the image acquirer 10 acquires an input image IN. The pth input image IN acquired by the image acquirer 10 will be referred to as the input image IN[p]. At step S3, each object detector 30 in the data processing apparatus 1 performs an object detection process on the input image IN[p] to generate object detection data. At step S4, in each inference block 20, the integrator 40 performs the integration process. Thus, in each inference block 20, a total of n sets of object detection data output from the object detectors 30[1] to 30[$n$] are integrated together to generate inference result data.

At step S5, based on the input image IN[p] and all the inference result data, the data storer 50 generates a unit data set. The unit data set based on the input image IN[p] will be referred to as the unit data set UDS[p]. At step S5, the data storer 50 stores the unit data set UDS[p] in the database DB and thereby adds the unit data set U_DS[p] to the learning data set DS as part of the learning data set DS. Adding any unit data set to the learning data set DS results in the learning data set DS being updated in the form of an increase in the quantity of information it contains.

The unit data set U_DS[p] is a data set that includes image data of the input image IN[p] and annotation information on the input image IN[p]. Annotation information on the input image IN[p] is information that reflects all the inference result data generated based on the input image IN[p]. Annotation information on the input image IN[p] includes, for each recognition target object present in the input image IN[p], class annotation information that indicates the kind of that recognition target object and region annotation information that identifies the position and shape of the region in the input image IN[p] where the recognition target object is present. The class data in the inference result data is used as the class annotation information, and the position/shape data in the inference result data is used as the region annotation information.

Figure 9:
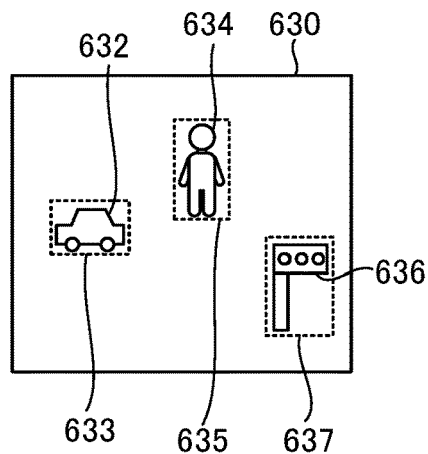
FIG. 9 is a diagram showing an example of an input image according to the basic embodiment of the present invention.

FIG. 9 shows, as an example of the input image IN[p], an input image 630. The input image 630 includes an image of a vehicle 632, an image of a human 634, and an image of a traffic light 636. It is assumed that the recognition target objects of one or more object detectors 30 include vehicle, human, and traffic light. In this case, the annotation information on the input image 630 includes annotation information on a first object, annotation information on a second object, and annotation information on a third object. With respect to the input image 630, the first, second, and third objects are the vehicle 632, human 634, and traffic light 636 respectively.

With respect to the input image 630, the annotation information on the first object includes class annotation information that indicates that the kind of the first object is vehicle and region annotation information that identifies the position and shape of the region 633 in the input image 630 where the first object (i.e., vehicle 632) is present. The region 633 is the integrated inference region for the first object (i.e., vehicle 632) that is set by one of the inference blocks 20. With respect to the input image 630, the annotation information on the second object includes class annotation information that indicates that the kind of the second object is human and region annotation information that identifies the position and shape of the region 635 in the input image 630 where the second object (i.e., human 634) is present. The region 635 is the integrated inference region for the second object (i.e., human 634) that is set by one of the inference blocks 20. With respect to the input image 630, the annotation information on the third object includes class annotation information that indicates that the kind of the third object is traffic light and region annotation information that identifies the position and shape of the region 637 in the input image 630 where the third object (i.e., traffic light 636) is present. The region 637 is the integrated inference region for the third object (i.e., traffic light 636) that is set by one of the inference blocks 20.

Subsequently to step S5, at step S6, the data processing apparatus 1 (arithmetic processor 2, described later) checks whether a predetermined termination condition is met. For example, when the variable p reaches a predetermined value (e.g., 100000), the termination condition is met. For another example, when a predetermined termination instruction signal is fed to the data processing apparatus 1 via an interface 4 (see FIG. 9), described later, the termination condition is met. If the termination condition is met (step S6, "Y"), the procedure in FIG. 8 ends. If the termination condition is not met (step S6, "N"), then at step S7 the variable p is incremented by one, and then a return is made to step S2; thereafter the operations at step S2 and the following steps are repeated.

For example, in a case where fulfilling p=100000 fulfills the termination condition, the procedure in FIG. 8 ends with unit data sets U_DS[1] to U_DS[100000] corresponding to the input images IN[1] to IN[100000] contained in the learning data set DS.

The learning data set DS obtained through the procedure in FIG. 8 is a data set for constructing an inference model for object detection through machine learning. The inference model here is a model different from the image recognition model in each object detector 30. An inference model that enables object detection can be constructed by training a deep neural network through supervised machine learning using the learning data set DS.

Incidentally, in the inference block 20[j], particular data may be set as inference result data and the particular data may be output as the inference result data. Particular data is fixed data that does not depend on the object detection data from the object detectors 30, and is defined previously. In the following description, inference result data that contains particular data (i.e., inference result data set to be particular data) will be referred to as "0" inference result data. "0" inference result data is data that includes no class data or position/shape data on an integrated inference region and that indicates that no recognition target object has been detected in the inference process. "0" inference result data is insignificant data. When with respect to the input image IN[p] the inference block 20[j] outputs "0" inference result data, the "0" inference result data is not included in the unit data set U_DS[p], with the result that the inference result from the inference block 20[j] is not reflected in the learning data set DS.

Figure 10:
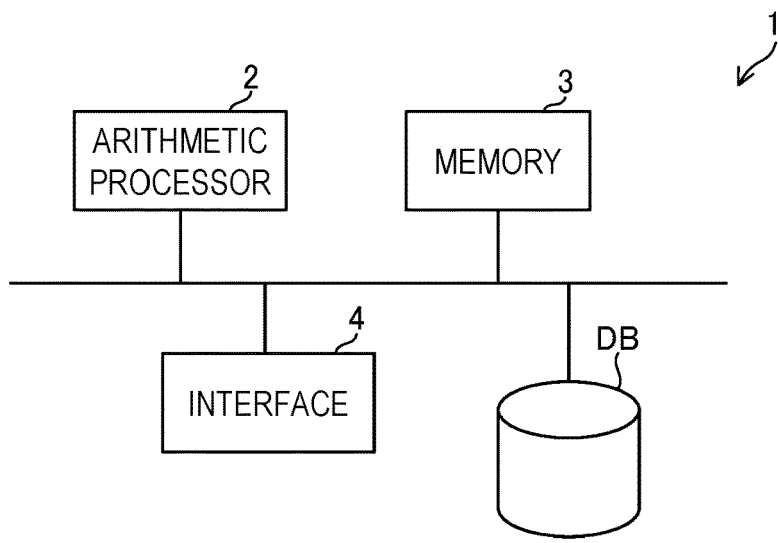
FIG. 10 is a configuration diagram of a data processing apparatus according to the basic embodiment of the present invention.

FIG. 10 is a configuration block diagram of the data processing apparatus 1. The data processing apparatus 1 includes, as hardware resources, an arithmetic processor 2, a memory 3, an interface 4, and a database DB. As mentioned earlier, the database DB may be provided outside the data processing apparatus 1. The data processing apparatus 1 is composed of one or more computers. The data processing apparatus 1 may be implemented using cloud computing.

The arithmetic processor 2 includes an MPU (microprocessor unit), a GPU (graphics processing unit), and the like, and performs desired arithmetic operations. The memory 3 includes a non-volatile storage medium such as a ROM (read-only memory) or a flash memory and a volatile storage medium such as a RAM. The functions of the inference blocks 20 and the data storer 50 described above are functions that are performed by the arithmetic processor 2. In other words, the inference blocks 20 and the data storer 50 are functional blocks that are provided in the arithmetic processor 2. The inference blocks 20 and the data storer 50 may be implemented by the arithmetic processor 2 executing programs stored in the memory 3. Part or the whole of the memory 3 may be provided in the arithmetic processor 2.

The interface 4 includes an interface between an external apparatus (not illustrated) different from the data processing apparatus 1 and the data processing apparatus 1. The data processing apparatus 1 conducts bidirectional communication with the external apparatus via the interface 4. The external apparatus and the data processing apparatus 1 may be connected together across a predetermined communication network, in which case connection with the communication network is established via the interface 4. The communication network here includes any or all of the Internet, a wireless LAN (local area network), and an NFC (near field communication) network. The wireless LAN can be one complying with Wi-Fi (registered trademark). The NFC network can be one complying with Bluetooth (registered trademark). The input images IN mentioned above can be ones that are fed to the data processing apparatus 1 from the external apparatus via the interface 4.

The interface 4 further includes a man-machine interface between the operator of the data processing apparatus 1 and the data processing apparatus 1. The man-machine interface includes a speaker and a display, and also includes an operation unit (a keyboard, a pointing device, and the like) for accepting the user's operation.

The object detectors 30 provided in the data processing apparatus 1 are all either single-class object detectors or multi-class object detectors. This is not meant to exclude a configuration where the object detectors 30 provided in the data processing apparatus 1 comprise a mixture of single-class and multi-class object detectors.

A single-class object detector is an object detector that performs an object detection process with only one kind of object as a recognition target object. That is, the recognition target object of a single-class object detector includes one kind of object, and thus a single-class object detector can recognize and detect only one kind of object. The term "single-class" is applicable also to object detection processes and image recognition models. Specifically, an object detection process by a single-class object detector is a single-class object detection process, and a single-class object detection process is an object detection process that deals with one kind of object as a recognition target object. Likewise, an image recognition model in a single-class object detector is a single-class image recognition model, and with a single-class image recognition model, image recognition (object detection) is performed with one kind of object as a recognition target object.

For example, suppose, in a case where the object detector 30 of interest is a single-class object detector that deals with a vehicle as a recognition target object, the object detector 30 of interest performs an object detection process on the input image 630 in FIG. 9. In this case, the object detector 30 of interest only recognizes and detects the vehicle 632 in the input image 630, and only outputs object detection data on the vehicle 632. For another example, consider a case where the object detector 30 of interest is a single-class object detector that deals with a human as a recognition target object and the object detector 30 of interest performs an object detection process on the input image 630 in FIG. 9. In this case, the object detector 30 of interest only recognizes and detects the human 634 in the input image 630, and only outputs object detection data on the human 634.

A multi-class object detector is an object detector that performs object detection with a plurality of kinds of object as a recognition target object. That is, the recognition target object of a multi-class object detector includes a plurality of kinds of object, and thus a multi-class object detector can recognize and detect a plurality of kinds of object. The term "multi-class" is applicable also to object detection processes and image recognition models. Specifically, an object detection process by a multi-class object detector is a multi-class object detection process, and a multi-class object detection process is an object detection process that deals with a plurality of kinds of object as recognition target objects. Likewise, an image recognition model in a multi-class object detector is a multi-class image recognition model, and with a multi-class image recognition model, image recognition (object detection) is performed with a plurality of kinds of object as recognition target objects.

For example, suppose, in a case where the object detector 30 of interest is a multi-class object detector and the recognition target objects of the object detector 30 of interest includes a vehicle and a human, the object detector 30 of interest performs an object detection process on the input image 630 in FIG. 9. In this case, the object detector 30 of interest recognizes and detects the vehicle 632 an the human 634 in the input image 630, and outputs object detection data on the vehicle 632 and object detection data on the human 634. A similar description applies to a case where the object detector 30 of interest is a multi-class object detector and in addition the recognition target objects of the object detector 30 of interest include three or more kinds of object (e.g., vehicle, human, and traffic light).

[Single-Class Configuration]

For convenience' sake, a configuration where all the object detectors 30 provided in the data processing apparatus 1 are single-class object detectors will be referred to as a single-class configuration. That is, in a single-class configuration, all the object detection processes performed by the object detectors 30 provided in data processing apparatus 1 are single-class object detection processes.

In a single-class configuration, a kind of recognition target object is set for each inference block 20, and any two inference blocks 20 deal with different kinds of recognition target object. In a single-class configuration, all the object detectors 30 included in one inference blocks 20 deal with the same kind of recognition target object (i.e., all the object detection processes performed in one inference block 20 deal with the same kind of recognition target object). For example, in a single-class configuration, if m=3, all the object detectors 30 in the inference block 20[1] deal with a vehicle as a recognition target object, all the object detectors 30 in the inference block 20[2] deal with a human as a recognition target object, and all the object detectors 30 in the inference block 20[3] deal with a traffic light as a recognition target object.

[Multi-Class Configuration]

For convenience' sake, a configuration where all the object detectors 30 provided in data processing apparatus 1 are multi-class object detectors will be referred to as a multi-class configuration. That is, in a multi-class configuration, all the object detection processes performed by the object detectors 30 provided in data processing apparatus 1 are multi-class object detection processes.

In a multi-class configuration, a plurality of kinds of recognition target object are set for each inference block 20. A multi-class configuration may be one where m=1. In a multi-class configuration, all the object detectors 30 included in one inference block 20 deal with the same kind of recognition target object (i.e., all the object detection processes performed in one inference block 20 deal with the same kind of recognition target object). For example, in a multi-class configuration, if the object detector 30[1] in the inference block 20[1] deals with two kinds of recognition target objects, namely vehicle and human, the other object detectors 30 (30[2] to 30[n]) in the inference block 20[1] also deal with the same two kinds of recognition target objects, namely vehicle and human. In a multi-class configuration, if m≥2, any two inference blocks 20 may deal with different recognition target objects.

[Differences Among Image Recognition Models]

In each inference block 20, the image recognition models in the object detectors 30[1] to 30[n] will be referred to as a first to an nth image recognition model respectively. In each inference block 20, the first to nth image recognition models are mutually different image recognition models. Thus, the first to nth image recognition models vary in recognition performance and other characteristics, and thus the results of object detection processes on the same input image IN may vary among the object detectors 30[1] to 30[n].

For example, the first to nth image recognition models employ mutually different algorithms for detection (recognition) of the recognition target object. Specifically, for example, the first image recognition model adopts a one-stage detection algorithm and the second image recognition model adopts a two-stage detection algorithm. In a two-stage detection algorithm, an object detection process involves a first-stage process and a second-stage process, and going through first the first-stage process and then the second-stage process achieves derivation of object detection data. In the first-stage process, one or more candidates for a region in the input image IN where some object is inferred to be present are extracted. Thereafter, in the second-stage process, whether a recognition target object is present in the extracted candidate region is determined to generate object detection data. In a single-stage detection algorithm, the process involving the first- and second-stage processes is performed at a time to generate object detection data. It should be noted that what has just been described to be performed in the first- and second-stage processes is merely an example. A two-stage detection algorithm may be one that corresponds to a two-stage detection algorithm in R-CNN (regions with convolutional neural network).

Each image recognition model is implemented as a neural network. The neural network may be one that is classified as a deep neural network. For example, among the first to nth image recognition models, the neural networks may have mutually different configurations. Specifically, for example, the neural networks constituting the first and second image recognition models respectively may include different numbers of layers and different numbers of nodes. This applies to any combination other than the first and second image recognition models.

The first to nth image recognition models may be image recognition models constructed through machine learning in mutually different environments. For example, the first image recognition model can be a learned model constructed through first machine learning (supervised machine learning) using an existing first learning data set. In this case, the second image recognition model can be a learned model constructed through second machine learning (supervised machine learning) using an existing second learning data set. Here, the first and second learning data sets are different from each other, and are learning data sets that exist from before the creation of the learning data set DS. The same applies to the third to nth image recognition models.

The first and second learning data sets each include a plurality of training images (i.e., image data of a plurality of training images) and annotation information on each of those training images. The annotation information corresponds to training data. Training data denotes correct-answer data referred to in machine learning.

As a specific example, each training image in the existing first learning data set can be an image resulting from shooting a recognition target object during the day, and each training image in the existing second learning data set can be an image resulting from shooting a recognition target object during the night. In this case, the first image recognition model based on the first learning data set is expected to exhibit high recognition performance when the input image IN is an image of a recognition target object shot during the day. On the other hand, the second image recognition model based on the second learning data set is expected to exhibit high recognition performance when the input image IN is an image of a recognition target object shot during the night. In a case where a recognition target object is a vehicle, how the vehicle appears (its image data) during the day greatly differs from how the vehicle appears (its image data) during the night due to differences in ambient lightness, whether headlamps are on, and the like.

[Degree of Overlap (IoU)]

In each inference block 20, when the plurality of object detectors 30 set object detection regions respectively in one input image IN, the integrator 40 can derive the degree of overlap among the plurality of object detection regions set by the plurality of object detectors 30. Specifically, as an index representing the degree of overlap among the plurality of object detection regions, the integrator 40 derives an IoU (intersection over union). It should be noted that the index IoU is derived only when class data agree among the plurality of object detection regions. In the present description, the expression "index IoU of a plurality of object detection regions" and the expression "index IoU among a plurality of object detection regions" are synonymous.

Figure 11:
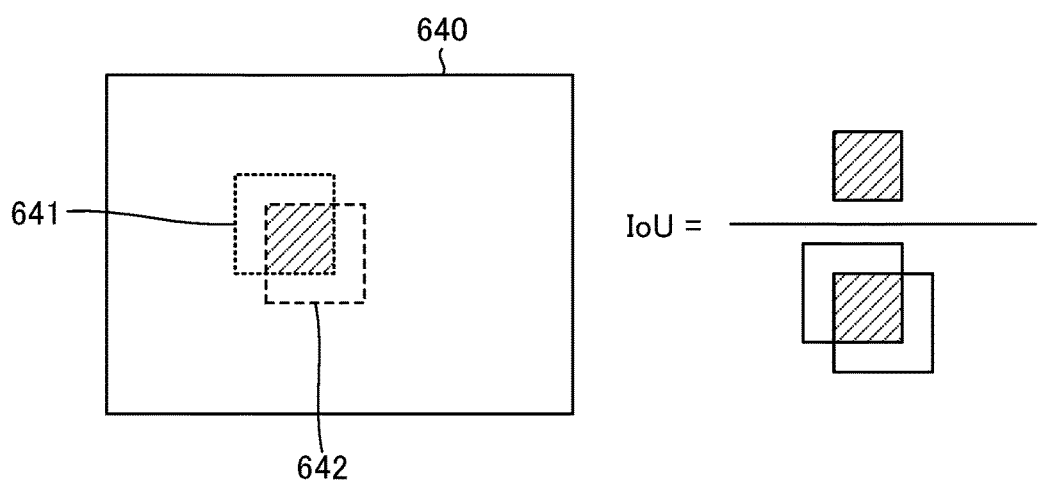
FIG. 11 is a diagram illustrating the IoU between two regions according to the basic embodiment of the present invention.

Referring to FIG. 11, the index IoU will be described. In FIG. 11, the reference sign "640" indicates one input image IN. Consider a case where, in one given inference block 20[j], the object detector 30[1] sets an object detection region 641 in the input image 640 and in addition the object detector 30[2] sets an object detection region 642 in the input image 640. It is assumed that the object detection regions 641 and 642 are object detection regions set with respect to a single object, and that class data agree between the object detection regions 641 and 642.

In this case, the index IoU of the object detection regions 641 and 642 is given by $IoU=S_I[641:642]/S_U[641:642]$. Here, $S_I[641:642]$ represents the area of the intersection between the object detection regions 641 and 642. That is, $S_I[641:642]$ represents the area of the region (corresponding to the hatched region in FIG. 11) in which the object detection regions 641 and 642 overlap each other. $S_U[641:642]$ represents the area of the union of the object detection regions 641 and 642. That is, $S_U[641:642]$ represents the sum of the area of the region (corresponding to the hatched region in FIG. 11) in which the object detection regions 641 and 642 overlap each other, the area of the region lying exclusively in the object detection region 641, and the area of the region lying exclusively in the object detection region 642. The area of any region in an image is represented by the total number of pixels that lie in that region. Also the image size of an object in an image is represented by the area of the region in which the image of the object lies.

An index IoU can be derived similarly for three or more object detection regions. Let any two or more object detectors 30 in any one inference block 20[j] be the first to $n_A$th object detectors 30. And assume that, through object detection processes by the first to $n_A$th object detectors respectively on an input image of interest which is one input image IN, the first to $n_A$th object detectors 30 set a first to $n_A$th object detection region respectively. Here, $n_A$ is any integer of 2 or more but n or less. In the inference block 20[j], only if class data agree among the first to $n_A$th object detection regions, the integrator 40 derives the index IoU of the first to $n_A$th object detection regions as the degree of overlap among the first to $n_A$th object detection regions.

If class data agree among the first to $n_A$th object detection regions, it means that the kind of the object that the first object detector 30 has judged to be present in the first object detection region, the kind of the object that the second object detector 30 has judged to be present in the second object detection region . . . and the kind of the object that the $n_A$th object detector 30 has judged to be present in $n_A$th object detection region all agree. In the following description, the condition where class data agree among the first to $n_A$th object detection regions will sometimes be expressed as agreement of class data on the first to $n_A$th object detection regions, agreement of class data with respect to the first to $n_A$th object detection regions, or any other similar expression.

By contrast, when the kind of the object that the first object detector 30 has judged to be present in the first object detection region, the kind of the object that the second object detector 30 has judged to be present in the second object detection region . . . the kind of the object that the $n_A$th object detector 30 has judged to be present in the $n_A$th object detection region include two or more kinds, this is expressed as class data disagreeing among the first to $n_A$th object detection regions. The condition where class data disagree among the first to $n_A$th object detection regions will sometimes be expressed as disagreement of class data on the first to $n_A$th object detection regions, or disagreement of class data with respect to the first to $n_A$th object detection regions, or any other similar expression.

In a single-class configuration, the kinds of recognition target object of all the object detectors 30 included in one inference block 20[j] are the same. Accordingly, when the plurality of object detectors 30 in the inference block 20[j] set object detection regions respectively, class data always agree among the plurality of object detection regions set by the plurality of object detectors 30. In a multi-class configuration, when the plurality of object detectors 30 in one inference block 20[j] set object detection regions respectively, class data sometimes agree and other times disagree among the plurality of object detection regions set by the plurality of object detectors 30.

The index IoU of the first to $n_A$th object detection regions is given by IoU=$S_I/S_U$. Here, $S_I$ represents the area of the intersection among the first to $n_A$th object detection regions. That is, $S_I$ represents the area of the region where the first to $n_A$th object detection regions all overlap. $S_U$ represents the area of the union of the first to $n_A$th object detection regions. That is, $S_U$ represents the sum of the areas lying in at least one of the first to $n_A$th object detection regions.

[Reference Methods]

Methods of machine learning are known that use a leaning data set containing annotation information. Annotation information corresponds to what is called training data. Training data denotes correct-answer data referred to in machine learning.

What matters with a learning data set is the quantity and quality of the data it contains. In a first reference method, training data with respect to a large number of input images is created by human operation, and based on it a learning data set is created. Inconveniently, the first reference method requires large amounts of human effort and time.

In a second reference method, training data is created using inference results from large-scale, high-performance AI (artificial intelligence) with high detection performance. Inconveniently, even large-scale, high-performance AI is not free from erroneous detection or detection failure, in which case using results from it may end in creating a learning data set containing errors (in other words, training data containing errors).

Incidentally, AI is created through machine learning under the mechanism of catastrophic forgetting. Thus, basically, AI has to be created anew for each detection target. Specifically, for example, if there already exists first AI that deals with vehicles and humans as the target of object detection, with the first AI it is possible to perform image recognition with respect to vehicles and humans and to create training data for object detection with respect to vehicles and humans. In this case, if a need arises for recognition of, in addition to vehicles and humans, traffic lights, under the mechanism of catastrophic forgetting, it is necessary to create second AI anew that deals with vehicles, humans, and traffic lights as the target of object detection (it is impossible to create the second AI based on, by expanding, the first AI).

Hereinafter, as specific embodiments connected with the data processing apparatus 1, a first to a fourth embodiment will be described. The first to fourth embodiments are embodiments based on the basic embodiment described above, and for any features that are not specifically mentioned in connection with the first to fourth embodiments, unless inconsistent, the description of those features given above (i.e., the corresponding features described above) in connection with the basic embodiment applies to the first to fourth embodiments as well. In interpreting the description of the first embodiment, for any features that contradict between the basic embodiment and the first embodiment, their description given in connection with the first embodiment may prevail (the same is true with the second to fourth embodiments described later). Unless inconsistent, any two or more of the first to fourth embodiments may be implemented in combination.

First Embodiment

A first embodiment of the present invention will be described. In the first embodiment, the configuration of the data processing apparatus 1 described above in connection with the basic embodiment can be employed unmodified. In the first embodiment, with respect to a single object, a plurality of image recognition models with different detection algorithms and other characteristics are applied, and the results they yield are integrated together.

The first embodiment includes Practical Examples EX1_1 to EX1_5 described below. Practical Examples EX1_1 to EX1_5 will deal with specific operation and other features in connection with the first embodiment. Unless inconsistent, any features of any one of Practical Examples EX1_1 to EX1_5 can be applied to any other (i.e., any two or more of Practical Examples EX1_1 to EX1_5 may be implemented in combination).

Practical Example EX1_1

Figure 12:
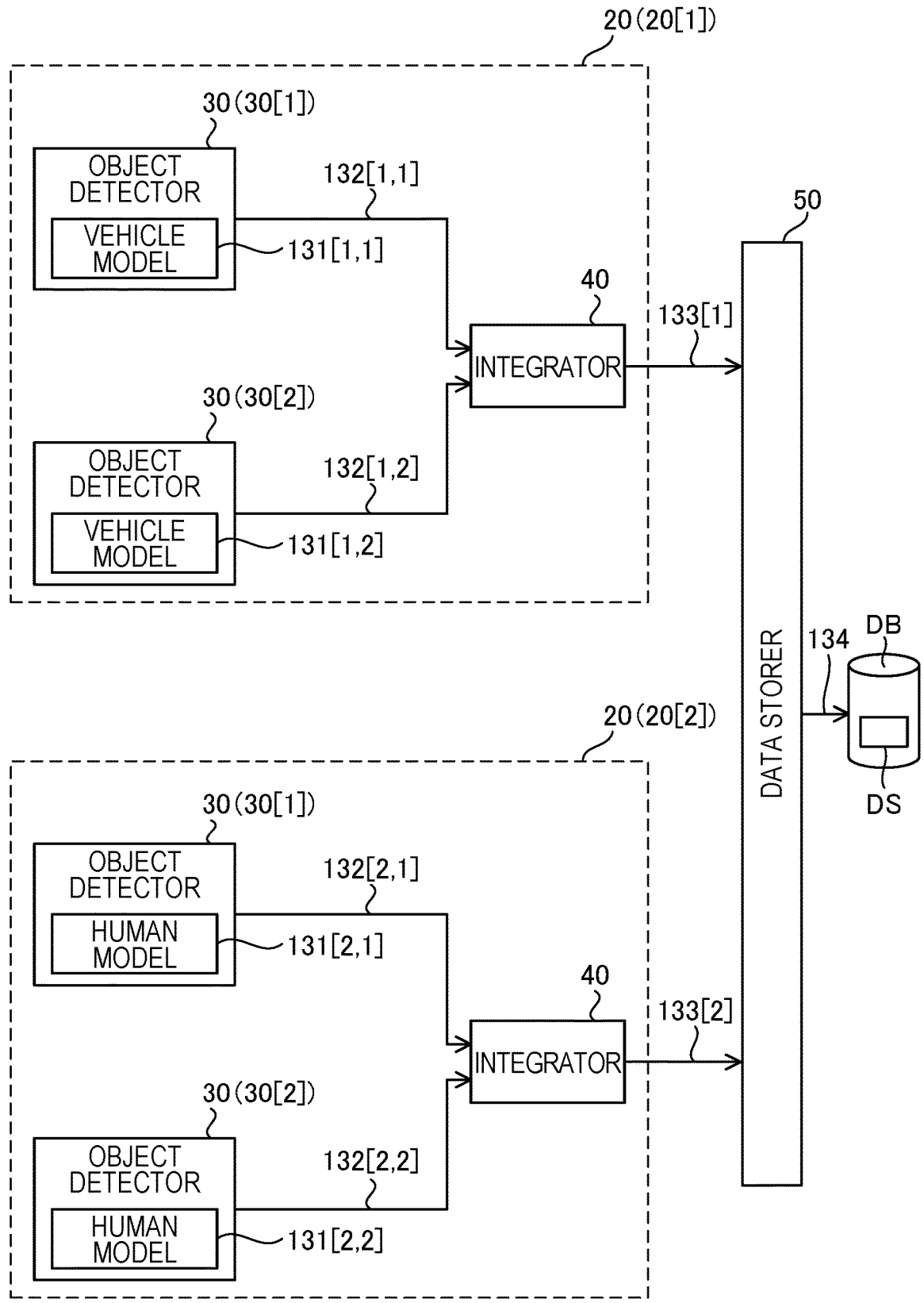
FIG. 12 is a functional block diagram of a principal part of a data processing apparatus according to Practical Example EX1_1 belonging to a first embodiment of the present invention.

Practical Example EX1_1 will be described. Practical Example EX1_1 is a practical example of typical implementation of the technology described above in connection with the first embodiment. FIG. 12 is a functional block diagram of a principal part of a data processing apparatus 1 according to Practical Example EX1_1. In Practical Example EX1_1, it is assumed that m=2, and that, in each inference block 20, n=2 (see FIGS. 1 and 12). In Practical Example EX1_1, a single-class configuration is adopted.

In the inference block 20[1] in Practical Example EX1_1, the image recognition model in the object detector 30[1] is a vehicle model 131[1, 1] and the image recognition model in the object detector 30[2] is a vehicle model 131[1, 2]. In the inference block 20[2] in Practical Example EX1_1, the image recognition model in the object detector 30[1] is a human model 131[2, 1] and the image recognition model in the object detector 30[2] is a human model 131[2, 2].

A vehicle model (here, 131[1, 1] and 131[1, 2]) denotes a single-class image recognition model that deals only with a vehicle as a recognition target object. Accordingly, in the inference block 20[1] according to Practical Example EX1_1, the object detectors 30[1] and 30[2] are single-class object detectors that deal only with a vehicle as a recognition target object. A human model (here, 131[2, 1] and 131[2, 2])

denotes a single-class image recognition model that deals only with a human as a recognition target object. Accordingly, in the inference block 20[2] according to Practical Example EX1_1, the object detectors 30[1] and 30[2] are single-class object detectors that deal only with a human as a recognition target object.

Figure 13:
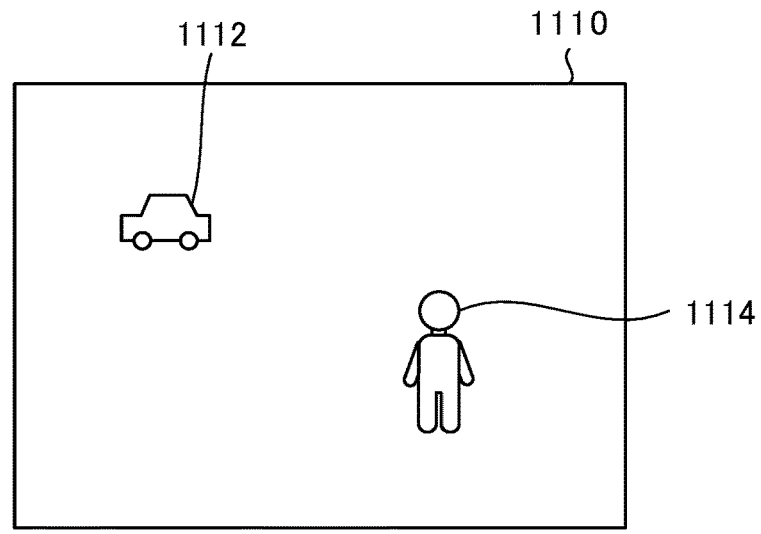
FIG. 13 is a diagram showing an example of an input image according to Practical Example EX1_1 belonging to the first embodiment of the present invention.

FIG. 13 shows an input image 1110 as a example of one input image IN[p]. The input image 1110 includes an image of a vehicle 1112 and an image of a human 1114. The operation of the relevant blocks in FIG. 12 with respect to the input image 1110 will be described.

In the inference block 20[1], the object detector 30[1] performs an object detection process using the vehicle model 131[1, 1] with respect to the input image 1110 to generate and output object detection data 132[1, 1].

In the inference block 20[1], the object detector 30[2] performs an object detection process using the vehicle model 131[1, 2] with respect to the input image 1110 to generate and output object detection data 132[1, 2].

In the inference block 20[2], the object detector 30[1] performs an object detection process using the human model 131[2, 1] with respect to the input image 1110 to generate and output object detection data 132[2, 1].

In the inference block 20[2], the object detector 30[2] performs an object detection process using the human model 131[2, 2] with respect to the input image 1110 to generate and output object detection data 132[2, 2].

In the inference block 20[1], based on the object detection data 132[1, 1] and 132[1, 2], the integrator 40 generates and outputs inference result data 133[1].

In the inference block 20[2], based on the object detection data 132[2, 1] and 132[2, 2], the integrator 40 generates and outputs inference result data 133[2].

Based on the input image 1110 and the inference result data 133[1] and 133[2], the data storer 50 generates a unit data set 134. By storing the unit data set 134 in the database DB, the data storer 50 adds the unit data set 134 to the learning data set DS as part of it.

Figure 14:
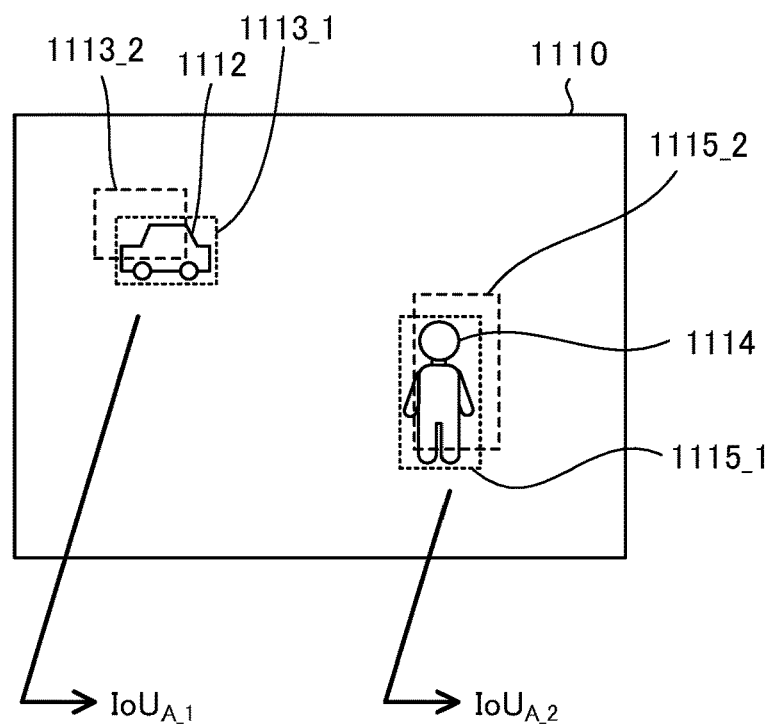
FIG. 14 is a diagram showing a plurality of object detection regions set in an input image according to Practical Example EX1_1 belonging to the first embodiment of the present invention.

Referring to FIG. 14, the region inside the rectangular frame identified by the reference sign 1113_1 is the object detection region set by the object detector 30[1] in the inference block 20[1] (i.e., set by the vehicle model 131[1, 1]). The region inside the rectangular frame identified by the reference sign 11132 is the object detection region set by the object detector 30[2] in the inference block 20[1] (i.e., set by the vehicle model 131[1, 2]). The region inside the rectangular frame identified by the reference sign 1115_1 is the object detection region set by the object detector 30[1] in the inference block 20[2] (i.e., set by the human model 131[2, 1]). The region inside the rectangular frame identified by the reference sign 1115_2 is the object detection region set by the object detector 30[2] in the inference block 20[2] (i.e., set by the human model 131[2, 2]). Thus, in each inference block 20, two object detectors 30 sets two object detection regions, and these object detection regions each serve as a candidate for an integrated inference region (see FIG. 7).

In the inference block 20[1], the integrator 40 derives the index IoU between the object detection regions 1113_1 and 1113_2 as an index $IoU_{A\_1}$, and generates the inference result data 133[1] in accordance with the index $IoU_{A\_1}$. In the inference block 20[2], the integrator 40 derives the index IoU between the object detection regions 1115_1 and 1115_2 as an index $IoU_{A\_2}$, and generates the inference result data 133[2] in accordance with the index $IoU_{A\_2}$.

A description will now be given of a method of generating the inference result data 133[1] based on the index $IoU_{A\_1}$, and of the relationship between the inference result data 133[1] and the learning data set DS. In the inference block 20[1], the integrator 40 identifies, between the reliabilities SCR in the object detection data 132[1, 1] and the reliability SCR in the object detection data 132[1, 2], the higher reliability SCR, and sets the object detector 30 corresponding to the higher reliability SCR as a reference object detector 30. If the reliabilities SCR in the object detection data 132[1, 1] and 132[1, 2] are equal, the integrator 40 sets either of, or a previously defined one of, the object detectors 30[1] and 30[2] as the reference object detector 30.

In the inference block 20[1], the integrator 40 compares the index $IoU_{A\_1}$ with a predetermined overlap threshold value $IoU_{REF}$. The overlap threshold value $IoU_{REF}$ has a value more than zero but less than one (e.g., 0.8). For convenience' sake, a case where the index $IoU_{A\_1}$ is equal to or higher than the overlap threshold value $IoU_{REF}$ will be referred to as case $CS_{A11}$. In case $CS_{A11}$, the integrator 40 chooses the object detection data output from the reference object detector 30 as the inference result data 133[1].

Adopting given object detection data as given inference result data means setting the class data CLS and the position/shape data PP in the given object detection data as the class data and the position/shape data in the given inference result data. Accordingly, in case $CS_{A11}$, the integrator 40 sets the class data CLS and the position/shape data PP in the object detection data from the reference object detector 30 as the class data and the position/shape data in the inference result data 133[1].

In the inference block 20[1], if the index $IoU_{A\_1}$ is lower than the overlap threshold value $IoU_{REF}$, the integrator 40 compares the reliability SCR in the object detection data from the reference object detector 30 with a predetermined reference reliability $SCR_{REF}$. The reference reliability $SCR_{REF}$ has a value more than zero but less than one (e.g., 0.6). For convenience' sake, a case where the index $IoU_{A\_1}$ is lower than the overlap threshold value $IoU_{REF}$ and in addition the reliability SCR in the object detection data from the reference object detector 30 is equal to or higher than the reference reliability $SCR_{REF}$ will be referred to as case $CS_{A12}$. In case $CS_{A12}$, the integrator 40 chooses the object detection data output from the reference object detector 30 as the inference result data 133[1]. That is, the integrator 40 sets the class data CLS and the position/shape data PP in the object detection data from the reference object detector 30 as the class data and the position/shape data in the inference result data 133[1].

Accordingly, for example, in case $CS_{A11}$ or $CS_{A12}$, if the object detector 30[1] in the inference block 20[1] is set as the reference object detector 30, the class data CLS and the position/shape data PP in the object detection data 132[1, 1] are set as the class data and the position/shape data in the inference result data 133[1]. In this case, the object detection region 1113_1 is set as the integrated inference region. And the class data in the inference result data 133[1] is, as class annotation information indicating that the object in the integrated inference region (1113_1) is a vehicle, included in the unit data set with respect to the input image 1110. In addition, the position/shape data in the inference result data 133[1] is, as region annotation information indicating the position and shape of the integrated inference region (1113_1), included in the unit data set with respect to the input image 1110 (and is eventually included in the learning data set DS).

By contrast, for example, in case $CS_{A11}$ or $CS_{A12}$, if the object detector 30[2] in the inference block 20[1] is set as the reference object detector 30, the class data CLS and the position/shape data PP in the object detection data 132[1, 2]

are set as the class data and the position/shape data in the inference result data 133[1]. In this case, the object detection region 1113_2 is set as the integrated inference region. And the class data in the inference result data 133[1] is, as class annotation information indicating that the object in the integrated inference region (1113_2) is a vehicle, included in the unit data set with respect to the input image 1110. In addition, the position/shape data in the inference result data 133[1] is, as region annotation information indicating the position and shape of the integrated inference region (11132), included in the unit data set with respect to the input image 1110 (and is eventually included in the learning data set DS).

For convenience' sake, a case where the index $IoU_{A\_1}$ is lower than the overlap threshold value $IoU_{REF}$ and in addition the reliability SCR in the object detection data from the reference object detector 30 is lower than the reference reliability $SCR_{REF}$ will be referred to as case $CS_{A13}$. In case $CS_{A13}$, the integrator 40 outputs "0" inference result data 133[1]. In case $CS_{A13}$, the inference result data 133[1] is not included in the unit data set with respect to the input image 1110 (in other words, it is excluded from the unit data set with respect to the input image 1110), and is thus the inference result data 133[1] is not reflected in the learning data set DS.

In case $CS_{A12}$, a modification is possible where, as in case $CS_{A13}$, the integrator 40 in the inference block 20[1] outputs "0" inference result data 133[1].

While a method of generating the inference result data 133[1] based on the index $IoU_{A\_1}$ and the relationship between the inference result data 133[1] and the learning data set DS have been described, a similar description applies to a method of generating the inference result data 133[2] based on the index $IoU_{A\_2}$ and the relationship between the inference result data 133[2] and the learning data set DS.

Figure 15:
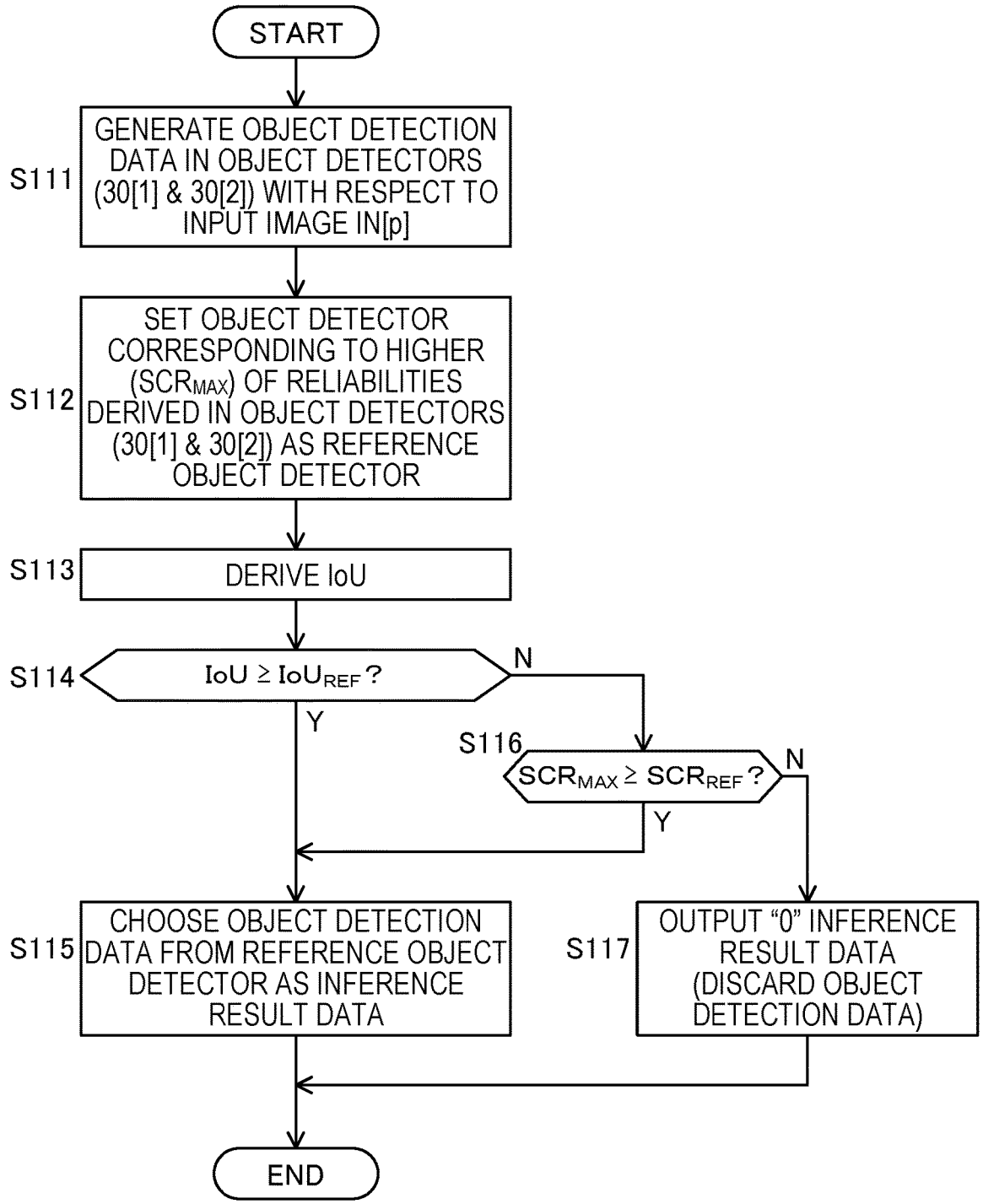
FIG. 15 is an operation flow chart of a data processing apparatus in connection with generation of inference result data according to Practical Example EX1_1 belonging to the first embodiment of the present invention.

FIG. 15 is an operation flow chart of the data processing apparatus 1 according to Practical Example EX1_1. It should be noted that the unit procedure comprising steps S111 to S117 in FIG. 15 is the procedure that is performed in one inference block 20[j] with respect to one input image IN[p] (see FIG. 8). The unit procedure comprising steps S111 to S117 is performed in each inference block 20 in the data processing apparatus 1, and is performed for each input image IN.

First, at step S111, in the inference block 20[j], the object detectors 30[1] and 30[2] perform object detection processes on the input image IN[p] to generate two sets of object detection data. Here, it is assumed that each object detector 30 sets one object detection region in one input image IN[p]. If, in the inference block 20[j], no object detection region is set in the input image IN[p], the inference block 20[j] ends its operation on the input image IN[p] without continuing with the rest of the procedure.

Subsequently to step S111, at step S112, in the inference block 20[j], the integrator 40 sets, based on the reliabilities SCR derived (generated) in the object detectors 30[1] and 30[2], one of the object detectors 30[1] and 30[2] as a reference object detector 30. How the reference object detector 30 is set has been described previously; that is, of the object detectors 30[1] and 30[2], the object detector 30 that derives the higher reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S112, at step S113, in the inference block 20[j], the integrator 40 derives the index IoU of the two object detection regions set by the object detectors 30[1] and 30[2]. Subsequently, at step S114, the integrator 40 in the inference block 20[j] checks whether the derived index IoU is equal to or higher than the overlap threshold value $IoU_{REF}$. If "$IoU \geq IoU_{REF}$" is fulfilled (step S114, "Y"), an advance is made to step S115; if "$IoU \geq IoU_{REF}$" is not fulfilled (step S114, "N"), an advance is made to step S116.

At step S115, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. Though not specifically shown in FIG. 15, after step S115, annotation information based on the inference result data from the integrator 40 in the inference block 20[j] is, as annotation information on the input image IN[p], included in the unit data set U_DS[p], and then the unit data set U_DS[p] is added to the learning data set DS (see FIG. 8).

At step S116, the integrator 40 in the inference block 20[j] checks whether the reliability $SCR_{MAX}$ is equal to or higher than the reference reliability $SCR_{REF}$. If "$SCR_{MAX} \geq SCR_{REF}$" is fulfilled (step S116, "Y"), an advance is made to step S115, where the operation at step S115 described above is performed; if "$SCR_{MAX} \geq SCR_{REF}$" is not fulfilled (step S116, "N"), an advance is made to step S117.

At step S117, in the inference block 20[j], the integrator 40 outputs "0" inference result data. In a case where step S117 is reached, the inference result data from the integrator 40 in the inference block 20[j] is not included in the unit data set U_DS[p] with respect to the input image IN[p] (in other words, it is excluded from the unit data set U_DS[p]), and thus is not reflected in the learning data set DS. That is, the operation at step S117 corresponds to discarding the object detection data generated at step S111 without reflecting it in the learning data set DS.

A case where step S115 is reached as a result of "$IoU \geq IoU_{REF}$" being fulfilled corresponds to case $CS_{A11}$ described above. A case where step S115 is reached as a result of "$IoU < IoU_{REF}$" and "$SCR_{MAX} \geq SCR_{REF}$" both being fulfilled corresponds to case $CS_{A12}$ described above. A case where step S117 is reached as a result of "$IoU < IoU_{REF}$" and "$SCR_{MAX} \leq SCR_{REF}$" both being fulfilled corresponds to case $CS_{A13}$ described above.

Figure 16:
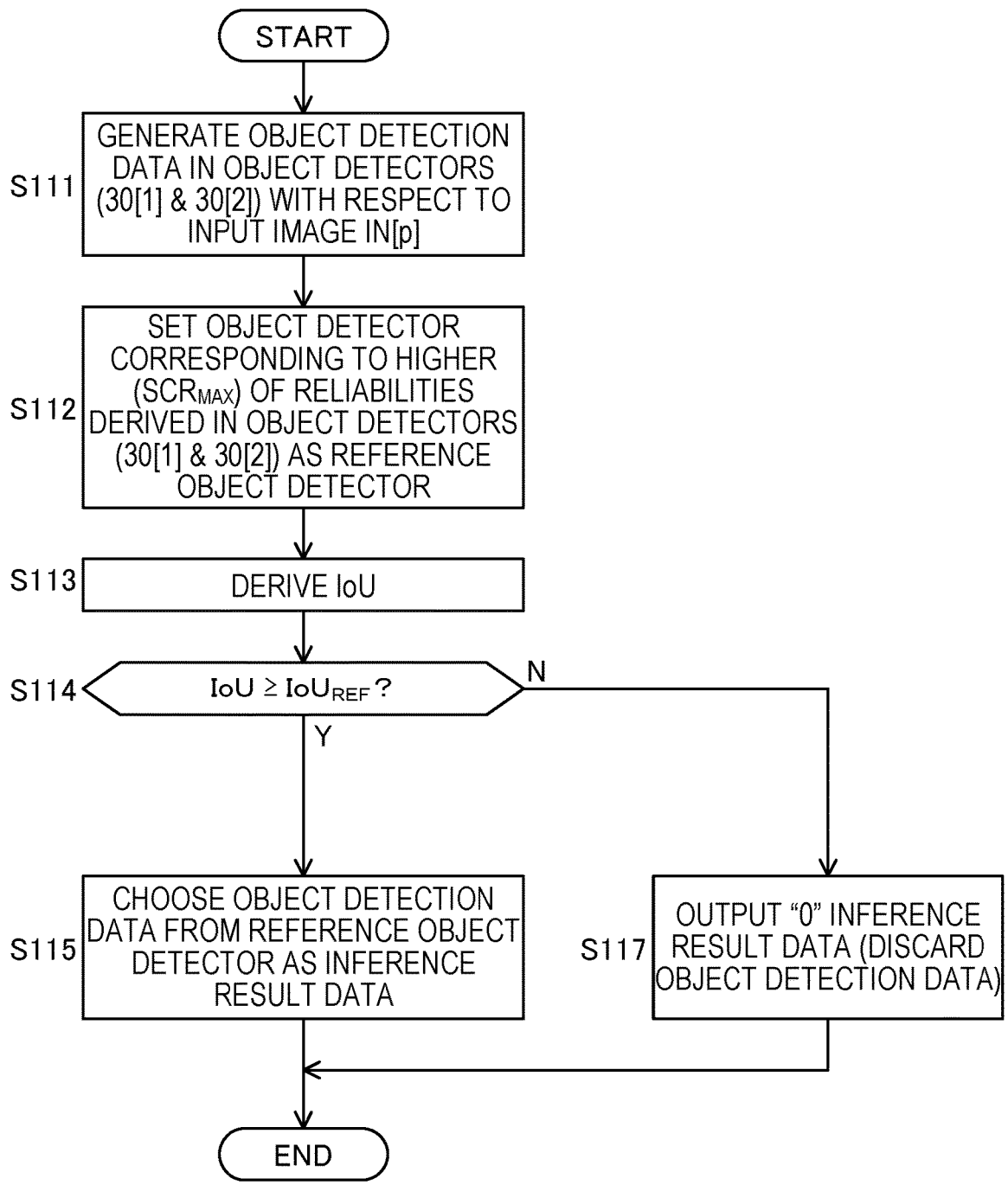
FIG. 16 is a modified operation flow chart of a data processing apparatus in connection with generation of inference result data according to Practical Example EX1_1 belonging to the first embodiment of the present invention.

A modification is possible where the operation at step S116 is omitted from the operation flow chart in FIG. 15. FIG. 16 is a so modified operation flow chart. With this modification made, if "$IoU \geq IoU_{REF}$" is not fulfilled, a jump is always made from step S114 to step S117.

As described above, with respect to a single object, a plurality of image recognition models with different detection algorithms and other characteristics are applied, and the results they yield are integrated together. Meanwhile, a high degree of overlap among the plurality of object detection regions obtained using the plurality of image recognition models suggests a comparatively high likelihood of the recognition results of those image recognition models (in other words, the detection results of the object detection processes) being correct. By contrast, a low degree of overlap suggests a comparatively high likelihood of the recognition results of those image recognition models (in other words, the detection results of the object detection processes) containing an error. Out of these considerations, the index IoU representing the degree of overlap is derived, and in accordance with the degree of overlap (IoU), inference result data is generated. In this way, it is possible to generate inference result data with few errors. By generating the learning data set DS using inference result data with few errors, it is possible to obtain a high-quality learning data set DS.

Practical Example EX1_2

Practical Example EX1_2 will be described. In Practical Example EX1_1, it is assumed that n=2 and, as mentioned above, n may be any value of 2 or more. In Practical Example EX1_2, the technology described above in connection with Practical Example EX1_1 is generalized. In Practical Example EX1_2, a single-class configuration is adopted.

Figure 17:
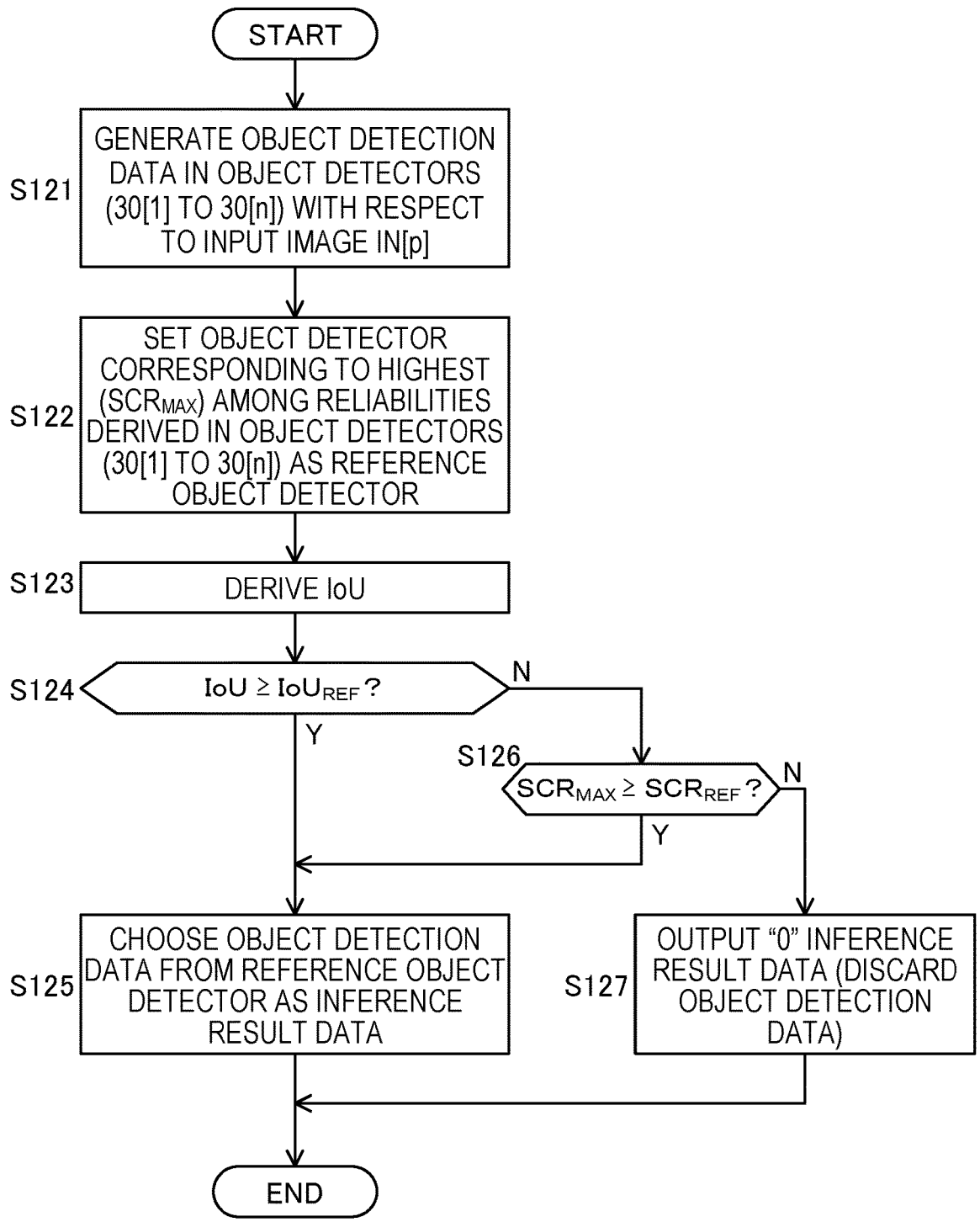
FIG. 17 is an operation flow chart of a data processing apparatus in connection with generation of inference result data according to Practical Example EX1_2 belonging to the first embodiment of the present invention.

FIG. 17 is an operation flow chart of the data processing apparatus 1 according to Practical Example EX1_2. It should be noted that the unit procedure comprising steps S121 to S127 in FIG. 17 is the procedure that is performed in one inference block 20[j] with respect to one input image IN[p] (see FIG. 8). The unit procedure comprising steps S121 to S127 is performed in each inference block 20 in the data processing apparatus 1, and is performed for each input image IN.

First, at step S121, in the inference block 20[j], the object detectors 30[1] to 30[n] perform object detection processes on the input image IN[p] to generate n sets of object detection data. Here, it is assumed that each object detector 30 sets one object detection region in one input image IN[p]. If, in the inference block 20[j], no object detection region is set in the input image IN[p], the inference block 20[j] ends its operation on the input image IN[p] without continuing with the rest of the procedure.

Subsequently to step S121, at step S122, in the inference block 20[j], the integrator 40 sets, based on the reliabilities SCR derived (generated) in the object detectors 30[1] to 30[n], one of the object detectors 30[1] to 30[n] as a reference object detector 30. How the reference object detector 30 is set has been described previously; that is, of the object detectors 30[1] to 30[n], the object detector 30 that derives the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S122, at step S123, in the inference block 20[j], the integrator 40 derives the index IoU of a total of n object detection regions set in the object detectors 30[1] to 30[n]. Subsequently, at step S124, the integrator 40 in the inference block 20[j] checks whether the derived index IoU is equal to or higher than the overlap threshold value $IoU_{REF}$. If "$IoU \geq IoU_{REF}$" is fulfilled (step S124, "Y"), an advance is made to step S125; if "$IoU \geq IoU_{REF}$" is not fulfilled (step S124, "N"), an advance is made to step S126.

At step S125, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. Though not specifically shown in FIG. 17, after step S125, annotation information based on the inference result data from the integrator 40 in the inference block 20[j] is, as annotation information on the input image IN[p], included in the unit data set U_DS[p], and then the unit data set U_DS[p] is added to the learning data set DS (see FIG. 8).

At step S126, the integrator 40 in the inference block 20[j] checks whether the reliability $SCR_{MAX}$ is equal to or higher than the reference reliability $SCR_{REF}$. If "$SCR_{MAX} \geq SCR_{REF}$" is fulfilled (step S126, "Y"), an advance is made to step S125, where the operation at step S125 described above is performed; if "$SCR_{MAX} \geq SCR_{REF}$" is not fulfilled (step S126, "N"), an advance is made to step S127.

At step S127, in the inference block 20[j], the integrator 40 outputs "0" inference result data. In a case where step S127 is reached, the inference result data from the integrator 40 in the inference block 20[j] is not included in the unit data set U_DS[p] with respect to the input image IN[p] (in other words, it is excluded from the unit data set U_DS[p]), and thus is not reflected in the learning data set DS. That is, the operation at step S127 corresponds to discarding the object detection data generated at step S121 without reflecting it in the learning data set DS.

As described above, the inference block 20[j] (integrator 40) can identify the maximum reliability $SCR_{MAX}$ among a plurality of reliabilities SCR (n reliabilities SCR) derived through a plurality of object detection processes in the object detectors 30[1] to 30[n](step S122). The plurality of object detection regions set in the object detectors 30[1] to 30[n] correspond to candidates for an integrated inference region, and each object detection region can be called a candidate region (see FIG. 7). After the operations at steps S121 to S123 are gone through, at step S124, the degree of overlap (IoU) among the plurality of candidate regions is evaluated. Then, if "$IoU \geq IoU_{REF}$" is fulfilled, the inference block 20[j] (integrator 40) generates inference result data based on the object detection data from the object detector 30 corresponding to the maximum reliability $SCR_{MAX}$ (i.e., the object detection data from the reference object detector 30 that derives the maximum reliability $SCR_{MAX}$).

Figure 18:
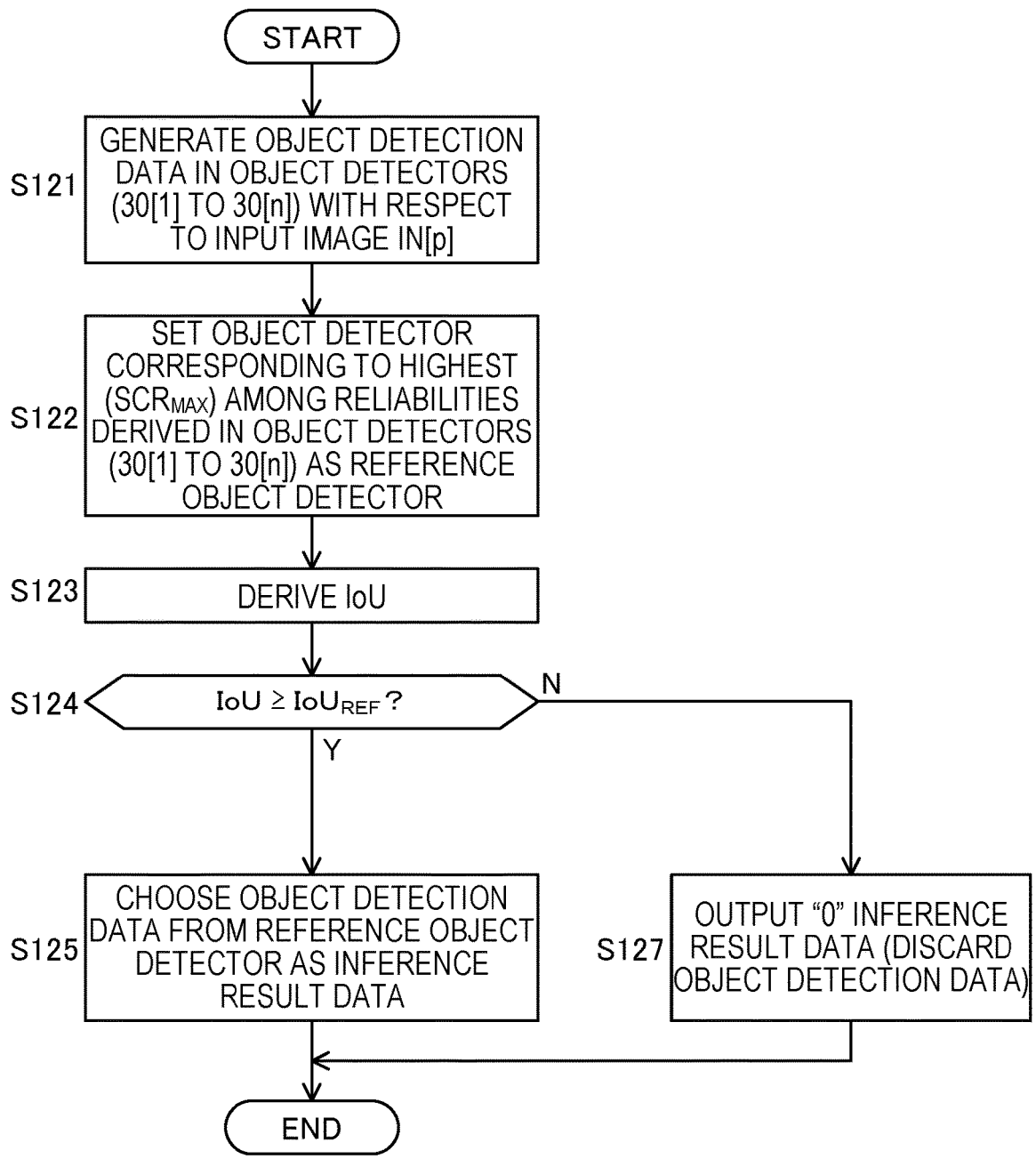
FIG. 18 is a modified operation flow chart of a data processing apparatus in connection with generation of inference result data according to Practical Example EX1_2 belonging to the first embodiment of the present invention.

A modification is possible where the operation at step S126 is omitted from the operation flow chart in FIG. 17. FIG. 18 is a so modified operation flow chart. With the modification made, if "$IoU \geq IoU_{REF}$" is not fulfilled, a jump is always made from step S124 to step S127.

There can be a case where, in the inference block 20[j], through object detection processes on the input image IN[p], object detection regions are set only in some object detectors 30 among the object detectors 30[1] to 30[n] (for convenience' sake, referred to as case $CS_{A21}$ in the following description). In case $CS_{A21}$, only some object detectors 30 among the object detectors 30[1] to 30[n] output object detection data that includes class data CLS, position/shape data PP, and a reliability SCR, and the rest of the object detectors 30 output "0" object detection data. In case $CS_{A21}$, with respect to the input image IN[p], an advance may always be made to step S127. This is because, in case $CS_{A21}$, the result of the object detection process by at least one of the object detectors 30[1] to 30[n] contains an error (which can be detection failure).

However, in case $CS_{A21}$, if object detection regions are set in two or more of the object detectors 30 in the inference block 20[j], at step S122, a reference object detector 30 may be selected and set among those two or more object detectors 30 by the method described above. In that case, at step S123, the IoU of two or more object detection regions set by those two or more object detectors 30 can be derived, and thereafter the operations at step S124 and the following steps in FIG. 17 or 18 may be performed.

Practical Example EX1_3

Practical Example EX1_3 will be described. In Practical Example EX1_3, a multi-class configuration is adopted. The technology described above in connection with Practical Examples EX1_1 and EX1_2 can be applied to a multi-class configuration, and an example where the technology is applied to a multi-class configuration will be described as Practical Example EX1_3.

Figure 19:
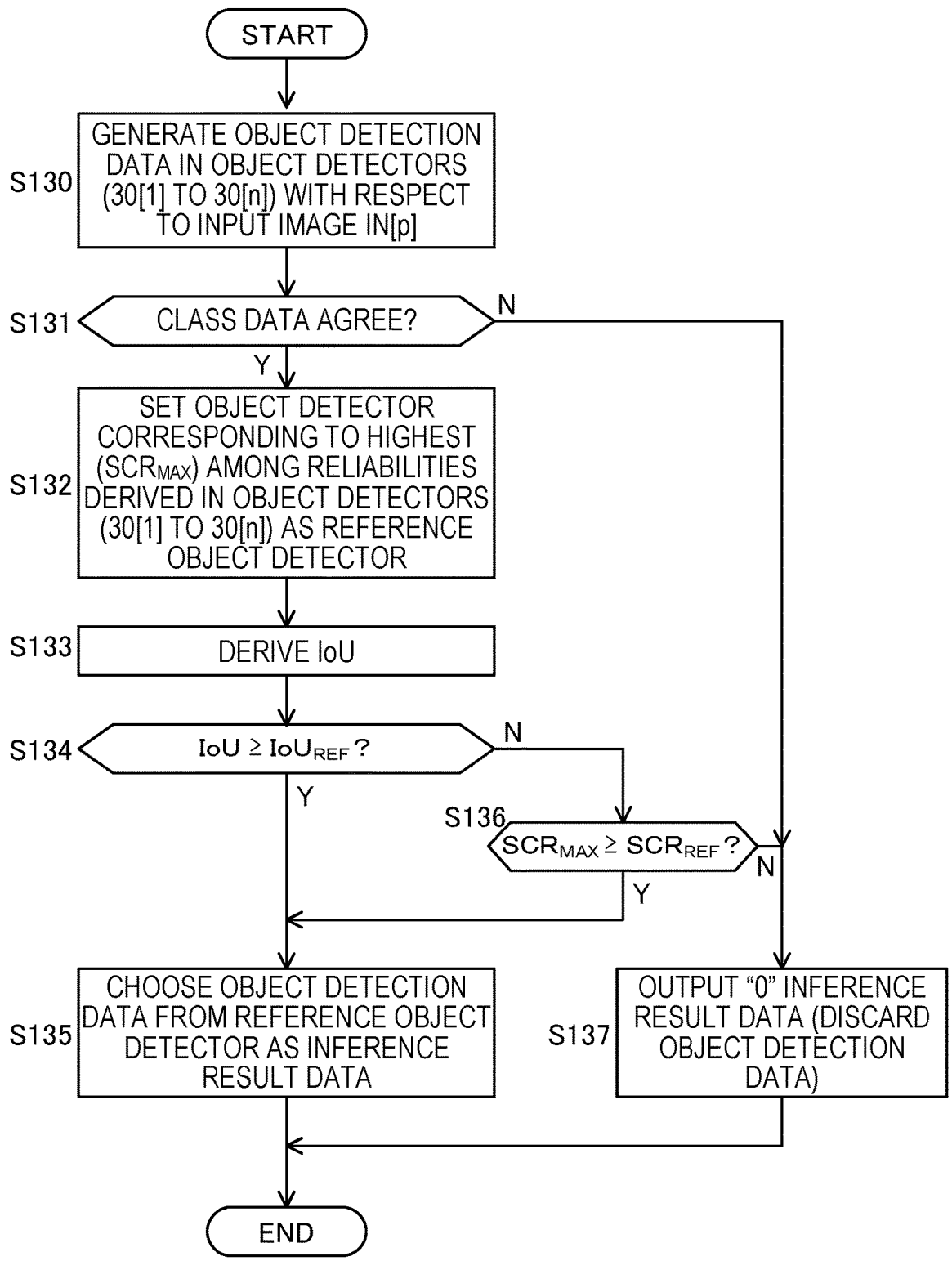
FIG. 19 is an operation flow chart of a data processing apparatus in connection with generation of inference result data according to Practical Example EX1_3 belonging to the first embodiment of the present invention.

FIG. 19 is an operation flow chart of the data processing apparatus 1 according to Practical Example EX1_3. It should be noted that the unit procedure comprising steps S131 to S137 in FIG. 19 is the procedure that is performed in one inference block 20[j] with respect to one input image IN[p] (see FIG. 8). The unit procedure comprising steps S131 to S137 is performed in each inference block 20 in the data processing apparatus 1, and is performed for each input image IN.

First, at step S130, in the inference block 20[j], the object detectors 30[1] to 30[n] perform object detection processes on the input image IN[p] to generate n sets of object detection data. After step S130, an advance is made to step S131. Here, it is assumed that each object detector 30 sets one object detection region in one input image IN[p]. Under this assumption, with respect to the input image IN[p], the object detectors 30[1] to 30[n] sets a total of n object detection regions. If, in the inference block 20[j], no object detection region is set in the input image IN[p], the inference block 20[j] ends its operation on the input image IN[p] without continuing with the rest of the procedure.

At step S131, in the inference block 20[j], the integrator 40 checks whether the class data CLS on the total of n object detection regions set in the object detectors 30[1] to 30[n] agree. If the class data CLS on the total of n object detection regions agree (step S131, "Y"), an advance is made to step S132; otherwise (step S131, "N"), an advance is made to step S137.

For example, in a case where n=2, if the class data CLS on the two object detection regions set in the object detectors 30[1] and 30[2] both indicate a vehicle, an advance is made to step S132. This corresponds to the object detectors 30[1] and 30[2] both recognizing the object in the object detection region to be a vehicle. By contrast, in a case where n=2, if the class data CLS on the object detection region set in the object detector 30[1] indicates a vehicle while the class data CLS on the object detection region set in the object detector 30[2] indicates a human, an advance is made to step S137. This corresponds to the object detectors 30[1] and 30[2] recognizing an object common to them to be a vehicle and a human respectively. In this case, the result of the object detection process by at least one of the object detectors 30[1] and 30[2] contains an error. Since it is undesirable to mix an erroneous result of an object detection process in the learning data set DS, at step S137, the object detection data is discarded.

At step S132, in the inference block 20[j], the integrator 40 sets, based on the reliabilities SCR derived (generated) in the object detectors 30[1] to 30[n], one of the object detectors 30[1] to 30[n] as a reference object detector 30. How the reference object detector 30 is set has been described previously; that is, of the object detectors 30[1] to 30[n], the object detector 30 that derives the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S132, at step S133, in the inference block 20[j], the integrator 40 derives the index IoU of a total of n object detection regions set in the object detectors 30[1] to 30[n]. Subsequently, at step S134, the integrator 40 in the inference block 20[j] checks whether the derived index IoU is equal to or higher than the overlap threshold value $IoU_{REF}$. If "$IoU \geq IoU_{REF}$" is fulfilled (step S134, "Y"), an advance is made to step S135; if "$IoU \geq IoU_{REF}$" is not fulfilled (step S134, "N"), an advance is made to step S136.

At step S135, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. Though not specifically shown in FIG. 19, after step S135, annotation information based on the inference result data from the integrator 40 in the inference block 20[j] is, as annotation information on the input image IN[p], included in the unit data set U_DS[p], and then the unit data set U_DS[p] is added to the learning data set DS (see FIG. 8).

At step S136, the integrator 40 in the inference block 20[j] checks whether the reliability $SCR_{MAX}$ is equal to or higher than the reference reliability $SCR_{REF}$. If "$SCR_{MAX} \geq SCR_{REF}$" is fulfilled (step S136, "Y"), an advance is made to step S135, where the operation at step S135 described above is performed; if "$SCR_{MAX} \geq SCR_{REF}$" is not fulfilled (step S136, "N"), an advance is made to step S137.

At step S137, in the inference block 20[j], the integrator 40 outputs "0" inference result data. In a case where step S137 is reached, the inference result data from the integrator 40 in the inference block 20[j] is not included in the unit data set U_DS[p] with respect to the input image IN[p] (in other words, it is excluded from the unit data set U_DS[p]), and thus is not reflected in the learning data set DS. That is, the operation at step S137 corresponds to discarding the object detection data generated at step S130 without reflecting it in the learning data set DS.

As described above, the inference block 20[j] (integrator 40) can identify the maximum reliability $SCR_{MAX}$ among a plurality of reliabilities SCR (n reliabilities SCR) derived through a plurality of object detection processes in the object detectors 30[1] to 30[n](step S132). A plurality of object detection regions in which, through the plurality object detection processes, objects of the same kind are judged to be present (i.e., the plurality of object detection regions set when an advance is made to step S132) correspond to candidates for an integrated inference region, and each object detection region can be called a candidate region (see FIG. 7). When the class data with respect to the plurality of object detection regions agree, it means that the plurality of object detection regions in which objects of the same kind are judged to be present can be a plurality of candidate regions, and if the class data with respect to the plurality of object detection regions agree, the operations at step S131 and the following steps are performed. After the operations at steps S132 and S133 are gone through, at step S134, the degree of overlap (IoU) among the plurality of candidate regions is evaluated. Then, if "$IoU \geq$" $IoU_{REF}$ is fulfilled, the inference block 20[j] (integrator 40) generates inference result data based on the object detection data from the object detector 30 corresponding to the maximum reliability $SCR_{MAX}$ (i.e., the object detection data from the object detector 30 that derives the maximum reliability $SCR_{MAX}$) (step S135).

Figure 20:
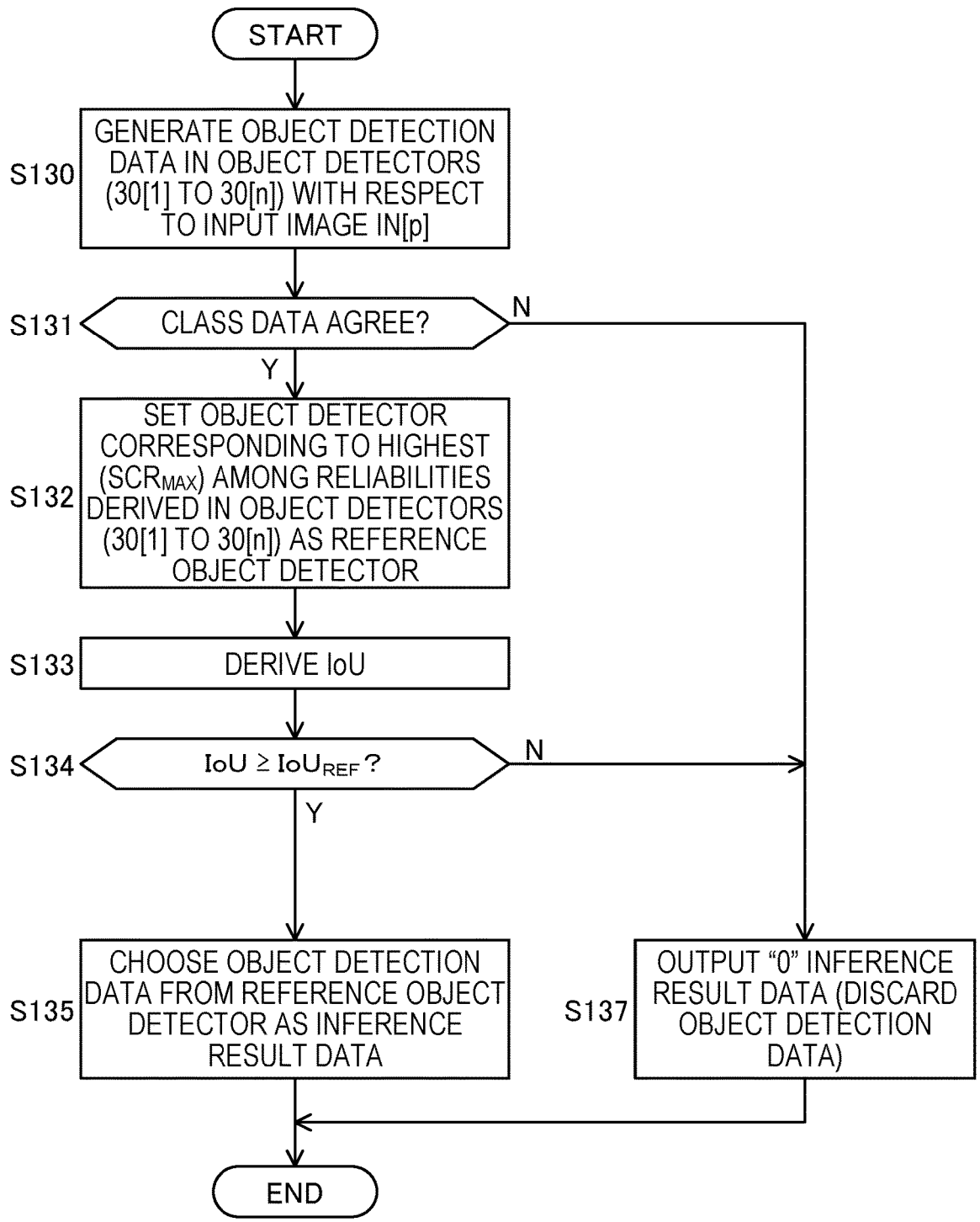
FIG. 20 is a modified operation flow chart of a data processing apparatus in connection with generation of inference result data according to Practical Example EX1_3 belonging to the first embodiment of the present invention.

A modification is possible where the operation at step S136 is omitted from the operation flow chart in FIG. 19. FIG. 20 is a so modified operation flow chart. With the modification made, if "$IoU \geq IoU_{REF}$" is not fulfilled, a jump is always made from step S134 to step S137.

There can be a case where, in the inference block 20[*j*], through object detection processes on the input image IN[p], object detection regions are set only in some object detectors 30 among the object detectors 30[1] to 30[*n*] (for convenience' sake, referred to as case $CS_{A31}$ in the following description). In case $CS_{A31}$, only some object detectors 30 among the object detectors 30[1] to 30[*n*] output object detection data that includes class data CLS, position/shape data PP, and a reliability SCR, and the rest of the object detectors 30 output "0" object detection data. In case $CS_{A31}$, with respect to the input image IN[p], an advance may always be made to step S137. This is because, in case $CS_{A31}$, the result of the object detection process by at least one of the object detectors 30[1] to 30[*n*] contains an error (which can be detection failure).

However, in case $CS_{A31}$, an advance may be made to the step S132 if object detection regions are set in two or more object detectors 30 in the inference block 20[*j*] and in addition the two or more sets of class data CLS output from the two or more of object detectors 30 agree. In that case, it is possible at step S132 to select and set, by the method described above, a reference object detector 30 out of those two or more object detectors 30. Then, at step S133, the IoU of the two or more object detection regions set by those two or more object detectors 30 can be derived, and thereafter the operations at step S134 and the following steps in FIG. 19 or 20 may be performed.

Practical Example EX1_4

Practical Example EX1_4 will be described. In Practical Example EX1_4, it is assumed that, typically, a single-class configuration is adopted (though a multi-class configuration may be adopted). The data processing apparatus 1 allows easy expansion of model functions. Specifically, for example, suppose that, in a case where an inference block 20[1] that deals with a vehicle as a recognition target object and an inference block 20[2] that deals with a human as a recognition target object already exist, a traffic light is to be additionally included in recognition target objects. In this case, it suffices to add, in parallel to the inference blocks 20[1] and 20[2], an inference block 20[3] that deals with a traffic light as a recognition target object (i.e., it is easy to expand model functions). Since it suffices to add inference block 20[3] to the existing inference block 20[1] and 20[2], expansion of functions only requires a short downtime in the image recognition operation on the data processing apparatus 1.

Figure 21:
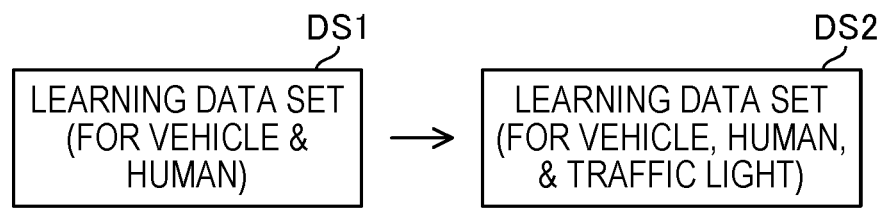
FIG. 21 is a diagram showing updating of a learning data set according to Practical Example EX1_4 belonging to the first embodiment of the present invention.

In that connection, the data processing apparatus 1 provides the advantage of easy addition of training data for a new kind of object to the learning data set DS. Specifically, for example, suppose that, as shown in FIG. 21, a learning data set DS that includes annotation information (training data) on a vehicle and a human already exists as a learning data set DS1. The learning data set DS1 does not include annotation information on a traffic light. The learning data set DS1 is used in constructing an inference model that deal with a vehicle and a human as recognition target objects. That is, through machine learning using the learning data set DS1, it is possible to construct an inference model that can recognize a vehicle and a human. In that case, when a need arises for construction of another inference model that can recognize a vehicle, a human, and a traffic light, it is possible to meet the need by adding annotation information (training data) on a traffic light to the learning data set DS1.

As a specific example, Practical Example EX1_4 assumes, in the following description, that m≥3, and in addition that the recognition target objects of the inference blocks 20[1], 20[2], and 20[3] are a vehicle, a human, and a traffic light respectively. In this case, starting in a situation where the learning data set DS is the learning data set DS1, the above need can be met by performing the procedure in FIG. 8 with, among the inference blocks 20[1] to 20[3], only the object detector 30[3] is operated (a modification is possible where also the inference block 20[1] and 20[2] are operated).

In that way, one unit data set after another including the input image IN and annotation information based on the inference result data from the inference block 20[3] (i.e., annotation information on a traffic light) is added to the learning data set DS1. The result of the learning data set DS1 undergoing such addition will be referred to as the learning data set DS2. Through machine learning using the learning data set DS2, it is possible to construct an inference model that can recognize a vehicle, a human, and a traffic light (that is, it is possible to meet the need mentioned above).

Of the inference blocks 20[1] to 20[3], only the inference block 20[3] has to be operated. It is thus possible to generate the learning data set DS2 with less computational cost and with less time.

Figure 22:
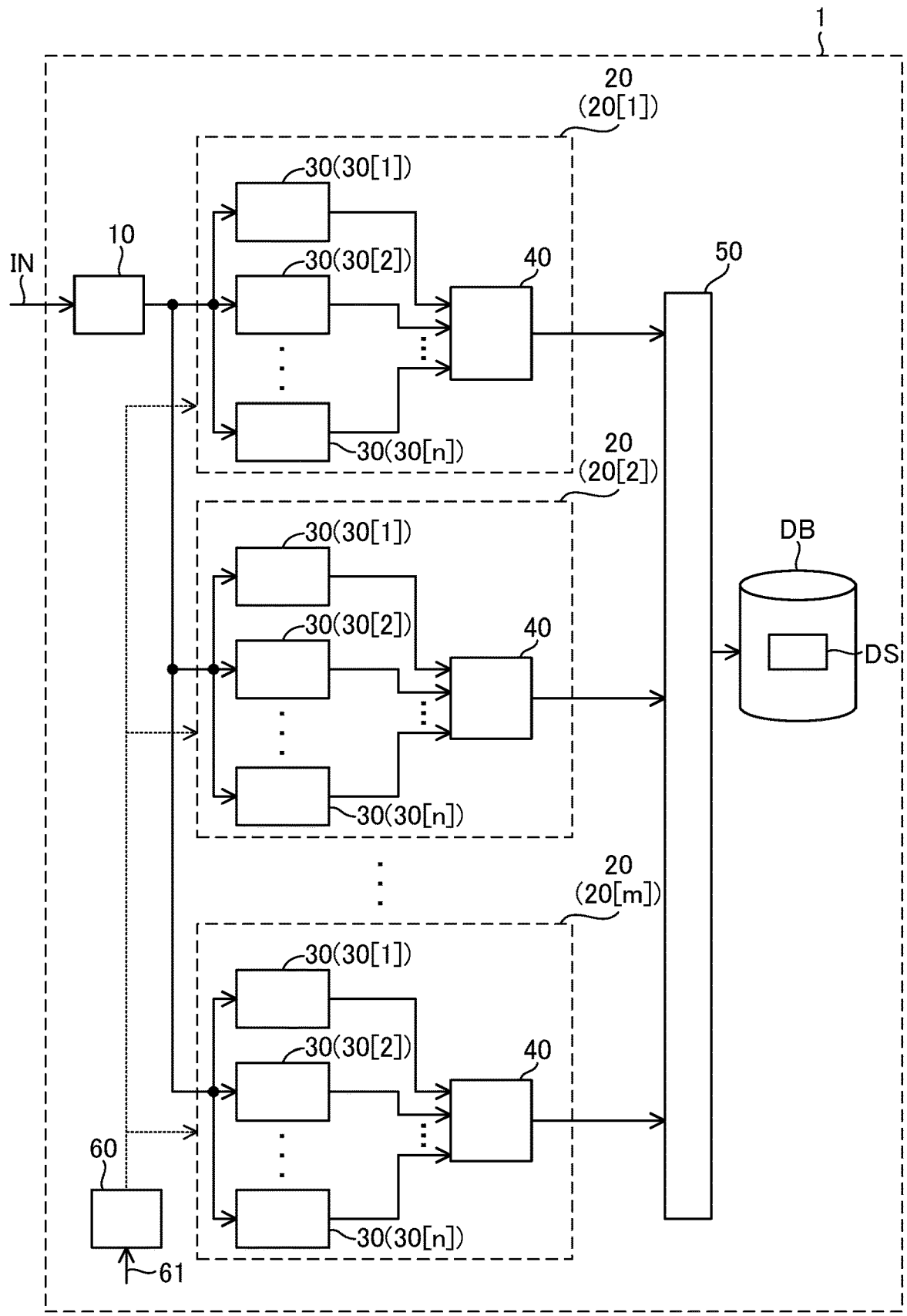
FIG. 22 is a functional block diagram of a data processing apparatus according to Practical Example EX1_4 belonging to the first embodiment of the present invention.

Specifically, as shown in FIG. 22, the data processing apparatus 1 can be additionally provided with an operation controller 60. The operation controller 60 may be a functional block provided in the arithmetic processor 2 (FIG. 10). The operation controller 60 may be implemented by the arithmetic processor 2 executing programs stored on the memory 3.

The operation controller 60 can perform a block selection process (in other words, block selection control). By the block selection process, the operation controller 60 can control whether to operate the inference blocks 20[1] to 20[*n*] individually. That is, by the block selection process, the operation controller 60 can control, individually, whether to perform an inference process in the inference block 20[1], whether to perform an inference process in the inference block 20[2] . . . whether to perform an inference process in the inference block 20[*n*]. The block selection process can be said to be a process for selectively performing some inference processes among the inference processes that can be performed in the inference blocks 20[1] to 20[*n*] respectively.

When the block selection process is not performed, inference processes are performed in all of the inference blocks 20[1] to 20[*n*]. The arithmetic processor 2 can be said to be capable of operating such that inference processes performed in all of the inference blocks 20[1] to 20[*n*] or such that, through the block selection process, inference processes are performed in some of the inference blocks 20[1] to 20[*n*].

The operator of the data processing apparatus 1 can feed selection instruction information 61 via the interface 4 to the data processing apparatus 1, and based on the selection instruction information 61 the operation controller 60 determines what to do in the block selection process. For example, if the operator of the data processing apparatus 1 wishes to create the learning data set DS2 based on the learning data set DS1, the operator can feed the data processing apparatus 1 with, as the selection instruction information 61, information demanding the operation of, among the inference blocks 20[1] to 20[3], only the object detector 20[3]. Then, in accordance with the selection instruction information 61, a block selection process is performed in the operation controller 60.

Between the image acquirer 10 and each of the inference blocks 20[1] to 20[n], a switch (not illustrated) may be provided so that, in accordance with the selection instruction information 61, the switch is turned on or off to achieve the block selection process. Also in a case where a multi-class configuration is adopted, an operation controller 60 may be provided to perform a block selection process.

Practical Example EX1_5

Practical Example EX1_5 will be described. In Practical Examples EX1_1 to EX1_3 described above, it is typically assumed that, with respect to one input image IN[p], each object detector 30 sets one object detection region. In reality, however, one input image IN[p] may include a plurality of images of recognition target objects, resulting in each object detector 30 setting, with respect to one input image IN[p], a plurality of object detection regions. In such a case, first a combination for which to derive IoU is determined based on the distances between object detection regions on XY coordinate plane, and then to each such combination, any of the methods described in connection with Practical Examples EX1_1 to EX1_3 can be applied.

Figure 23:
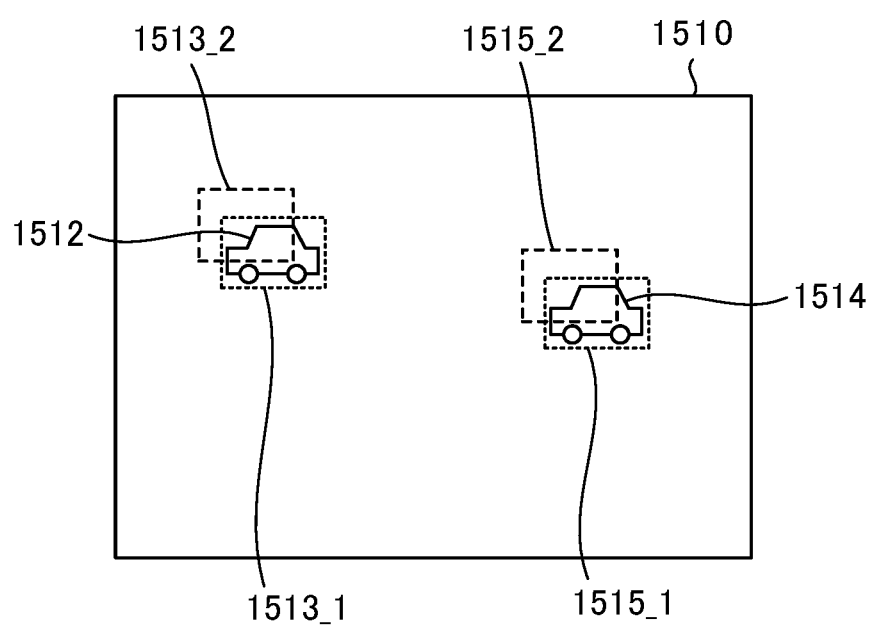
FIG. 23 is a diagram showing a plurality of object detection regions set in an input image according to Practical Example EX1_5 belonging to the first embodiment of the present invention.

A specific example will be described. FIG. 23 shows an input image 1510 as an example of one input image IN[p]. The operation of the relevant blocks in FIG. 12 with respect to the input image 1510 will be described. The input image 1510 includes an image of a vehicle 1512 and an image of another vehicle 1514. It is assumed that the recognition target object of each object detector 30 in the inference block 20[j] includes a vehicle, and in addition that n=2.

In the inference block 20[j], the object detector 30[1] detects the vehicles 1512 and 1514. Thus, in the object detector 30[1], an object detection region 1513_1 for the vehicle 1512 and an object detection region 1515_1 for the vehicle 1514 are set in the input image 1510. In the inference block 20[j], the object detector 30[1] outputs object detection data for each of the object detection regions 1513_1 and 1515_1.

In the inference block 20[j], the object detector 30[2] detects the vehicles 1512 and 1514. Thus, in the object detector 30[2], an object detection region 15132 for the vehicle 1512 and an object detection region 1515_2 for the vehicle 1514 are set in the input image 1510. In the inference block 20[j], the object detector 30[2] outputs object detection data for each of the object detection region 1513_2 and 1515_2.

The integrator 40 in the inference block 20[j] derives the distances between each of the object detection regions 1513_1 and 1515_1 and each of the object detection regions 1513_2 and 1515_2. The derived distances are those on XY coordinate plane. The distance between the object detection regions 1513_1 and 1513_2 may be the distance between the origin coordinates ($P_{DR}$) of the object detection region 1513_1 and the origin coordinates ($P_{DR}$) of the object detection region 1513_2, or the distance between the center coordinates of the object detection region 1513_1 and the center coordinates of the object detection region 1513_2. A similar description applies to any of the distances in the other combinations.

Based on the derived distances, the integrator 40 in the inference block 20[j] associates the object detection region 1513_1 with one of the object detection regions 1513_2 and 1515_2, and associates the object detection region 1515_1 with the other of the object detection regions 1513_2 and 1515_2. For example, the association here can be formed so as to minimize the root-mean-square of the distances between object detection regions associated with each other. In the example in FIG. 23, the distance between the object detection regions 1513_1 and 1513_2 is shorter than the distance between the object detection regions 1513_1 and 1515_2 and in addition the distance between the object detection regions 1515_1 and 1515_2 is shorter than the distance between the object detection regions 1515_1 and 1513_2. Accordingly, the object detection regions 1513_1 and 1513_2 are associated with each other, and the object detection regions 1515_1 and 1515_2 are associated with each other.

Then, for each combination of object detection regions associated with each other, one of the methods described in connection with Practical Example EX1_1 to EX1_3 can be applied. Specifically, for example, for each combination of object detection regions associated with each other, the procedure following step S111 in FIG. 15 or 16, or the procedure following step S121 in FIG. 17 or 18, or the procedure following step S130 in FIG. 19 or 20, can be performed.

Second Embodiment

A second embodiment of the present invention will be described. As in the first embodiment, also in the second embodiment, with respect to a single object, a plurality of image recognition models with different detection algorithms and other characteristics are applied, and the results they yield are integrated together. In the second embodiment, however, with a view to improving the quality of the learning data set DS, a scheme is introduced in which confirmation by human operation is requested in a case where there is a difference (comparatively large difference) among the recognition results yielded by a plurality of image recognition models. Even so, not all the input images IN require confirmation by human operation, and thus the burden of human operation is not very great.

Figure 24:
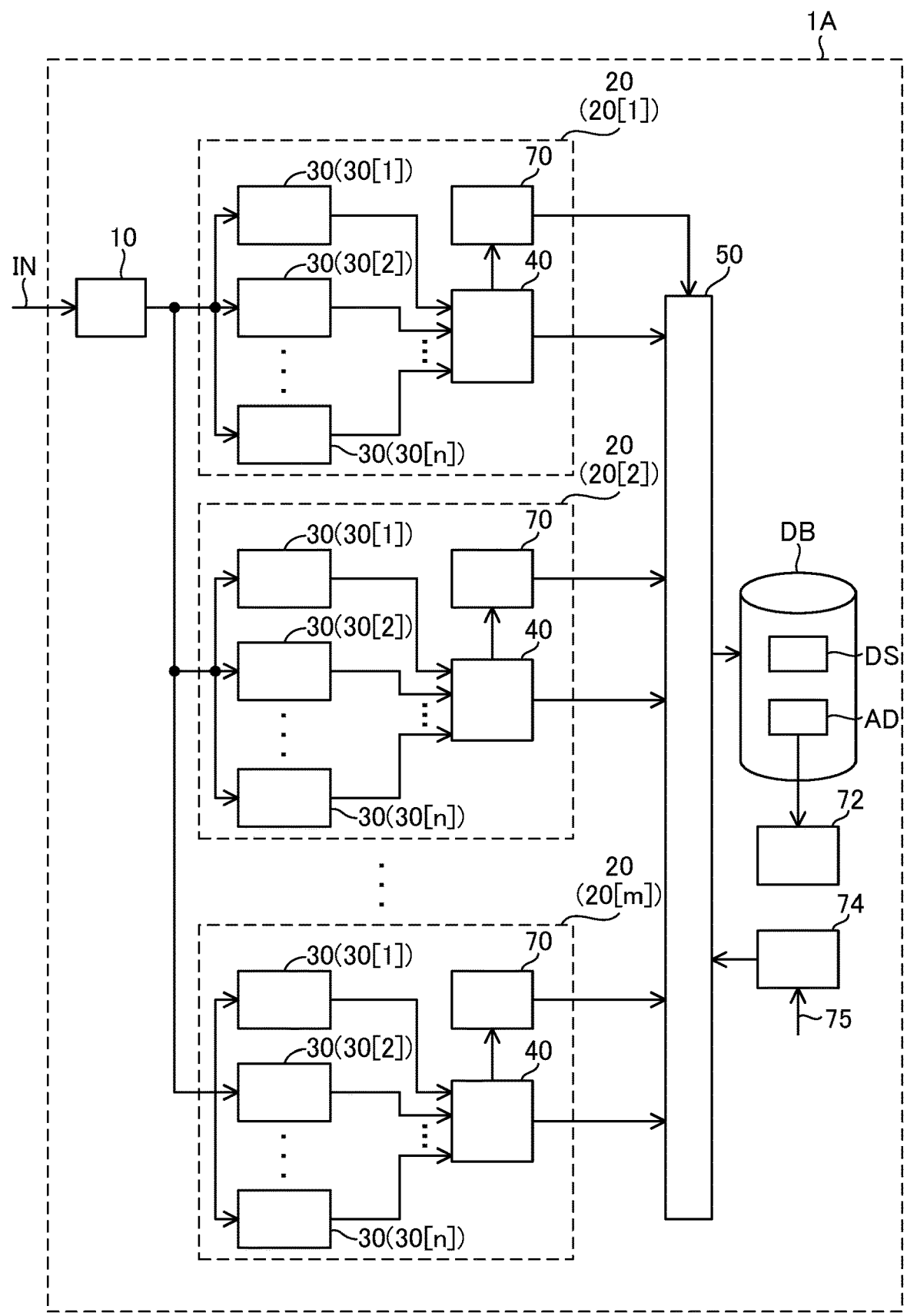
FIG. 24 is a functional block diagram of a data processing apparatus according to a second embodiment of the present invention.

The data processing apparatus 1 according to the second embodiment is referred to specifically as the data processing apparatus 1A. FIG. 24 is a functional block diagram of the data processing apparatus 1A. Unless otherwise stated, the data processing apparatus 1A basically has a configuration similar to that of the data processing apparatus 1 according to the basic embodiment. Each inference block 20 in the data processing apparatus 1A includes, in addition to the object detectors 30[1] to 30[n] and the integrator 40, an attention adder 70. The data processing apparatus 1A further includes an answer requester 72 and an answer acquirer 74. That is, compared with the data processing apparatus 1 according to the basic embodiment, the data processing apparatus 1A is configured to additionally include an answer requester 72 and an answer acquirer 74 as well as, for each inference block 20, an attention adder 70.

The attention adder 70 and the answer requester 72 may be functional blocks provided in the arithmetic processor 2 (FIG. 10). The attention adder 70 and the answer requester 72 may be implemented by the arithmetic processor 2 executing programs stored in the memory 3. The answer acquirer 74 is a block that acquires answer data 57 from a human, and is implemented as the interface 4 (see FIG. 10).

Figure 25:
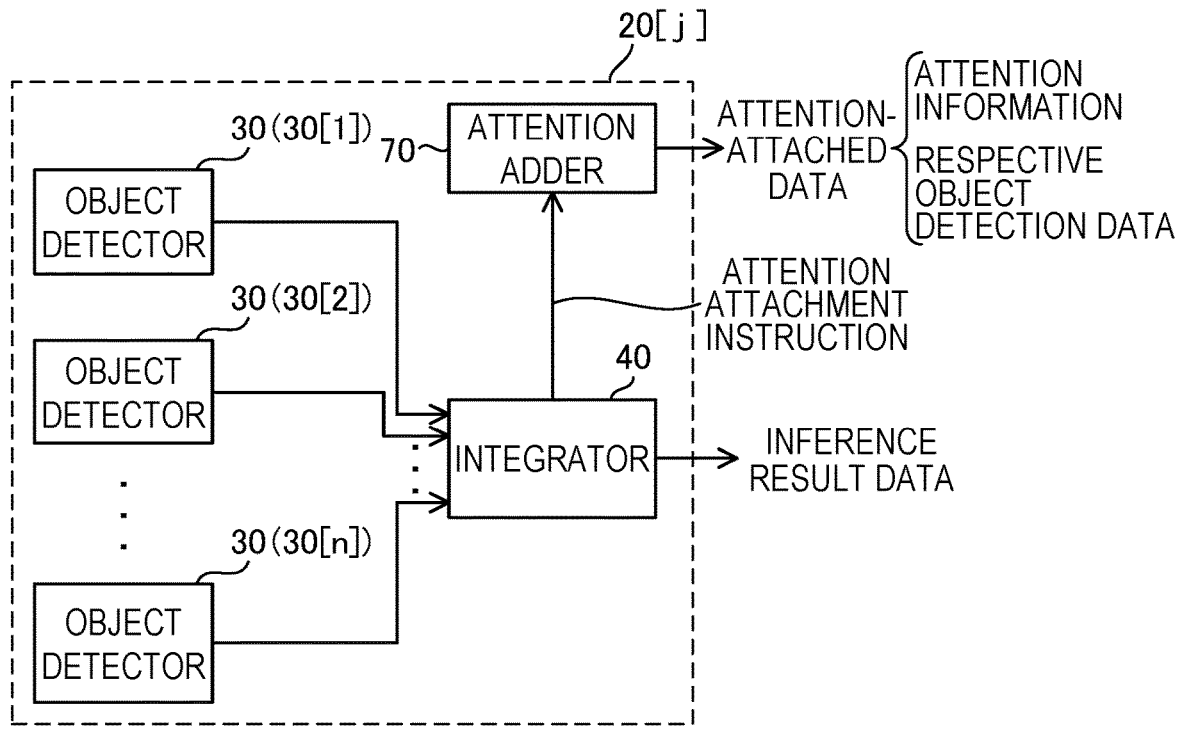
FIG. 25 is a functional block diagram of one inference block according to the second embodiment of the present invention.

Now, with reference to FIG. 25, the function of the attention adder 70 will be described. The following description focuses on one given inference block 20[j]. In the inference block 20[j], if object detection data from the object detectors 30[1] to 30[n] fulfills a predetermined attention attachment condition, the integrator 40 issues an attention attachment instruction to the attention adder 70. If the attention attachment condition is not met, no attention attachment instruction is issued to the attention adder 70. In the inference block 20[*j*], when an attention attachment instruction is issued, the attention adder 70 generates and outputs attention-attached data.

In the inference block 20[*j*], the attention-attached data output from the attention adder 70 includes attention information and the respective object detection data from the object detectors 30[1] to 30[*n*]. The attention information is associated with the respective object detection data from the object detectors 30[1] to 30[*n*]. That is, the attention information is attached to the respective object detection data from the object detectors 30[1] to 30[*n*] (in other words, to the results of the respective object detection processes by the object detectors 30[1] to 30[*n*]). The attention information serves as an indicator that suggests a possibility of the results of the object detection process containing an error.

In the inference block 20[*j*], based on the object detection data from the object detectors 30[1] to 30[*n*], the integrator 40 can generate inference result data as described previously by the method described previously. If the attention attachment condition is not met, based on the object detection data from the object detectors 30[1] to 30[*n*], the integrator 40 generates and outputs inference result data including class data and position/shape data on an integrated inference region by the method described in connection with the basic embodiment or the first embodiment (see FIG. 6).

If the attention attachment condition is met, the integrator 40 outputs "0" inference result data. The attention-attached data output from the attention adder 70 when attention attachment condition is met is fed to the data storer 50 (see FIG. 24). On receiving the attention-attached data, the data storer 50 sets attention retention data (see FIG. 26) that includes the image data of the input image IN from which the attention attachment instruction originates and the attention-attached data, and stores the attention retention data in the database DB.

Figure 26:
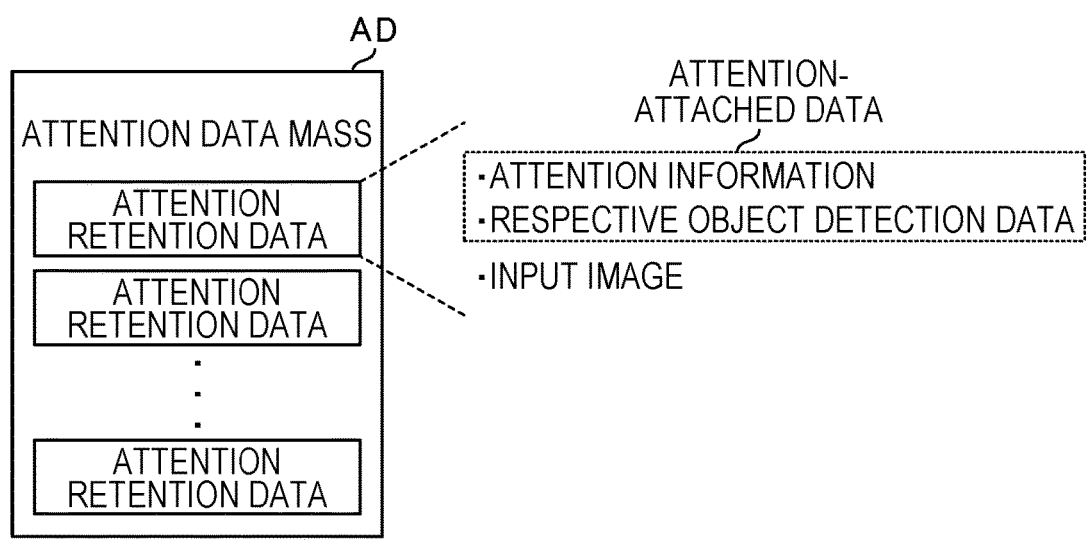
FIG. 26 is a configuration diagram of attention data mass stored in a database according to the second embodiment of the present invention.

FIG. 26 shows the structure of the attention retention data. A mass of data that comprises one or more sets of attention retention data will be referred to as attention data mass AD. The attention data mass AD is stored in the database DB (see FIG. 24). The database in which the learning data set DS is stored and the database in which the attention data mass AD is stored may be separate from each other.

Attention information serves as information for inquiring of a judge whether the result of an object detection process is correct. The judge is what is called an oracle in the field of machine learning. The judge is any human who answers such inquiries, and feeds the data processing apparatus 1A with answers to the inquiries via the interface 4. Specifically, the answer requester 72, by sending an inquiry to the judge via the interface 4, requests an answer. The answer from the judge is acquired as answer data 75 by the answer acquirer 74. On acquisition of the answer data 75, the data storer 50 performs a data complementing process. In the data complementing process, the data storer 50 creates a unit data set based on the image data of the input image in the attention retention data as well as the answer data 75, and includes the created unit data set in the learning data set DS.

The second embodiment includes Practical Examples EX2_1 to EX2_6 described below. Practical Examples EX2_1 to EX2_6 will deal with specific operation and other features in connection with the second embodiment. Unless inconsistent, any features described above in connection with the second embodiment apply to EX21 to EX2_6 described below. For any features of any practical example that contradict those described above in connection with the second embodiment, the description of those features given in connection with each practical example may prevail. Unless inconsistent, any features of any one of Practical Examples EX21 to EX2_6 can be applied to any other (i.e., any two or more of Practical Examples EX2_1 to EX2_6 may be implemented in combination).

Practical Example EX2_1

Practical Example EX2_1 will be described. Practical Example EX2_1 deals with a method according to the second embodiment with respect to a specific example of an input image IN. In the second embodiment, an attention information attachment function is executed in each inference block 20; except for differences among the image recognition models they use, the plurality of inference blocks 20 operate in a similar manner. Accordingly, with focus on one given inference block 20[*j*], the attention information attachment function and the functions associated with it will be described below.

Figure 27:
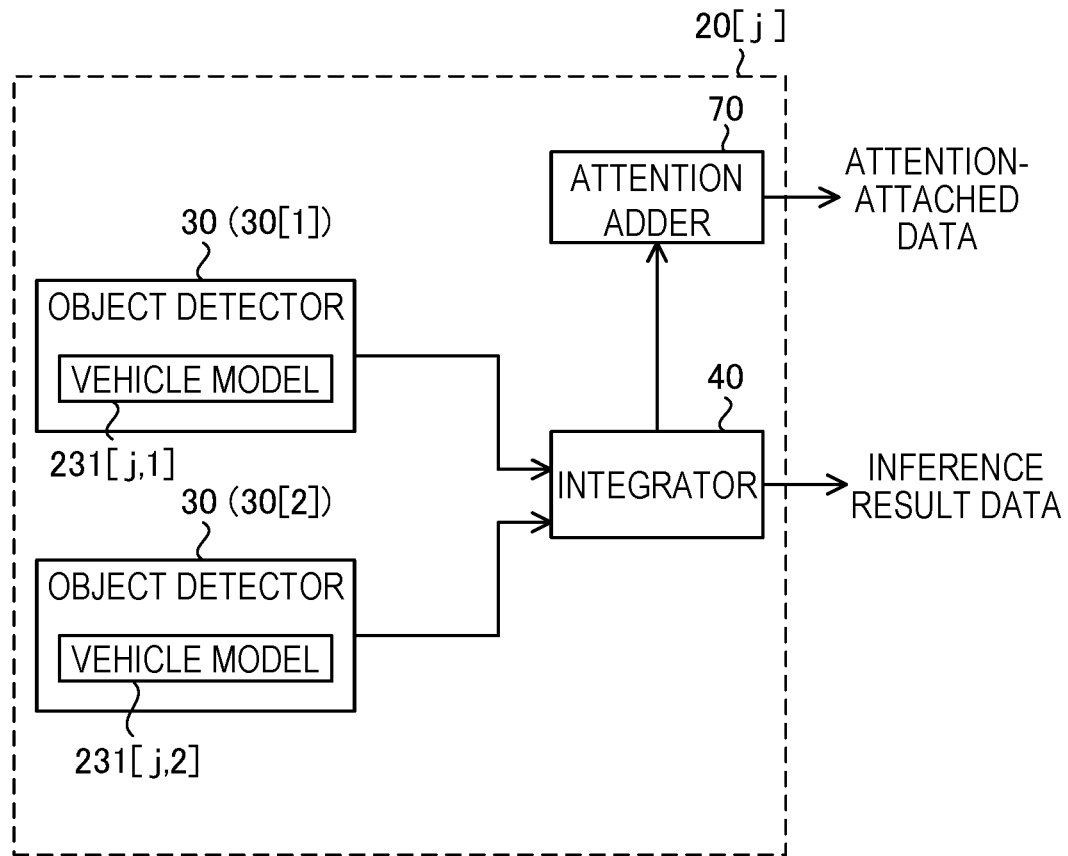
FIG. 27 is a functional block diagram of one inference block according to Practical Example EX2_1 belonging to the second embodiment of the present invention.

FIG. 27 is a functional block diagram of a principal part of the data processing apparatus 1A according to Practical Example EX2_1. In Practical Example EX2_1, it is assumed that, in the inference block 20[*j*], n=2 (FIG. 24). In Practical Example EX2_1, a single-class configuration is adopted.

In the inference block 20[*j*] according to Practical Example EX2_1, the image recognition model in the object detector 30[1] is a vehicle model 231[*j*, 1], and the image recognition model in the object detector 30[2] is a vehicle model 231[*j*, 2].

As mentioned earlier, a vehicle model (here, 231[*j*, 1] and 231[*j*, 2]) is a single-class image recognition model that deals only with a vehicle as a recognition target object. Accordingly, in the inference block 20[*j*] according to Practical Example EX2_1, the object detectors 30[1] and 30[2] are single-class object detectors that deals only with a vehicle as a recognition target object.

Figure 28:
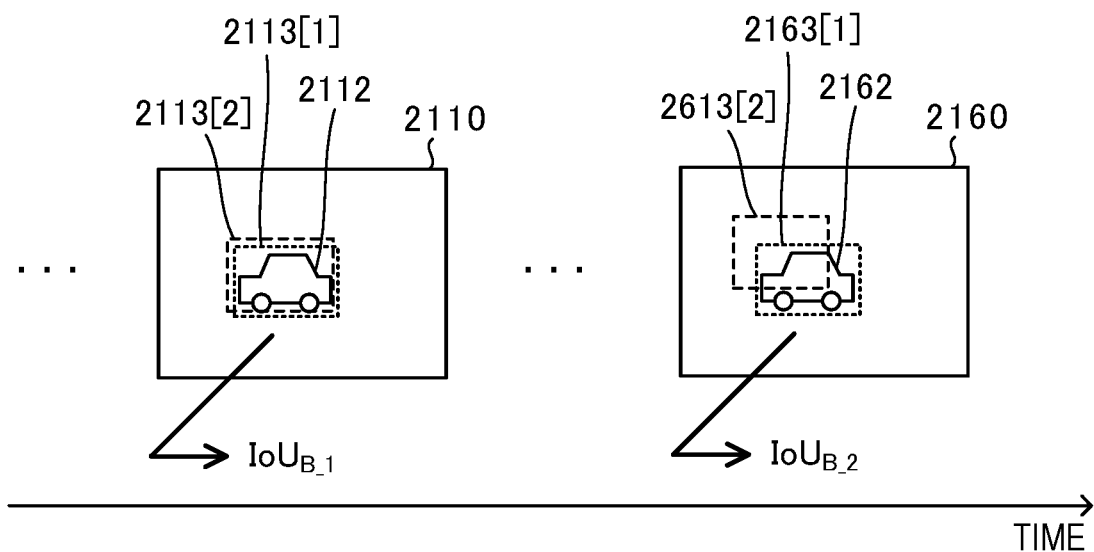
FIG. 28 is a diagram showing an example of a plurality of input images according to Practical Example EX2_1 belonging to the second embodiment of the present invention.

In the process of creating the learning data set DS, the image data of one input image IN after another is fed to each object detector 30, so that each object detector 30 performs an object detection process on each input image IN. FIG. 28 shows, as representatives, two input images 2110 and 2160. The input images 2110 and 2160 are each an example of an input image IN.

Figure 29:
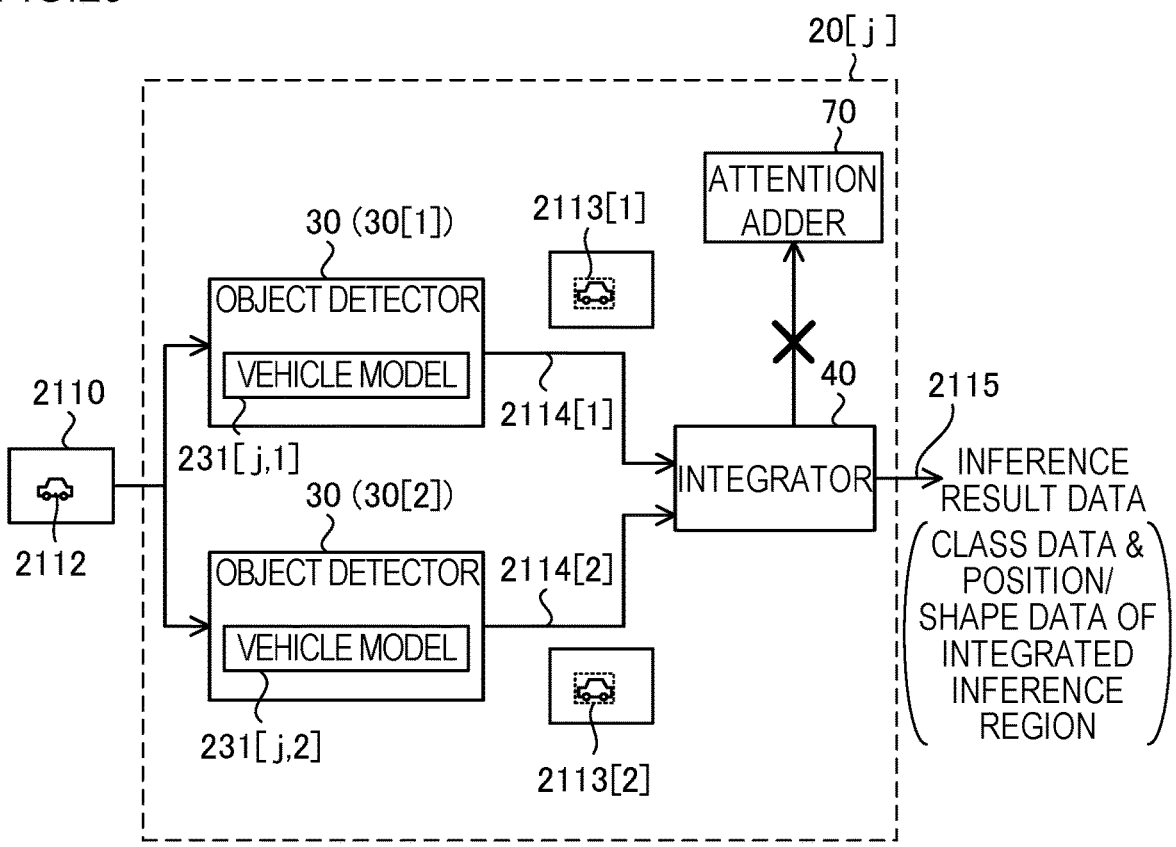
FIG. 29 is a diagram illustrating the operation of an inference block on one given input image according to Practical Example EX2_1 belonging to the second embodiment of the present invention.

Referring to FIG. 29, the operation of the inference block 20[*j*] with respect to the input image 2110 will be described. The input image 2110 includes an image of a vehicle 2112. In the inference block 20[*j*], the object detector 30[1] performs an object detection process using the vehicle model 231[*j*, 1] with respect to the input image 2110 to generate and output object detection data 2114[1]. The object detector 30[1] sets an object detection region 2113[1] in the input image 2110. The class data CLS in the object detection data 2114[1] indicates a vehicle. That is, the object detection data 2114[1] indicates that a vehicle is present in the object detection region 2113[1]. The object detection region 2113[1] corresponds to the detection region of the vehicle 2112 by the object detector 30[1].

In the inference block 20[*j*], the object detector 30[2] performs an object detection process using the vehicle model 231[*j*, 2] with respect to the input image 2110 to generate and output object detection data 2114[2]. The object detector 30[2] sets an object detection region 2113[2] in the input image 2110. The class data CLS in the object detection data 2114[2] indicates a vehicle. That is, the object detection data 2114[2] indicates that a vehicle is present in the object detection region 2113[2]. The object detection region 2113[2] corresponds to the detection region of the vehicle 2112 by the object detector 30[2].

The object detection regions 2113[1] and 2113[2] are regions that are set at completely or substantially the same position with completely or substantially the same shape. In FIG. 28, however, to distinguish the object detection regions 2113[1] and 2113[2] from each other, for convenience' sake, they are shown with a slight displacement.

In this example, it is assumed that the attention attachment condition is not met with respect to the object detection data 2114[1] and 2114[2]. Accordingly, the integrator 40 issues no attention attachment instruction for the input image 2110. For the input image 2110, the integrator 40 generates and outputs inference result data 2115 based on the object detection data 2114[1] and 2114[2]. The inference result data 2115 includes class data and the position/shape data of the integrated inference region. The data storer 50, by generating a unit data set based on the input image 2110 and the inference result data 2115 and storing it in the data base DB, adds the unit data set to the learning data set DS as part of it.

Figure 30:
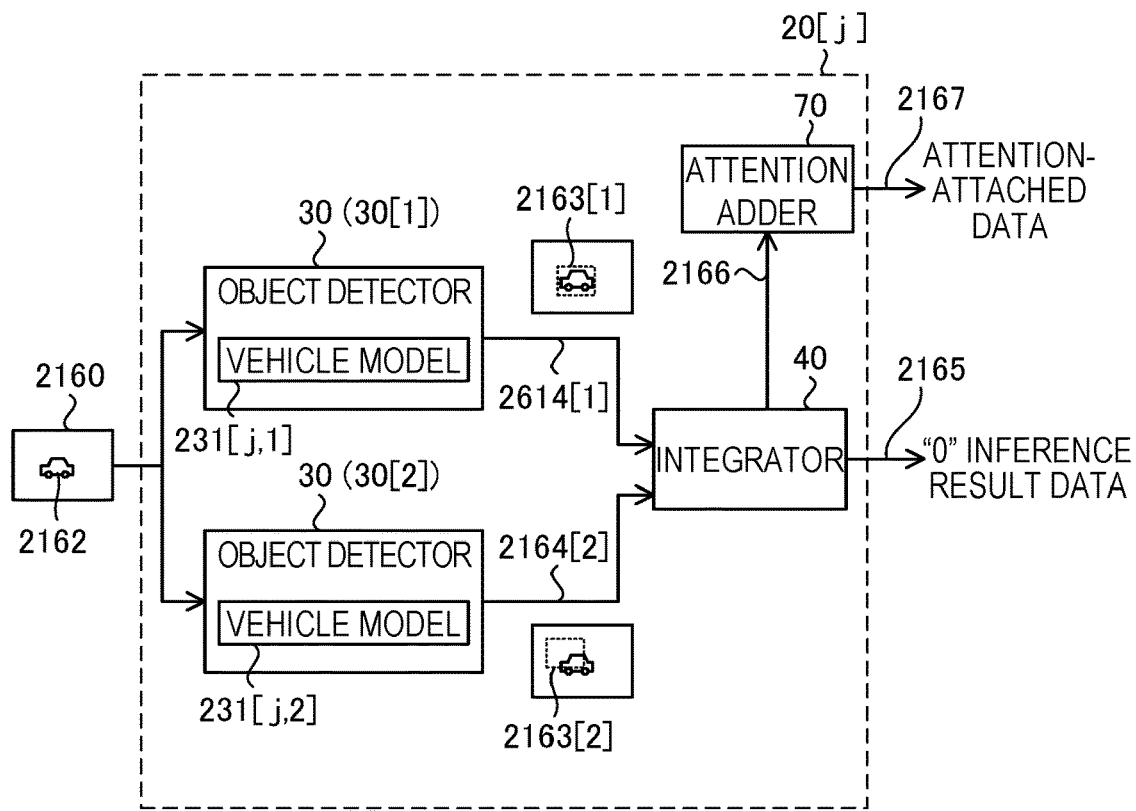
FIG. 30 is a diagram illustrating the operation of an inference block on another given input image according to Practical Example EX2_1 belonging to the second embodiment of the present invention.

Referring to FIG. 30, the operation of the inference block 20[j] on the input image 2160 will be described. The input image 2160 includes an image of a vehicle 2162. In the inference block 20[j], the object detector 30[1] performs an object detection process using the vehicle model 231[j, 1] with respect to the input image 2160 to generate and output object detection data 2164[1]. The object detector 30[1] sets an object detection region 2163[1] in the input image 2160. The class data CLS in the object detection data 2164[1] indicates a vehicle. That is, the object detection data 2164[1] indicates that a vehicle is present in the object detection region 2163[1]. The object detection region 2163[1] corresponds to the detection region of the vehicle 2162 by the object detector 30[1].

In the inference block 20[j], the object detector 30[2] performs an object detection process using the vehicle model 231[j, 2] with respect to the input image 2160 to generate and output object detection data 2164[2]. The object detector 30[2] sets an object detection region 2163[2] in the input image 2160. The class data CLS in the object detection data 2164[2] indicates a vehicle. That is, the object detection data 2164[2] indicates that a vehicle is present in the object detection region 2163[2]. The object detection region 2163[2] corresponds to the detection region of the vehicle 2162 by the object detector 30[2].

In this example, it is assumed that the attention attachment condition is met with respect to the object detection data 2164[1] and 2164[2]. Accordingly, the integrator 40 issues an attention attachment instruction 2166 for the input image 2160. In response to the issuance of the attention attachment instruction 2166, the attention adder 70 generates and outputs attention-attached data 2167. On the other hand, for the input image 2160, the integrator 40 generates and outputs inference result data 2165 based on the object detection data 2164[1] and 2164[2]. Since the attention attachment condition is met, however, the inference result data 2165 that is generated and output is "0" inference result data.

"0" inference result data is insignificant data. Accordingly, the data storer 50 generates no unit data set based on the input image 2160 and the inference result data 2165.

The integrator 40 judges whether the attention attachment condition is met based on an index IoU. FIG. 28 shows the object detection regions 2113[1] and 2113[2] set in the input image 2110, and also shows the object detection regions 2163[1] and 2163[2] set in the input image 2160. As mentioned above, each object detection region serves as a candidate for an integrated inference region (see FIG. 7).

For the input image 2110, the integrator 40 derives the index IoU between the object detection regions 2113[1] and 2113[2] as an index $IoU_{B\_1}$, and in accordance with the index $IoU_{B\_1}$ generates the inference result data 2115 (see FIG. 29). For the input image 2160, the integrator 40 derives the index IoU between the object detection regions 2163[1] and 2163[2] as an index $IoU_{B\_2}$, and in accordance with the index $IoU_{B\_2}$ generates the inference result data 2165 (see FIG. 30).

A description will now be given of a method of generating the inference result data 2115 in accordance with the index $IoU_{B\_1}$, and of the relationship between the inference result data 2115 and the learning data set DS, with reference to FIG. 29. In the inference block 20[j], the integrator 40 identifies, between the reliability SCR in the object detection data 2114[1] and the reliability SCR in the object detection data 2114[2], the higher reliability SCR, and sets the object detector 30 corresponding to the higher reliability SCR as a reference object detector 30. If the reliabilities SCR in the object detection data 2114[1] and 2114[2] are equal, the integrator 40 sets either of, or a previously defined one of the object detectors 30[1] and 30[2] as the reference object detector 30.

For the input image 2110, the integrator 40 compares the index $IoU_{B\_1}$ (see FIG. 28) with a predetermined overlap threshold value $IoU_{REF}$. Here, it is assumed that "$IoU_{B\_1} \geq IoU_{REF}$" is fulfilled. If the index (IoU) that is compared with the overlap threshold value $IoU_{REF}$ is equal to or higher than the overlap threshold value $IoU_{REF}$, the attention attachment condition is not met. Thus, for the input image 2110, the object detection data 2114[1] and 2114[2] do not meet the attention attachment condition. As mentioned above, the overlap threshold value $IoU_{REF}$ has a value more than zero but less than one (e.g., 0.8).

For the input image 2110, if the attention attachment condition is not met, the integrator 40 chooses the object detection data output from the reference object detector 30 as inference result data 2115. That is, the integrator 40 sets the class data CLS and the position/shape data PP in the object detection data from the reference object detector 30 as the class data and the position/shape data in the inference result data 2115 from the integrator 40.

Accordingly, for example, if for the input image 2110 the object detector 30[1] is set as the reference object detector 30, the class data CLS and the position/shape data PP in the object detection data 2114[1] are set as the class data and the position/shape data in the inference result data 2115. In this case, the object detection region 2113[1] is set as the integrated inference region. The class data in the inference result data 2115 is included, as class annotation information indicating that the object in the integrated inference region (2113[1]) is a vehicle, in the unit data set with respect to the input image 2110. In addition, the position/shape data in the inference result data 2115 is included, as region annotation information indicating the position and shape of the integrated inference region (2113[1]), in the unit data set with respect to the input image 2110 (and is eventually included in the learning data set DS).

By contrast, for example, if for the input image 2110 the object detector 30[2] is set as the reference object detector 30, the class data CLS and the position/shape data PP in the object detection data 2114[2] are set as the class data and the position/shape data in the inference result data 2115. In this case, the object detection region 2113[2] is set as the integrated inference region. The class data in the inference result data 2115 is included, as class annotation information indicating that the object in the integrated inference region (2113[2]) is a vehicle, in the unit data set with respect to the input image 2110. In addition, the position/shape data in the inference result data 2115 is included, as region annotation information indicating the position and shape of the integrated inference region (2113[2]), in the unit data set with respect to the input image 2110 (and is eventually included in the learning data set DS).

The operation connected with the input image 2160 will be described. For the input image 2160, the integrator 40 compares the index $IoU_{B\_2}$ (see FIG. 28) with a predetermined overlap threshold value $IoU_{REF}$. Here, it is assumed that "$IoU_{B\_2} < IoU_{REF}$" is fulfilled. If the index (IoU) that is compared with the overlap threshold value $IoU_{REF}$ is lower than the overlap threshold value $IoU_{REF}$, the attention attachment condition is met. Suppose now that, for the input image 2160, "$IoU_{B\_2} < IoU_{REF}$" is fulfilled and the object detection data 2164[1] and 2164[2] (see FIG. 30) meet the attention attachment condition.

Then, attention-attached data 2167 is generated that includes attention information and the object detection data 2164[1] and 2164[2]. The attention retention data that includes the attention-attached data 2167 and the image data of the input image 2160 is set and is stored in the data base DB (see FIGS. 24 and 26).

Figure 31:
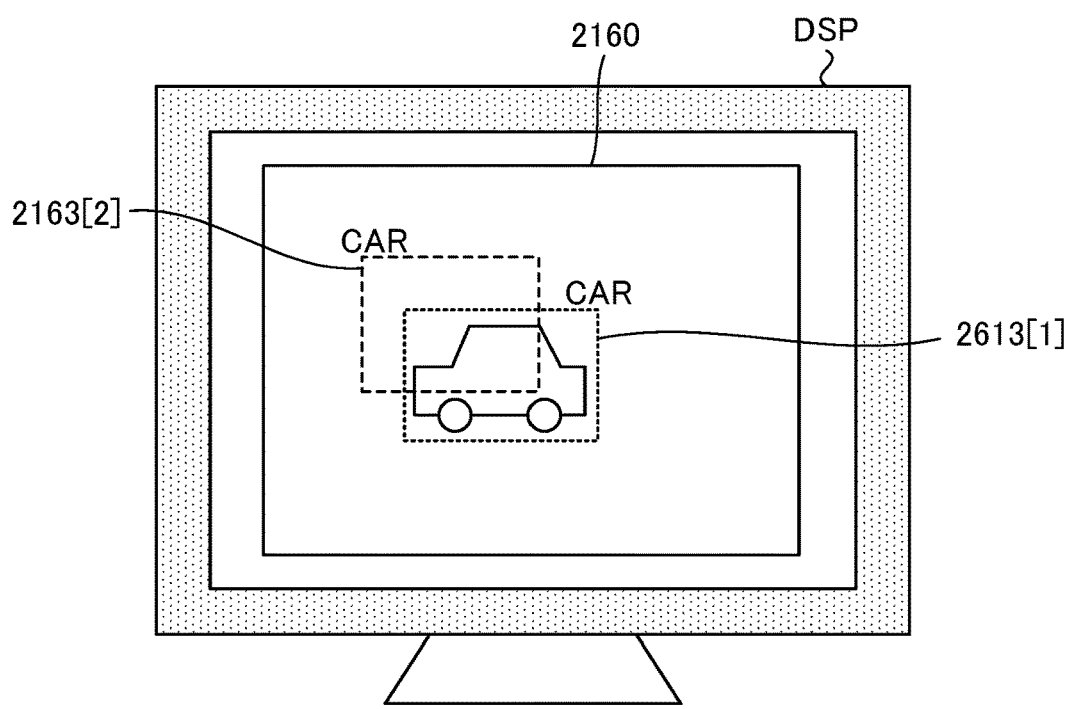
FIG. 31 is a diagram showing an example of what is displayed on a display device in connection with attachment of attention information according to Practical Example EX2_1 belonging to the second embodiment of the present invention.

Thereafter, at a given timing, the answer requester 72 reads the attention retention data from the data base DB, and using the data so read, inquires of the judge whether the results of the object detection processes by the object detectors 30 with respect to the input image 2160 are correct. For example, as shown in FIG. 31, on a display device DSP included in the interface 4, the answer requester 72 displays the input image 2160 along with, superimposed on it, the object detection regions 2163[1] and 2163[2] based on the object detection data 2164[1] and 2164[2]. The answer requester 72 also displays the class data CLS in the object detection data 2164[1] and 2164[2] in association with the object detection regions 2163[1] and 2163[2]. While those are displayed, the answer requester 72 inquires of the judge whether the results of the object detection processes are correct; that is, it inquires which of the object detection regions 2163[1] and 2163[2] is the correct one as a region where a vehicle is present.

The judge can, using a pointing device or the like in the interface 4, choose either of the object detection regions 2163[1] and 2163[2] as the correct-answer region. If the object detection region 2163[1] is chosen as the correct-answer region, answer data 75 to that effect is acquired by the answer acquirer 74, and the data storer 50 performs a data complementing process based on the answer data 75. In the data complementing process, the data storer 50 creates a unit data set based on the image data of the input image 2160 in the attention retention data and the just-mentioned answer data 75, and includes the created unit data set in the learning data set DS. In the data complementing process, the position/shape data of the object detection region 2163[1] as the correct-answer data (i.e., the position/shape data in the object detection data 2164[1]) is, as region annotation information, included in the unit data set with respect to the input image 2160. In the data complementing process, also class annotation information indicating that the object in the object detection region 2163[1] as the correct-answer region is a vehicle is included in the unit data set with respect to the input image 2160.

A similar process is performed when the object detection region 2163[2] is chosen as the correct-answer region. Instead of choosing either of the object detection regions 2163[1] and 2163[2], the judge can specify a correct-answer region anew. In that case, the position/shape data of the specified correct-answer region is, as region annotation information, included in the unit data set with respect to the input image 2160. If the class data CLS in the object detection data 2164[1] or 2164[2] contains an error, the judge can specify also the class data of the correct-answer region. In that case, class annotation information based on the specified class data is included in the unit data set with respect to the input image 2160.

A modification is possible (hereinafter referred to as Modification MD2) in which, even if the index (IoU) that is compared with the overlap threshold value $IoU_{REF}$ is lower than the overlap threshold value $IoU_{REF}$, if the reliability SCR derived by the reference object detector 30 is equal to or higher than the reference reliability $SCR_{REF}$, it is judged that the attention attachment condition is not met. As described above, the reference reliability $SCR_{REF}$ has a value higher than zero but lower than one (e.g., 0.6). The reliability SCR derived by the reference object detector 30 will be identified by the symbol "$SCR_{MAX}$".

Specifically, in a case where Modification MD2 is adopted, for the input image 2110, the fulfillment of "$IoU_{B\_1} \geq IoU_{REF}$" leads to the object detection data 2114[1] and 2114[2] not fulfilling the attention attachment condition; or the fulfillment of "$IoU_{B\_1} < IoU_{REF}$" plus "$SCR_{MAX} \geq SCR_{REF}$" leads to the object detection data 2114[1] and 2114[2] not fulfilling the attention attachment condition. As a result, while inference result data 2115 including class data and position/shape data of the integrated inference region is generated, no attention attachment instruction is issued (see FIG. 29). In a case where Modification MD2 is adopted, for the input image 2160, the fulfillment of "$IoU_{B\_2} < IoU_{REF}$ "plus" $SCR_{MAX} < SCR_{REF}$" leads to the object detection data 2164[1] and 2164[2] fulfilling the attention attachment condition. As a result, while "0" inference result data 2165 is generated, an attention attachment instruction 2166 is issued and thus attention-attached data 2167 is generated (see FIG. 30).

As will be understood from the foregoing, the data complementing process is performed only on an input image IN (in the example described above, the input image 2160) that invokes attachment of attention information. Accordingly, if attention information is attached to the results of the object detection processes on the particular input image IN (2160) included in a plurality of input images IN, the data complementing process is performed with respect to the particular input image IN (2160). In this data complementing process, a unit data set based on the particular input image IN (2160) and the answer data 75 is generated and is included in the learning data set DS.

As described above, with respect to a single object, a plurality of image recognition models with different detection algorithms and other characteristics are applied, and the results they yield are integrated together. Meanwhile, a high degree of overlap among the plurality of object detection regions obtained using the plurality of image recognition models suggests a comparatively high likelihood of the recognition results of those image recognition models (in other words, the detection results of the object detection processes) being correct. By contrast, a low degree of overlap suggests a comparatively high likelihood of the recognition results of those image recognition models (in other words, the detection results of the object detection processes) containing an error. Out of these considerations, the index IoU representing the degree of overlap is derived, and in accordance with the degree of overlap (IoU), inference result data is generated. In this way, it is possible to generate inference result data with few errors. By generating the learning data set DS using inference result data with few errors, it is possible to obtain a high-quality learning data set DS. Moreover, a scheme is introduced in which confirmation by human operation is requested by attaching attention information in a case where, as when a low degree of overlap is derived, image recognition results are likely to contain an error. In this way, even if the degree of overlap is low, it is possible, by human operation, to expand the learning data set DS in quantity while keeping satisfactory quality. Since not all the input images IN require confirmation by human operation, the burden of human operation is not very great.

Practical Example EX2_2

Practical Example EX2_2 will be described. In Practical Example EX2_1, it is assumed that n=2 and, as mentioned above, n may have any value of 2 or more. In Practical Example EX2_2, the technology described above in connection with Practical Example EX2_1 is generalized. In Practical Example EX2_2, a single-class configuration is adopted.

Figure 32:
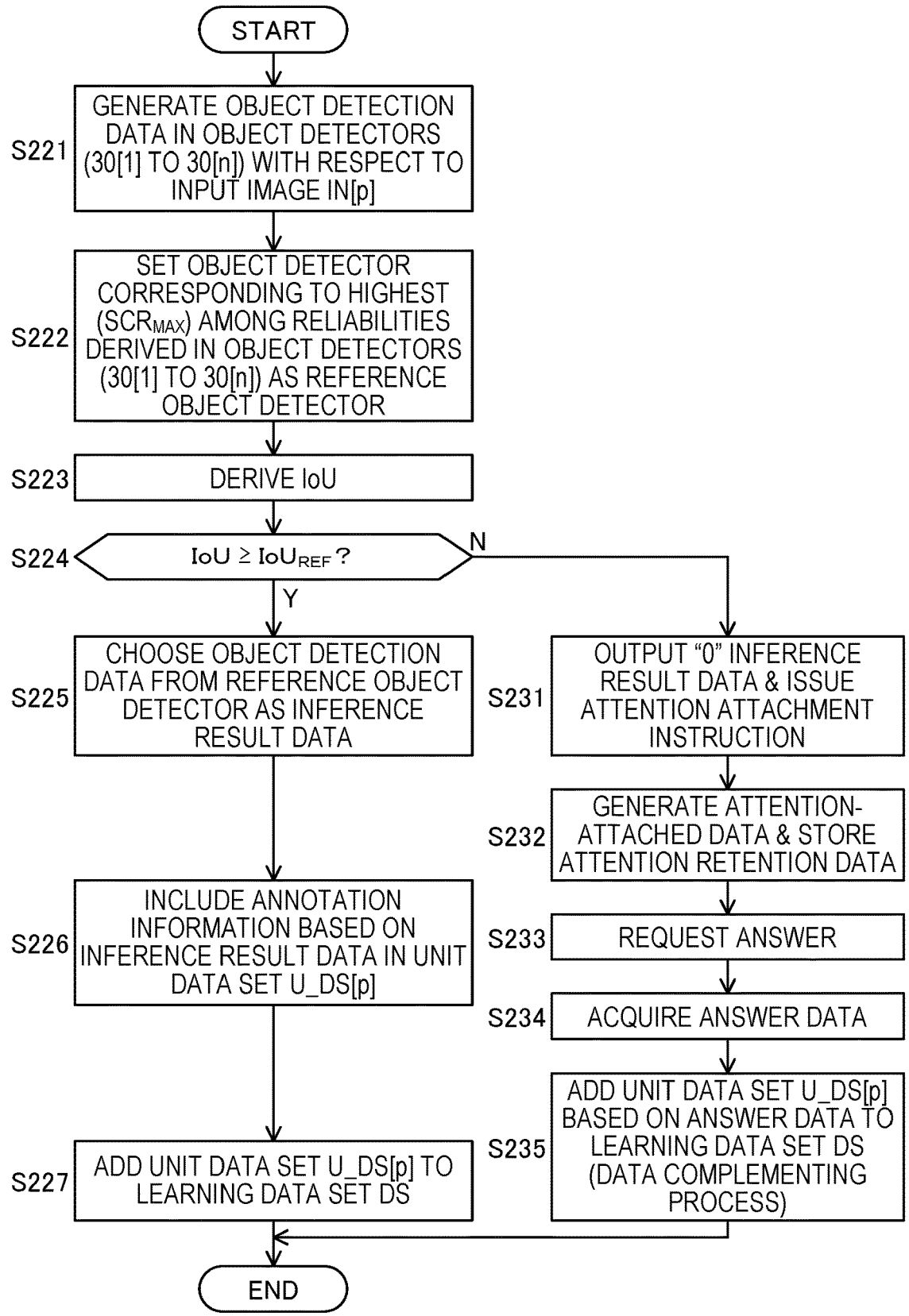
FIG. 32 is an operation flow chart of a data processing apparatus in connection with generation of inference result data and updating of a learning data set according to Practical Example EX2_2 belonging to the second embodiment of the present invention.

FIG. 32 is an operation flow chart of the data processing apparatus 1A according to Practical Example EX2_2. It should be noted that the unit procedure comprising steps S221 to S227 and S231 to S235 in FIG. 32 is the procedure that is performed for one input image IN[p](see FIG. 8). The unit procedure is performed for each input image IN. Of the unit procedure, those operations which are performed within one inference block 20 are performed for each inference block 20 in the data processing apparatus 1A.

First, at step S221, in the inference block 20[j], the object detectors 30[1] to 30[n] perform object detection processes on the input image IN[p] to generate n sets of object detection data. Here, it is assumed that each object detector 30 sets one object detection region in one input image IN[p]. If, in the inference block 20[j], no object detection region is set in the input image IN[p], the inference block 20[j] ends its operation on the input image IN[p] without continuing with the rest of the procedure.

Subsequently to step S221, at step S222, in the inference block 20[j], the integrator 40 sets, based on the reliabilities SCR derived (generated) in the object detectors 30[1] to 30[n], one of the object detectors 30[1] to 30[n] as a reference object detector 30. How the reference object detector 30 is set has been described previously; that is, of the object detectors 30[1] to 30[n], the object detector 30 that derives the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S222, at step S223, in the inference block 20[j], the integrator 40 derives the index IoU of a total of n object detection regions set in the object detectors 30[1] to 30[n]. Subsequently, at step S224, the integrator 40 in the inference block 20[j] checks whether the derived index IoU is equal to or higher than the overlap threshold value $IoU_{REF}$. If "$IoU \geq IoU_{REF}$" is fulfilled (step S224, "Y"), an advance is made to step S225; if "$IoU \geq IoU_{REF}$" is not fulfilled (step S224, "N"), an advance is made to step S231. In the operation flow chart in FIG. 32, whether "$IoU \geq IoU_{REF}$" is fulfilled alone determines whether the attention attachment condition is met. Specifically, in the operation flow chart in FIG. 32, if "$IoU \geq IoU_{REF}$" is fulfilled, the attention attachment condition is not met, and if "$IoU \geq IoU_{REF}$" is not fulfilled, the attention attachment condition is met.

At step S225, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. After step S225, the operations at steps S226 and 227 are performed. At step S226, annotation information based on the inference result data from the integrator 40 in the inference block 20[j] is, as annotation information on the input image IN[p], included in the unit data set U_DS[p]. Then, at step S227, the unit data set U_DS[p] is added to the learning data set DS.

At step S231, in the inference block 20[j], the integrator 40 outputs "0" inference result data and issues an attention attachment instruction to the attention adder 70. In a case where step S231 is reached, the inference result data from the integrator 40 in the inference block 20[j] is not included in the unit data set U_DS[p] with respect to the input image IN[p](in other words, it is excluded from the unit data set U_DS[p]), and thus is not reflected in the learning data set DS. However, through the operations at steps S232 to S235, a unit data set U_DS[p] that is correct or is expected to be correct is generated by human operation.

Specifically, subsequently to step S231, at step S232, the attention adder 70 generates attention-attached data, and attention retention data based on the attention-attached data is stored in the data base DB by the data storer 50. The attention-attached data with respect to the input image IN[p] includes attention data and the object detection data output from the object detectors 30 in the inference block 20[j] with respect to the input image IN[p] (see FIG. 25). The attention retention data with respect to the input image IN[p] includes the attention-attached data with respect to the input image IN[p] and the image data of the input image IN[p](see FIG. 26). After step S232, an advance is made to step S233. In a case where the operations at steps S233 to S235 are performed, the operations at steps S233 to S235 may be performed at any timing after the operation at step S232 is performed.

At step S233, the answer requester 72 reads the attention retention data from the data base DB, and using the data so read, inquires of the judge whether the results of the object detection processes by the object detectors 30 with respect to the input image IN[p] are correct. The inquiry may be made in any manner; it can be made, for example, through display as described in connection with Practical Example EX2_1.

Subsequently, at step S234, the judge answers to the inquiry, and data indicating the answer is acquired as answer data 75 by the answer acquirer 74. For example, the judge can, using a pointing device or the like in the interface 4, select one of the object detection regions set in the input image IN[p] by the object detectors 30[1] to 30[n] as the correct-answer region.

When the answer data 75 is acquired, then at step S235, the data storer 50 performs a data complementing process based on the answer data 75. That is, at step S235, the data storer 50 creates a unit data set U_DS[p] based on the image data of the input image IN[p] in the attention retention data and the just-mentioned answer data 75, and includes the created unit data set U_DS[p] in the learning data set DS.

The unit data set U_DS[p] created in the data complementing process includes, as region annotation information, the position/shape data of the object detection region as the correct-answer region. The unit data set U_DS[p] created in the data complementing process includes, as class annotation information, the class data of the object in the object detection region as the correct-answer region. The class annotation information is in principle determined based on the class data in the attention retention data, and is, if this contains an error, determined according to the answer data 75.

Instead of selecting a correct-answer region, the judge can specify a correct-answer region anew. In that case, the position/shape data of the specified correct-answer region is, as region annotation information, included in the unit data set U_DS[p] with respect to the input image IN[p]. If the class data CLS in the object detection data contains an error, the judge can specify also the class data of the correct-answer region. In that case, class annotation information based on the specified class data is included in the unit data set U_DS[p] with respect to the input image IN[p].

As described above, the inference block 20[j] (integrator 40) can identify the maximum reliability $SCR_{MAX}$ among a plurality of reliabilities SCR (n reliabilities SCR) derived through a plurality of object detection processes in the object detectors 30[1] to 30[n](step S222). The plurality of object detection regions set in the object detectors 30[1] to 30[n] correspond to candidates for an integrated inference region, and each object detection region can be called a candidate region (see FIG. 7). After the operations at steps S221 to S223 are gone through, at step S224, the degree of overlap (IoU) among the plurality of candidate regions is evaluated. Then, if "IoU≥$IoU_{REF}$" is fulfilled, the inference block 20[j] (integrator 40) generates inference result data based on the object detection data corresponding to the maximum reliability $SCR_{MAX}$ (i.e., the object detection data from the reference object detector 30 that derives the maximum reliability $SCR_{MAX}$) (step S255). By contrast, if "IoU≥$IoU_{REF}$" is not fulfilled, the inference block 20[j] (integrator 40) attaches attention information to the results of the object detection processes by the object detectors 30 (i.e., to the respective object detection data). The generation of attention-attached data at step S232 corresponds to attachment of attention information to the results of the object detection processes (to the respective object detection data) (see FIG. 25).

Figure 33:
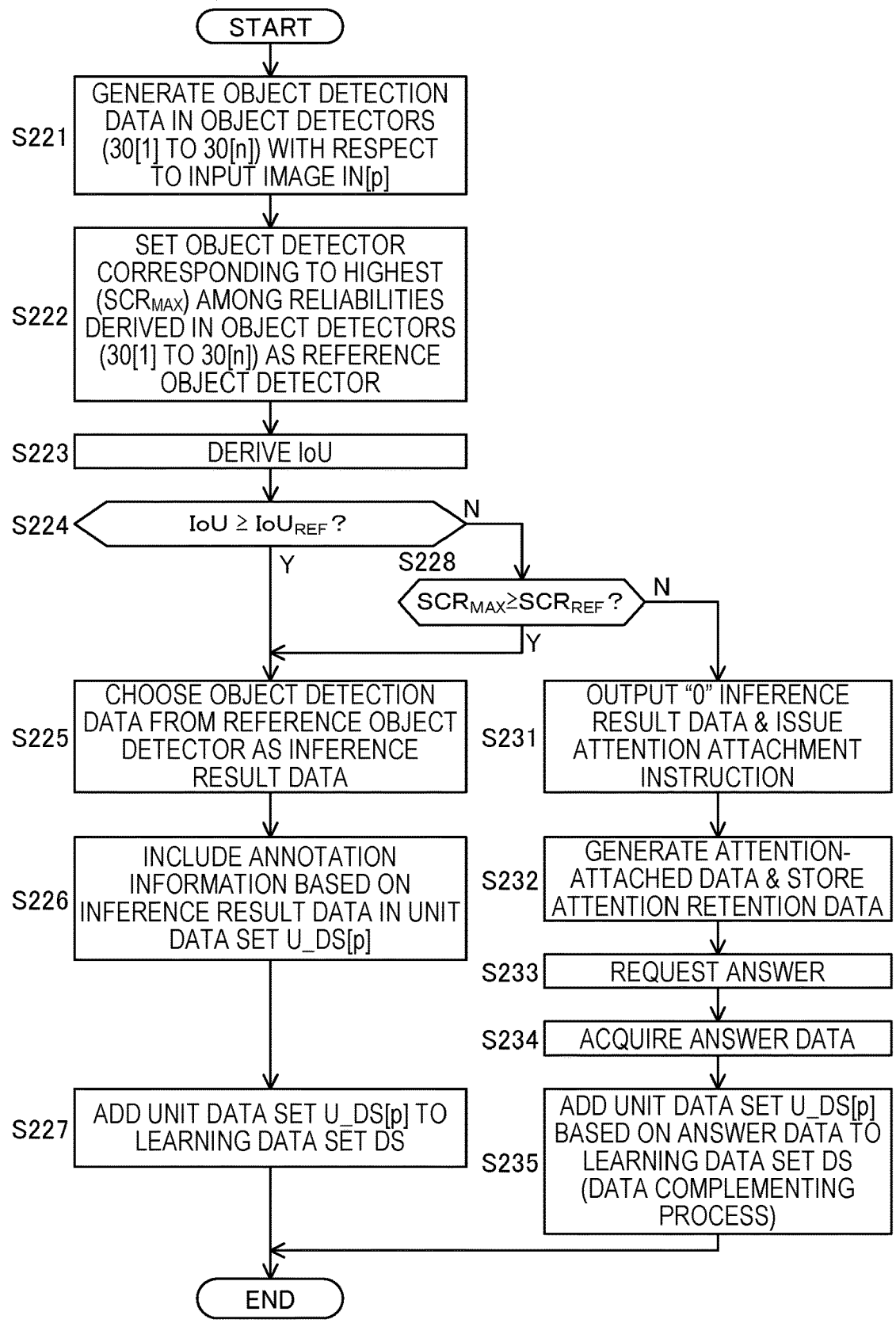
FIG. 33 is a modified operation flow chart of a data processing apparatus in connection with generation of inference result data and updating of a learning data set according to Practical Example EX2_2 belonging to the second embodiment of the present invention.

Modification MD2 described above may be applied to the operation flow chart in FIG. 32. Doing so modifies the operation flow chart in FIG. 32 to the operation flow chart in FIG. 33. With Modification MD2 applied, in the flow chart in FIG. 33, if "IoU≥$IoU_{REF}$" is not fulfilled (step S224, "N"), a jump is made from step S224 to step S228.

At step S228, the integrator 40 in the inference block 20[j] checks whether the reliability $SCR_{MAX}$ is equal to or higher than the reference reliability $SCR_{REF}$. If "$SCR_{MAX}$≥$SCR_{REF}$" is fulfilled (step S228, "Y"), an advance is made to step S225, where the operations at steps S225 to S227 described above are performed; if "$SCR_{MAX}$≥$SCR_{REF}$" is not fulfilled (step S228, "N"), an advance is made to step S231, where the operations at steps S231 to S235 described above are performed. In the operation flow chart in FIG. 33, if "IoU≥$IoU_{REF}$" is fulfilled, or if "IoU<$IoU_{REF}$" and "$SCR_{MAX}$≥$SCR_{REF}$" are both fulfilled, the attention attachment condition is not met. In the operation flow chart in FIG. 33, only if both "IoU<$IoU_{REF}$" and "$SCR_{MAX}$<$SCR_{REF}$" are fulfilled, the attention attachment condition is met.

There may be a case where, in the inference block 20[j], through object detection processes on the input image IN[p], object detection regions are set only in some object detectors 30 among the object detectors 30[1] to 30[n] (for convenience' sake, referred to as case $CS_{B21}$ in the following description). In case $CS_{B21}$, only some object detectors 30 among the object detectors 30[1] to 30[n] output object detection data that includes class data CLS, position/shape data PP, and a reliability SCR, and the rest of the object detectors 30 output "0" object detection data. In case $CS_{B21}$, with respect to the input image IN[p], an advance may always be made to step S231. This is because, in case $CS_{B21}$, the result of the object detection process by at least one of the object detectors 30[1] to 30[n] contains an error (which can be detection failure).

In case $CS_{B21}$, if object detection regions are set in two or more object detectors 30 in the inference block 20[j], then at step S222, the reference object detector 30 may be selected and set by the method described above out of those two or more object detectors 30. In that case, at step S223, the IoU of the two or more object detection regions set by the two or more object detectors 30 may be derived, and thereafter the operations at step S224 and the following steps in FIG. 32 or 33 may be performed.

Practical Example EX2_3

Practical Example EX2_3 will be described. In Practical Example EX2_3, a multi-class configuration is adopted. The technology described above in connection with Practical Examples EX2_1 and EX2_2 can be applied to a multi-class configuration, and a practical example where the technology is applied to a multi-class configuration will be described as Practical Example EX2_3.

Figure 34:
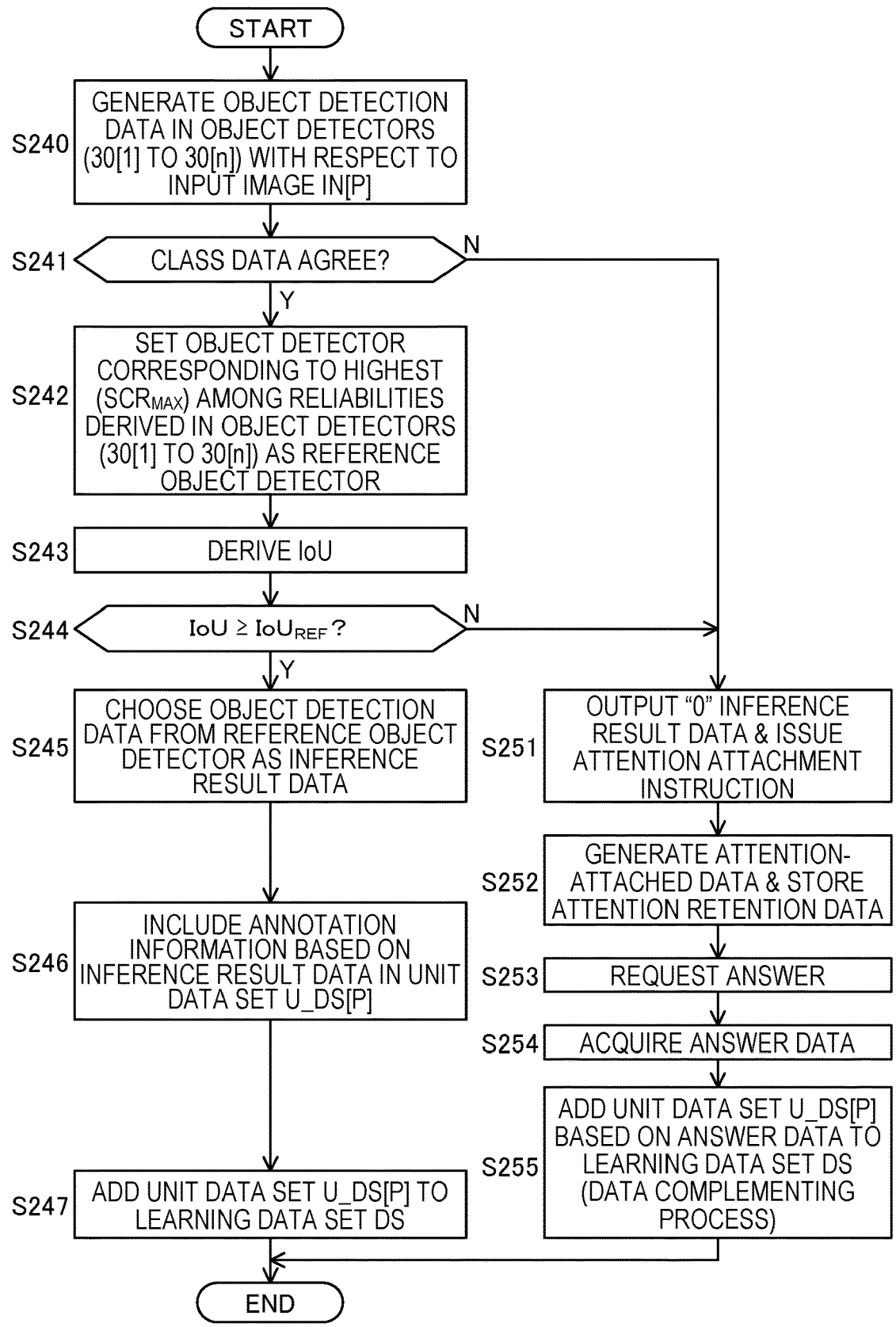
FIG. 34 is an operation flow chart of a data processing apparatus in connection with generation of inference result data and updating of a learning data set according to Practical Example EX2_3 belonging to the second embodiment of the present invention.

FIG. 34 is an operation flow chart of the data processing apparatus 1A according to Practical Example EX2_3. It should be noted that the unit procedure comprising steps S240 to S247 and S251 to S255 in FIG. 32 is the procedure that is performed for one input image IN[p](see FIG. 8). The unit procedure is performed for each input image IN. Of the unit procedure, those operations which are performed within one inference block 20 are performed for each inference block 20 in the data processing apparatus 1A.

First, at step S240, in the inference block 20[j], the object detectors 30[1] to 30[n] perform object detection processes on the input image IN[p] to generate n sets of object detection data. After step S240, an advance is made to step S241. Here, it is assumed that each object detector 30 sets one object detection region in one input image IN[p]. Under this assumption, the object detectors 30[1] to 30[n] set a total of n object detection regions in the input image IN[p]. If, in the inference block 20[j], no object detection region is set in the input image IN[p], the inference block 20[j] ends its operation on the input image IN[p] without continuing with the rest of the procedure.

At step S241, in the inference block 20[j], the integrator 40 checks whether the class data CLS on the total of n object detection regions set by the object detectors 30[1] to 30[n] agree. If the class data CLS on the total of n object detection regions agree (step S241, "Y"), an advance is made to step S242; otherwise (step S241, "N"), an advance is made to step S251.

For example, in a case where n=2, if the class data CLS on the two object detection regions set in the object detectors 30[1] and 30[2] both indicate a vehicle, an advance is made to step S242. This corresponds to the object detectors 30[1] and 30[2] both recognizing the objects in the object detection regions to be a vehicle. By contrast, in a case where n=2, if the class data CLS on the object detection region set in the object detector 30[1] indicates a vehicle while the class data CLS on the object detection region set in the object detector 30[2] indicates a human, an advance is made to step S251. This corresponds to the object detectors 30[1] and 30[2] recognizing an object common to them to be a vehicle and a human respectively. In this case, the result of the object detection process by at least one of the object detectors 30[1] and 30[2] contains an error. Since it is undesirable to mix an erroneous result of an object detection process in the learning data set DS, at step S251, an attention attachment instruction is issued.

At step S242, in the inference block 20[j], the integrator 40 sets, based on the reliabilities SCR derived (generated) in the object detectors 30[1] to 30[n], one of the object detectors 30[1] to 30[n] as a reference object detector 30. How the reference object detector 30 is set has been described previously; that is, of the object detectors 30[1] to 30[n], the object detector 30 that derives the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S242, at step S243, in the inference block 20[j], the integrator 40 derives the index IoU of the total of n object detection regions set in the object detectors 30[1] to 30[n]. Subsequently, at step S244, the integrator 40 in the inference block 20[j] checks whether the derived index IoU is equal to or higher than the overlap threshold value $IoU_{REF}$. If "$IoU \geq IoU_{REF}$" is fulfilled (step S244, "Y"), an advance is made to step S245; if "$IoU \geq IoU_{REF}$" is not fulfilled (step S244, "N"), an advance is made to step S251.

The operations at steps S245 to 247 are the same as the operations at steps S225 to S227 (see FIG. 32 or 33) described in connection with Practical Example EX2_2. That is, at step S245, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. After step S245, the operations at steps S246 and 247 are performed. At step S246, annotation information based on the inference result data from the integrator 40 in the inference block 20[j] is, as annotation information on the input image IN[p], included in the unit data set U_DS[p]. Then, at step S247, the unit data set U_DS[p] is added to the learning data set DS.

In a case where step S251 is reached, the operations at steps S251 to S255 are performed sequentially. The operations at steps S251 to S255 are the same as the operations at steps S231 to S235 (see FIG. 32 or 33) described in connection with Practical Example EX2_2, and for steps S221 to S235, the description given in connection with Practical Example EX2_2 applies to Practical Example EX2_3.

Specifically, at step S251, in the inference block 20[j], the integrator 40 outputs "0" inference result data and issues an attention attachment instruction to the attention adder 70. In a case where step S251 is reached, the inference result data from the integrator 40 in the inference block 20[j] is not included in the unit data set U_DS[p] with respect to the input image IN[p] (in other words, it is excluded from the unit data set U_DS[p]), and thus is not reflected in the learning data set DS. Subsequently, at step S252, the attention adder 70 generates attention-attached data, and attention retention data based on the attention-attached data is stored in the data base DB by the data storer 50 (see FIGS. 24 to 26).

Thereafter, at step S253, the answer requester 72 reads the attention retention data from the data base DB, and using the data so read, inquires of the judge whether the result of the object detection process by each object detector 30 with respect to the input image IN[p] is correct. Subsequently, at step S254, the judge answers to the inquiry, and data indicating the answer is acquired as answer data 75 by the answer acquirer 74. When the answer data 75 is acquired, then at step S255, the data storer 50 performs a data complementing process based on the answer data 75. That is, at step S255, the data storer 50 creates a unit data set U_DS[p] based on the image data of the input image IN[p] in the attention retention data and the just-mentioned answer data 75, and includes the created unit data set U_DS[p] in the learning data set DS.

As described above, the inference block 20[j] (integrator 40) can identify the maximum reliability $SCR_{MAX}$ among a plurality of reliabilities SCR (n reliabilities SCR) derived through a plurality of object detection processes in the object detectors 30[1] to 30[n](step S242). A plurality of object detection regions in which, through the plurality of object detection processes, objects of the same kind are judged to be present (i.e., the plurality of object detection regions set when an advance is made to step S242) correspond to candidates for an integrated inference region, and each object detection region can be called a candidate region (see FIG. 7). If the class data of the plurality of object detection regions agree, it means that the plurality of object detection regions in which objects of the same kind are judged to be present serve as a plurality of candidate regions; thus if the class data of the plurality of object detection regions agree, an advance is made from step S241 to step S242. After the operations at steps S242 and S243 are gone through, at step S244, the degree of overlap (IoU) among the plurality of candidate regions is evaluated. Then, if "$IoU \geq IoU_{REF}$" is fulfilled, the inference block 20[j](integrator 40) generates inference result data based on the object detection data corresponding to the maximum reliability $SCR_{MAX}$ (i.e., the object detection data from the reference object detector 30 that derives the maximum reliability $SCR_{MAX}$) (step S245). By contrast, if "$IoU \geq IoU_{REF}$" is not fulfilled, the inference block 20[j] (integrator 40) attaches attention information to the results of the object detection processes by the object detectors 30 (i.e., to the respective object detection data). The generation of attention-attached data at step S252 corresponds to attachment of attention information to the results of the object detection processes (i.e., to the respective object detection data) (see FIG. 25).

Modification MD2 described above may be applied to the operation flow chart in FIG. 34. Doing so modifies the operation flow chart in FIG. 34 to the flow chart in FIG. 35. With Modification MD2 applied, in the flow chart in FIG. 35, if "$IoU \geq IoU_{REF}$" is not fulfilled (step S244, "N"), a jump is made from step S244 to step S248.

At step S248, the integrator 40 in the inference block 20[j] checks whether the reliability $SCR_{MAX}$ is equal to or higher than the reference reliability $SCR_{REF}$. If "$SCR_{MAX} \geq SCR_{REF}$" is fulfilled (step S248, "Y"), an advance is made to step S245, where the operations at steps S245 to S247 described above are performed; if "$SCR_{MAX} \geq SCR_{REF}$" is not fulfilled (step S248, "N"), an advance is made to step S251, where the operations at steps S251 to S255 described above are performed. In the operation flow chart in FIG. 35, if "IoU≥IoU$_{REF}$" is fulfilled, or if "IoU<IoU$_{REF}$ "and" SCR$_{MAX}$≥SCR$_{REF}$" are both fulfilled, the attention attachment condition is not met. In the operation flow chart in FIG. 35, only if both "IoU<IoU$_{REF}$"and" SCR$_{MAX}$<SCR$_{REF}$" are fulfilled, the attention attachment condition is met.

There may be a case where, in the inference block 20[j], through object detection processes on the input image IN[p], object detection regions are set only in some object detectors 30 among the object detectors 30[1] to 30[n] (for convenience' sake, referred to as case CS$_{B31}$ in the following description). In case CS$_{B31}$, only some object detectors 30 among the object detectors 30[1] to 30[n] output object detection data that includes class data CLS, position/shape data PP, and a reliability SCR, and the rest of the object detectors 30 output "0" object detection data. In case CS$_{B31}$, with respect to the input image IN[p], an advance may always be made to step S251. This is because, in case CS$_{B31}$, the result of the object detection process by at least one of the object detectors 30[1] to 30[n] contains an error (which can be detection failure).

In case CS$_{B31}$, however, if object detection regions are set in two or more object detectors 30 in the inference block 20[j], and in addition if the two or more sets of class data CLS output from the two or more object detectors 30 agree, then an advance is made to step S242. In that case, at step S242, the reference object detector 30 can be selected and set by the method described above out of those two or more object detectors 30. Then, at step S243, the IoU of the two or more object detection regions set by the two or more object detectors 30 may be derived, and thereafter the operations at step S244 and the following steps in FIG. 34 or 35 may be performed.

Practical Example EX2_4

Practical Example EX2_4 will be described. In Practical Example EX2_4, it is assumed that, typically, a single-class configuration is adopted (though a multi-class configuration may be adopted). The data processing apparatus 1A has the advantages of easy expansion of model functions and easy addition of training data with respect to a new kind of object to the learning data set DS. These aspects are as discussed in connection with Practical Example EX1_4, and Practical Example EX1_4 described above can be applied to the data processing apparatus 1A according to the second embodiment.

Figure 36:
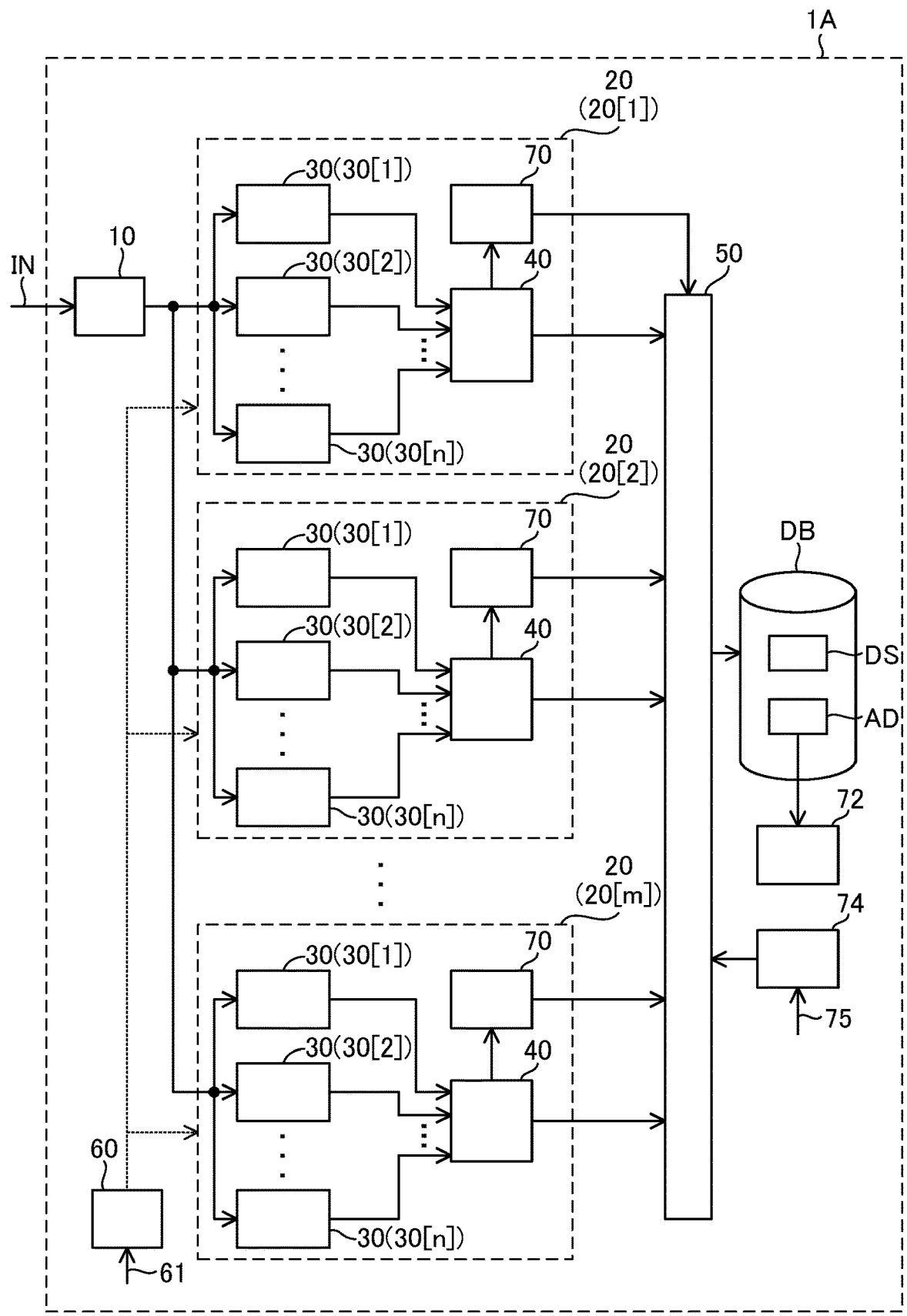
FIG. 36 is a functional block diagram of a data processing apparatus set according to Practical Example EX2_4 belonging to the second embodiment of the present invention.

Specifically, as shown in FIG. 36, the data processing apparatus 1A can be additionally provided with an operation controller 60. The configuration, operation, and functions of the operation controller 60 are as described in connection with Practical Example EX1_4. The operator of the data processing apparatus 1A can feed selection instruction information 61 to the data processing apparatus 1A via the interface 4, and in accordance with the selection instruction information 61, the operation controller 60 performs a block selection process. As described above, by the block selection process, the operation controller 60 can control whether to operate the inference blocks 20[1] to 20[n] individually.

Practical Example EX2_5

Practical Example EX2_5 will be described. In Practical Examples EX2_1 to EX2_3 described above, it is typically assumed that, with respect to one input image IN[p], each object detector 30 sets one object detection region. In reality, however, one input image IN[p] may include a plurality of images of recognition target objects, resulting in each object detector 30 setting, with respect to one input image IN[p], a plurality of object detection regions. In such a case, a combination for which to derive the IoU (a combination of object detection regions to be associated with each other) can be determined based on the distances between object detection regions on XY coordinate plane, and as a method for determining it, the method described in connection with Practical Example EX1_5 can be employed.

Then, for each combination of object detection regions associated with each other, one of the methods described in connection with Practical Examples EX2_1 to EX2_3 can be applied. Specifically, for example, for each combination of object detection regions associated with each other, the operations following step S221 in FIG. 32 or 33, or the operations following step S240 in FIG. 34 or 35, can be performed.

Practical Example EX2_6

Figure 35:
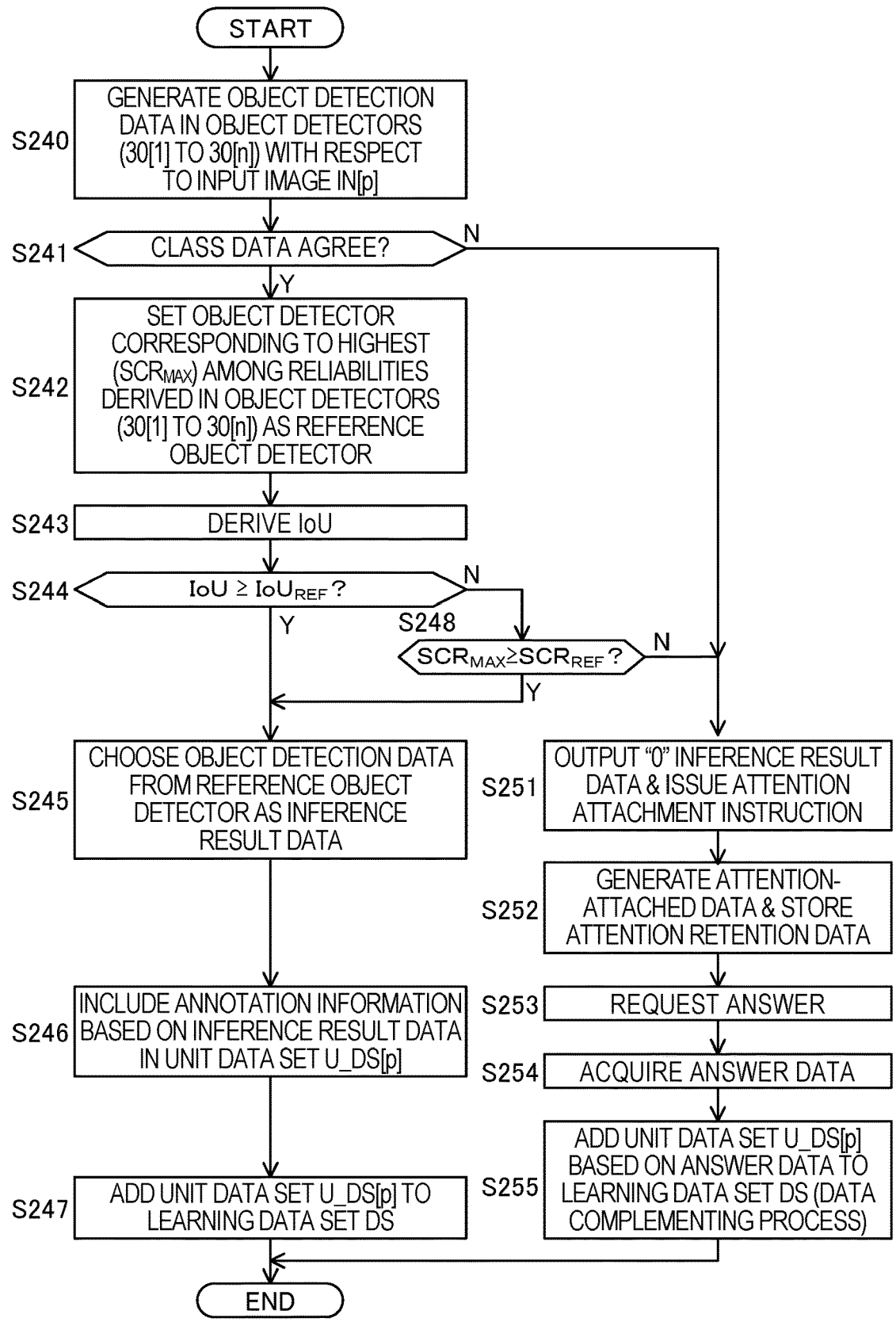
FIG. 35 is a modified operation flow chart of a data processing apparatus in connection with generation of inference result data and updating of a learning data set according to Practical Example EX2_3 belonging to the second embodiment of the present invention.

Practical Example EX2_6 will be described. In Practical Example EX2_6, it is assumed that a multi-class configuration is applied. Practical Example EX2_6 deals with a modification that can be applied to Practical Example EX2_3. Reference will be made back to FIG. 34 or 35, which are directed to Practical Example EX2_3.

At step S241, in the inference block 20[j], the integrator 40 checks whether the class data CLS on the total of n object detection regions set by the object detectors 30[1] to 30[n] agree. If the class data CLS on the total of n object detection regions agree (step S241, "Y"), an advance is made to step S242, and the procedure thus far is similar to that in Practical Example EX2_3. By contrast, if the class data CLS on the total of n object detection regions do not agree (step S241, "N"), then in Practical Example EX2_6, a class checker 76 (see FIG. 37) performs a class check process. The class checker 76 can be a functional block provided in the arithmetic processor 2. The class checker 76 may be implemented by the arithmetic processor 2 executing a program stored in the memory 3.

If the class data CLS on the total of n object detection regions do not agree, it means that the total of n sets of class data CLS on the n object detection regions contain class data CLS indicating a plurality of kinds of object in a mixed manner.

Figure 37:
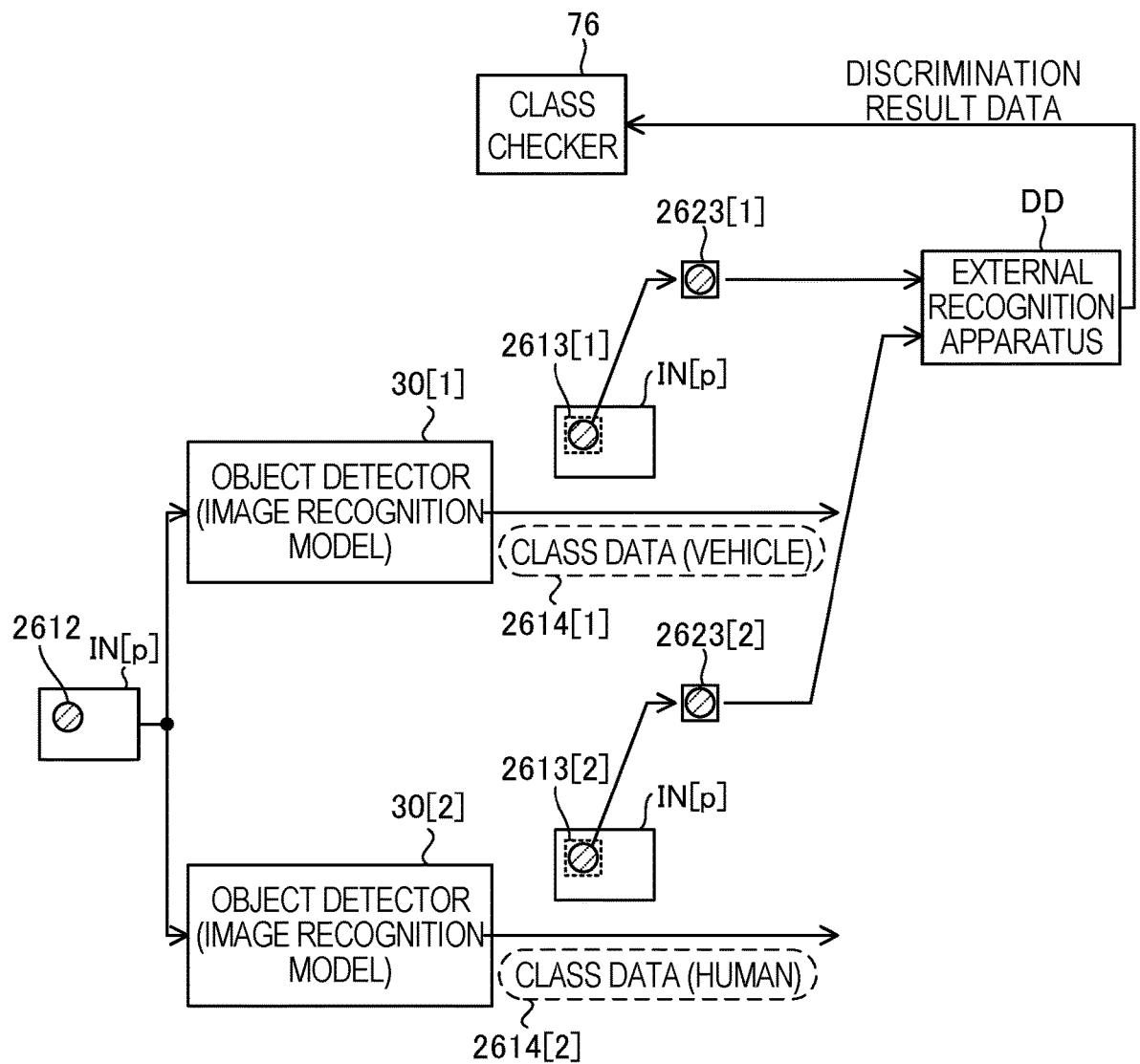
FIG. 37 is a diagram illustrating a class check process according to Practical Example EX2_6 belonging to the second embodiment of the present invention.

Referring to FIG. 37, the class check process will be described. It is here assumed that n=2, that one input image IN[p] includes an image of an object 2612, and that, with respect to the input image IN[p], the object detectors 30[1] and 30[2] in the inference block 20[j] perform object detection processes. Then suppose that the object detectors 30[1] and 30[2] set object detection regions 2613[1] and 2613[2] respectively. The object detection regions 2613[1] and 2613[2] correspond to the detection regions of the object 2612 by the object detectors 30[1] and 30[2] respectively. It is also assumed that the recognition target objects of the object detectors 30 in the inference block 20[j] include a vehicle and a human. Further assume that, while the object detector 30[1] outputs class data 2614[1] indicating that the object in the object detection region 2613[1] is a vehicle, the object detector 30[2] outputs class data 2614[2] indicating that the object in the object detection region 2613[2] is a human.

Object detection data that includes position/shape data identifying the object detection region 2613[1] along with the class data 2614[1] and object detection data that includes position/shape data identifying the object detection region 2613[2] along with the class data 2614[2] are generated at step S240 (FIG. 34 or 35). Since the class data 2614[1] and 2614[2] do not agree (step S241, "N"), the class check process is performed.

In the class check process, the class checker 76 extracts from the input image IN[p] the image in the object detection region 2613[1] as a check image 2623[1], and extracts from the input image IN[p] the image in the object detection region 2613[2] as a check image 2623[2]. The class checker 76 then sends the image data of the check images 2623[1] and 2623[2] to an external recognition apparatus DD. The external recognition apparatus DD is an apparatus different from the data processing apparatus 1 (the data processing apparatus 1A in the second embodiment) and is, for example, connected to the data processing apparatus 1 (the data processing apparatus 1A in the second embodiment) across the communication network mentioned above.

The external recognition apparatus DD performs an image classification process to discriminate the kind of an object in an image. An existing image classifier that employs cloud computing can be used as the external recognition apparatus DD. Thus, the external recognition apparatus DD discriminates the kind of the object in the check image 2623[1] based on the image data of the check image 2623[1], and discriminates the kind of the object in the check image 2623[2] based on the image data of the check image 2623[2]. Discrimination result data indicating the result of discrimination is fed from the external recognition apparatus DD to the class checker 76.

Based on the discrimination result data, the class checker 76 makes the integrator 40 in the inference block 20[j] operate as described below.

A case where the discrimination result data indicates that the objects in the check images 2623[1] and 2623[2] are vehicles will be referred to as case $CS_{B61}$. In case $CS_{B61}$, between the object detectors 30[1] and 30[2], the detection result from the object detector 30[1] as to the kind of object agrees with the discrimination result from the external recognition apparatus DD. Accordingly, in case $CS_{B61}$, the result of the object detection process by the object detector 30[1] is more probable than the result of the object detection process by the object detector 30[2]. In case $CS_{B61}$, it is judged that the attention attachment condition is met, and this causes a jump from step S241 to step S251. Thus, attention-attached data is generated. Here, the attention-attached data generated in case $CS_{B61}$ may include the object detection data from the object detector 30[1] but not include the object detection data from the object detector 30[2]. Or, the attention-attached data generated in case $CS_{B61}$ may include the object detection data from the object detectors 30[1] and 30[2] in which the kind of object indicated by the class data 2614[2] in that attention-attached data is corrected from a human to a vehicle.

Incidentally, in case $CS_{B61}$, a jump may instead be made from step S241 to step S245. In that case, the object detector 30[1] is dealt with as the reference object detector 30.

A case where the discrimination result data indicates that the objects in the check images 2623[1] and 2623[2] are humans will be referred to as case $CS_{B62}$. In case $CS_{B62}$, between the object detectors 30[1] and 30[2], the detection result from the object detector 30[2] as to the kind of object agrees with the discrimination result from the external recognition apparatus DD. Accordingly, in case $CS_{B62}$, the result of the object detection process by the object detector 30[2] is more probable than the result of the object detection process by the object detector 30[1]. In case $CS_{B62}$, it is judged that the attention attachment condition is met, and this causes a jump from step S241 to step S251. Thus, attention-attached data is generated. Here, the attention-attached data generated in case $CS_{B62}$ may include the object detection data from the object detector 30[2] but not include the object detection data from the object detector 30[1]. Or, the attention-attached data generated in case $CS_{B62}$ may include the object detection data from the object detectors 30[1] and 30[2] in which the kind of object indicated by the class data 2614[1] in that attention-attached data is corrected from a vehicle to a human.

Incidentally, in case $CS_{B62}$, a jump may instead be from step S241 to step S245. In that case, the object detector 30[2] is dealt with as the reference object detector 30.

The external recognition apparatus DD may be an object detector capable of object detection. In that case, the class checker 76 may feed the entire image data of the input image IN[p] to the external recognition apparatus DD. In that way, it is possible, on the external recognition apparatus DD, not only to detect the kind of the object 2612 but also to detect the object detection region (bounding box) for the object 2612 and to include those detection results in the discrimination result data. Meanwhile, the class checker 76 or the integrator 40 may correct the object detection region 2613[1] or 2613[2] based on the discrimination result data.

While, for the sake of concrete description, focus has been placed on a case where n=2, the method described in connection with Practical Example EX2_6 can be employed also in cases where n≥3.

Third Embodiment

A third embodiment of the present invention will be described. In the third embodiment, the configuration of the data processing apparatus 1 described above in connection with the basic embodiment can be employed unchanged.

Recognition target objects in an input image IN may have varying image sizes. For example, in a case where a shot image of a vehicle from a camera is used as an input image IN, the image size of the vehicle on the input image IN varies greatly with the distance from the camera to the vehicle. It is not easy to construct a single image recognition model (object detector) that can correctly detect vehicles with any image sizes. As a solution, in the third embodiment, a plurality of image recognition models good at different detection sizes are prepared, and the recognition results they yield are integrated together to obtain inference result data.

By constructing a plurality of image recognition models through machine learning in different environments, it is possible to obtain a plurality of image recognition models that are good at different detection sizes. A specific example of this will now be considered. For the sake of concrete description, referring to FIG. 38, a description will be given of how to construct single-class image recognition models 331[1] to 331[n] that deal with a vehicle as a recognition target object.

In a model construction process, neural networks are prepared, and the neural networks are trained through machine learning to construct the image recognition models (331[1] to 331[n]). The neural network from which the image recognition model 331[i] is constructed will be identified as the NN 3120[i]. Here, i is an integer of 1 or more but n or less. The NN 3120[1] to 3120[n] are classified as deep neural networks.

In the model construction process, using existing learning data sets 3110[1] to 3110[n], the NN 3120[1] to 3120[n] are subjected to machine learning. The machine learning for the NN 3120[i] is performed using the learning data set 3110[i]. The learning data sets 3110[1] to 3110[n] are learning data sets separate from the learning data set DS to be created by the data processing apparatus 1, and exist at the stage preceding the building of the data processing apparatus 1.

The learning data sets 3110[1] to 3110[$n$] each include a plurality of training images (i.e., the image data of a plurality of training images) and annotation information on each training image. In the learning data sets 3110[1] to 3110[$n$], each training image includes an image of a vehicle as a recognition target object, and each set of annotation information identifies where in a training image an image of the vehicle is present. Annotation information corresponds to training data. Training data denotes correct-answer data to be referred to in machine learning.

Using the learning data set 3110[1], a machine learning unit (not illustrated) subjects the NN 3120[1] to machine learning (supervised machine learning). A learned model resulting from the NN 3120[1] undergoing machine learning corresponds to the image recognition model 331[1]. Likewise, using the learning data set 3110[2], a machine learning unit (not illustrated) subjects the NN 3120[2] to machine learning (supervised machine learning). A learned model resulting from the NN 3120[2] undergoing machine learning corresponds to the image recognition model 331[2]. A similar description applies to the learning data set 3110[3], the NN 3120[3], and the like. The image recognition models 331[1] to 331[$n$] can be built into the object detectors 30[1] to 30[$n$], respectively, in one inference block 20[$j$]. The learning data sets 3110[1] to 3110[$n$] are mutually different learning data sets, and thus the image recognition models 331[1] to 331[$n$] are constructed through machine learning in mutually different environments.

Any agent can perform the steps involved in the model construction process. The arithmetic processor 2 may perform the steps involved in the model construction process. Any arithmetic processing apparatus different from the data processing apparatus 1 may perform the steps involved in the model construction process. Of the image recognition models 331[1] to 331[$n$], any one or more may be image recognition models that exist at the time of the filing of the present application.

Figure 39:
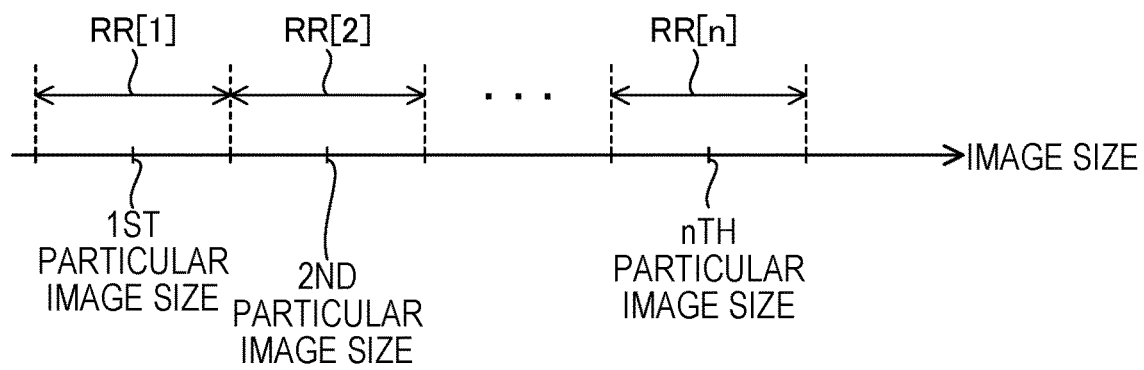
FIG. 39 is a diagram showing a plurality of ranges defined in connection with image size according to the third embodiment of the present invention.

A training image included in the learning data set 3110[$i$] will be referred to as an ith training image. The learning data set 3110[$i$] includes a large number of ith training images (e.g., 100000 ith training images). Each ith training image includes an image of a vehicle as a recognition target object, and in each ith training image the recognition target object (here, a vehicle) has an image size within a range RR[$i$]. Referring the FIG. 39, specifically, for example, in each first training image, the recognition target object (here, a vehicle) has an image size within the range RR[1]; in each second training image, the recognition target object (here, a vehicle) has an image size within the range RR[2]. A similar description applies to the third training image and the range RR[3], etc. Here, the ranges RR[1] to RR[$n$] are ranges that are separate from each other (i.e., ranges that do not overlap each other). The range RR[$i$] encompasses an ith particular image size. Specifically, for example, the range RR[1] encompasses a first particular image size, and the range RR[2] encompasses a second particular image size. A similar description applies to the range RR[3] and the third particular image size, etc.

A particular image size denotes a specific one of the image sizes of recognition target objects in a training image or in an input image IN. The first to nth particular image sizes are mutually different. For any integer i, the (i+1)th particular image size is larger than the ith particular image size, and thus any image size belonging to the range RR[i+1] is larger than any image size belonging to the range RR[i].

Through machine learning using a plurality of first training images with image sizes within the range RR[1], the image recognition model 331[1] is constructed. Thus, the image recognition model 331[1] is a model that allows satisfactory detection of recognition target objects (here, vehicles) with the first particular image size or image sizes within the range RR[1]. The image recognition model 331[1] can be said to be a learned model obtained through machine learning suitable for (compatible with) detection of recognition target objects (here, vehicles) with the first particular image size or image sizes within the range RR[1]. Likewise, through machine learning using a plurality of second training images with image sizes within the range RR[2], the image recognition model 331[2] is constructed. Thus, the image recognition model 331[2] is a model that allows satisfactory detection of recognition target objects (here, vehicles) with the second particular image size or image sizes within the range RR[2]. The image recognition model 331[2] can be said to be a learned model obtained through machine learning suitable for (compatible with) detection of recognition target objects (here, vehicles) with the second particular image size or image sizes within the range RR[2]. A similar description applies to the image recognition model 331[3] etc.

For example, in a case where n=3, the first particular image size is an image size corresponding to 8×8 pixels, the second particular image size is an image size corresponding to 16×16 pixels, and the third particular image size is an image size corresponding to 64×64 pixels.

When the first particular image size is an image size corresponding to 8×8 pixels and the image size of a vehicle in a training image is the first particular image size or is close to it, the image does not show details of components of the vehicle. Accordingly, at the stage of machine learning, the NN 3120[1] updates it parameters (weights and the like) so that it will judge whether an object of interest is a vehicle not based on details of the vehicle but based on the overall shape of the vehicle. The resulting image recognition model 331[1] works with high detection accuracy in the detection of a vehicle with the first particular image size or an image size close to it.

When the third particular image size is an image size corresponding to 64×64 pixels and the image size of a vehicle in a training image is the third particular image size or is close to it, the image shows or tends to show details of components of the vehicle. Accordingly, at the stage of machine learning, the NN 3120[3] updates it parameters (weights and the like) so that it will judge whether an object of interest is a vehicle not only based on the overall shape of the vehicle but also based on the shapes of details and the like of the vehicle. The resulting image recognition model 331[3] works with high detection accuracy in the detection of a vehicle with the third particular image size or an image size close to it.

It is possible to build the image recognition models 331[1] to 331[$n$] into the object detectors 30[1] to 30[$n$] in one inference block 20[$j$] and integrate together the results of the object detection processes in the object detectors 30[1] to 30[$n$] to generate inference result data. In this way, it is possible, with the inference block 20[$j$] as a whole, to correctly detect (recognize) recognition target objects with varying image sizes.

A training image including an image of a recognition target object (here, an image of a vehicle or a human) with an image size that does not belong to the range RR[$i$] may be included in the learning data set 3110[$i$]. For example, a training image including an image of a recognition target object (here, an image of a vehicle or a human) with an image size that belongs to the range RR[2] may be included in the learning data set 3110[1]. However, it is preferable that a large part of the training images included in the learning data set 3110[$i$] include images of recognition target objects with image sizes that belong to the range RR[i]. More specifically, for example, let the total number of training images included in the learning data set 3110[$i$] be $NUM_{TOTAL1}[i]$, then it is preferable that "$NUM_1[i]/NUM_{TOTAL1}[i] \geq k$" be fulfilled. Here, $NUM_1[i]$ represents the number of training images that include images of recognition target objects with image sizes within the range RR[i] among all the training images included in the learning data set 3110[$i$]. The symbol k represents a predetermined value of 0.5 or more.

While, in the above example, vehicles are recognition target objects, a similar description applies in cases where the kind of recognition target object is other than vehicle.

The third embodiment includes Practical Examples EX3_1 to EX3_5 described below. Practical Examples EX3_1 to EX3_5 will deal with specific operation and other features in connection with the third embodiment. Unless inconsistent, any features described above in connection with the third embodiment apply to EX3_1 to EX3_5 described below. For any features that contradict those described above in connection with the third embodiment, the description of those features given in connection with each practical example may prevail. Unless inconsistent, any features of any one of Practical Examples EX3_1 to EX3_5 can be applied to any other (i.e., any two or more of Practical Examples EX3_1 to EX3_5 may be implemented in combination).

Practical Example EX3_1

Figure 40:
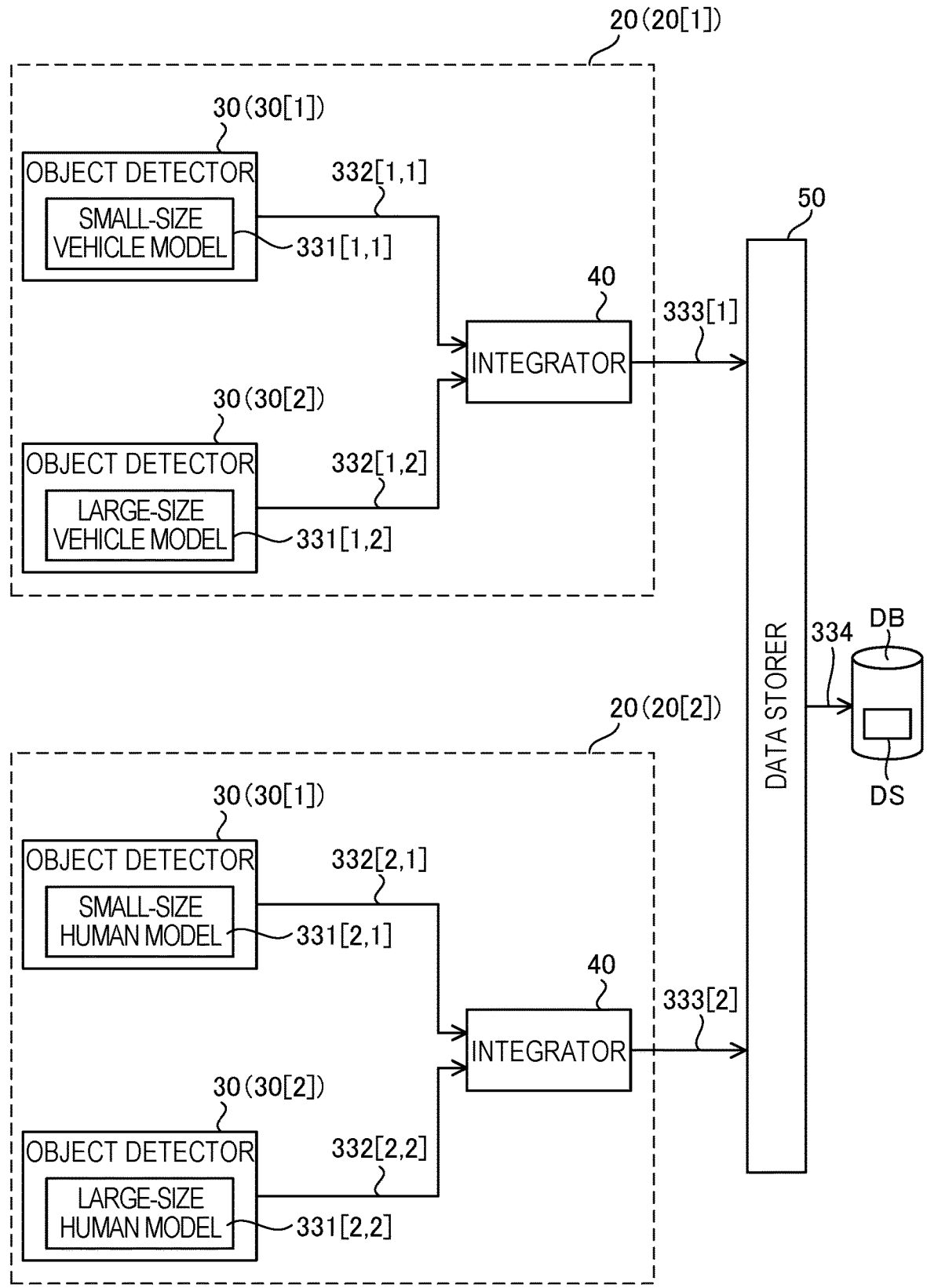
FIG. 40 is a functional block diagram of a principal part of a data processing apparatus according to Practical Example EX3_1 belonging to the third embodiment of the present invention.

Practical Example EX3_1 will be described. Practical Example EX3_1 is a practical example of typical implementation of the technology described above in connection with the third embodiment. FIG. 40 is a functional block diagram of a principal part of the data processing apparatus 1 according to Practical Example EX3_1. In Practical Example EX3_1, it is assumed that m=2 and that, in each inference block 20, n=2 (see FIGS. 1 and 40). In Practical Example EX3_1, a single-class configuration is adopted.

In the inference block 20[1] in Practical Example EX3_1, the image recognition model in the object detector 30[1] is a vehicle model 331[1, 1] and the image recognition model in the object detector 30[2] is a vehicle model 331[1, 2]. In the inference block 20[2] in Practical Example EX3_1, the image recognition model in the object detector 30[1] is a human model 331[2, 1] and the image recognition model in the object detector 30[2] is a human model 331[2, 2].

As described above, a vehicle model (here, 331[1, 1] and 331[1, 2]) is a single-class image recognition model that deals only with a vehicle as a recognition target object. Accordingly, in the inference block 20[1] according to Practical Example EX3_1, the object detectors 30[1] and 30[2] are single-class object detectors that deal only with a vehicle as a recognition target object.

The vehicle model 331[1, 1] is a learned model constructed through machine learning L[1, 1] using a learning data set LDS[1, 1] (in FIG. 40, the learning data set LDS[1, 1] is not illustrated). The recognition target object in the machine learning L[1, 1] is a vehicle. Each training data included in the learning data set LDS[1, 1] includes an image of a vehicle, and annotation data (training data) included in the learning data set LDS[1, 1] identifies, for each training image, in what part of the training image the image of the vehicle is present. The vehicle in each training image included in the learning data set LDS[1, 1] has an image size within the range RR[1]. Accordingly, the machine learning L[1, 1] is suitable for the detection of a vehicle with the first particular image size, which is comparatively small, (or with an image size within the range RR[1]) in the training image or the input image IN. Thus, the vehicle model 331[1, 1] permits accurate detection of a vehicle with the first particular image size (or with an image size within the range RR[1]) in the input image IN.

The vehicle model 331[1, 2] is a learned model constructed through machine learning L[1, 2] using a learning data set LDS[1, 2] (in FIG. 40, the learning data set LDS[1, 2] is not illustrated). The recognition target object in the machine learning L[1, 2] is a vehicle. Each training data included in the learning data set LDS[1, 2] includes an image of a vehicle, and annotation data (training data) included in the learning data set LDS[1, 2] identifies, for each training image, in what part of the training image the image of the vehicle is present. The vehicle in each training image included in the learning data set LDS[1, 2] has an image size within the range RR[2]. Accordingly, the machine learning L[1, 2] is suitable for the detection of a vehicle with the second particular image size, which is comparatively large, (or with an image size within the range RR[2]) in the training image or the input image IN. Thus, the vehicle model 331[1, 2] permits accurate detection of a vehicle with the second particular image size (or with an image size within the range RR[2]) in the input image IN.

As described above, a human model (here, 331[2, 1] and 331[2, 2]) is a single-class image recognition model that deals only with a human as a recognition target object. Accordingly, in the inference block 20[2] according to Practical Example EX31, the object detectors 30[1] and 30[2] are single-class object detectors that deal only with a human as a recognition target object.

The human model 331[2, 1] is a learned model constructed through machine learning L[2, 1] using a learning data set LDS[2, 1] (in FIG. 40, the learning data set LDS[2, 1] is not illustrated). The recognition target object in the machine learning L[2, 1] is a human. Each training data included in the learning data set LDS[2, 1] includes an image of a human, and annotation data (training data) included in the learning data set LDS[2, 1] identifies, for each training image, in what part of the training image the image of the human is present. The human in each training image included in the learning data set LDS[2, 1] has an image size within the range RR[1]. Accordingly, the machine learning L[2, 1] is suitable for the detection of a human with the first particular image size, which is comparatively small, (or with an image size within the range RR[1]) in the training image or the input image IN. Thus, the human model 331[2, 1] permits accurate detection of a human with the first particular image size (or with an image size within the range RR[1]) in the input image IN.

The human model 331[2, 2] is a learned model constructed through machine learning L[2, 2] using a learning data set LDS[2, 2] (in FIG. 40, the learning data set LDS[2, 2] is not illustrated). The recognition target object in the machine learning L[2, 2] is a human. Each training data included in the learning data set LDS[2, 2] includes an image of a human, and annotation data (training data) included in the learning data set LDS[2, 2] identifies, for each training image, in what part of the training image the image of the human is present. The human in each training image included in the learning data set LDS[2, 2] has an image size within the range RR[2]. Accordingly, the machine learning L[2, 2] is suitable for the detection of a human with the second particular image size, which is comparatively large, (or with an image size within the range RR[2]) in the training image or the input image IN. Thus, the human model 331[2, 2] permits accurate detection of a human with the second particular image size (or with an image size within the range RR[2]) in the input image IN.

Figure 38:
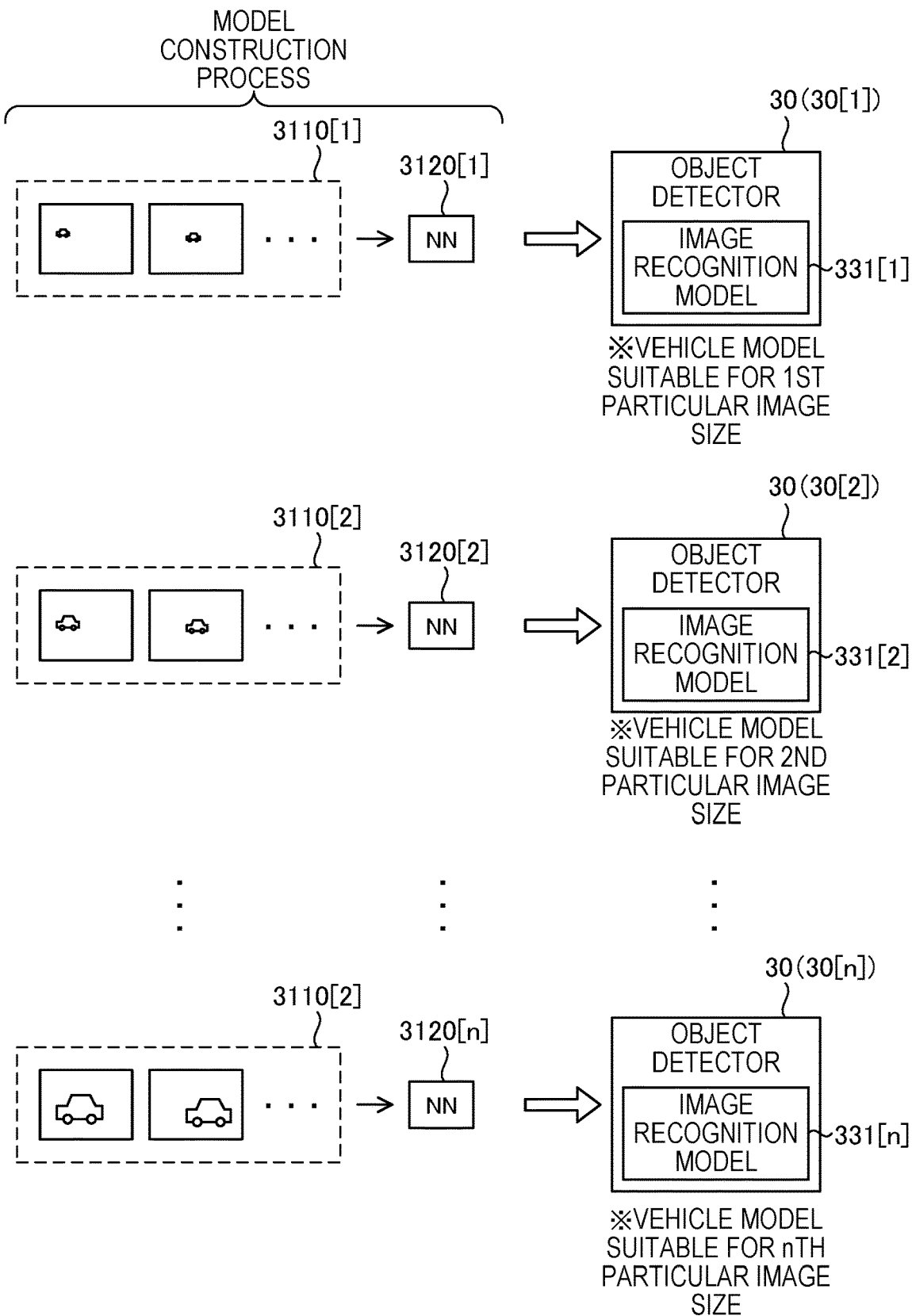
FIG. 38 is a diagram illustrating a method of constructing a plurality of image recognition models through machine learning according to a third embodiment of the present invention.

The vehicle models 331[1, 1] and 331[1, 2] may respectively be the image recognition models 331[1] and 331[2] shown in FIG. 38. Through a model construction process similar to that for constructing the image recognition models 331[1] and 331[2], the human models 331[2, 1] and 331[2, 2] can be constructed. One difference is that, in the construction of the human models 331[2, 1] and 331[2, 2], the recognition target object is a human.

Consider a case, $CS_{C11}$, where an input image IN (e.g., the input image 1110 in FIG. 13) that includes an image of a vehicle and an image of a human is fed to each inference block 20. In case $CS_{C11}$ (see FIG. 40), the object detectors 30[1] and 30[2] in the inference block 20[1] output object detection data 332[1, 1] and 332[1, 2] respectively, and the object detectors 30[1] and 30[2] in inference block 20[2] output object detection data 332[2, 1] and 332[2, 2] respectively. In $CS_{C11}$, the integrator 40 in the inference block 20[1] outputs inference result data 333[1], and the integrator 40 in the inference block 20[2] outputs inference result data 333[2].

In case $CS_{C11}$, at least one of the object detectors 30[1] and 30[2] in the inference block 20[1] is expected to detect a vehicle in the input image IN. If the image of the vehicle in the input image IN is comparatively small, it is likely that only the object detector 30[1] in the inference block 20[1] detects the vehicle. By contrast, if the image of the vehicle in the input image IN is comparatively large, it is likely that only the object detector 30[2] in the inference block 20[1] detects the vehicle.

In case $CS_{C11}$, the integrator 40 in the inference block 20[1] can, based on the object detection data 332[1, 1] or 332[1, 2], generate inference result data 333[1]. In the inference block 20[1], if only the object detector 30[1] of the object detectors 30[1] and 30[2] detects a vehicle, the integrator 40 chooses the object detection data 332[1, 1] as the inference result data 333[1]. In the inference block 20[1], if only the object detector 30[2] of the object detectors 30[1] and 30[2] detects a vehicle, the integrator 40 chooses the object detection data 332[1, 2] as the inference result data 333[1].

Depending on the image size of the vehicle in the input image IN, both of the object detectors 30[1] and 30[2] may detect a vehicle. In the inference block 20[1], if both of the object detectors 30[1] and 30[2] detect a vehicle, the integrator 40 can generate the inference result data 333[1] based on the object detection data 332[1, 1] and 332[1, 2]. In this case, the inference result data 333[1] can be generated based on the IoU between, and the reliability SCR of each of, the two object detection regions set by the object detectors 30[1] and 30[2] in the inference block 20[1]. Inference result data based on an IoU and the like can be generated by any of the methods described in connection with the practical examples described above (e.g., Practical Example EX1_1 or EX1_2).

In case $CS_{C11}$, at least one of the object detectors 30[1] and 30[2] in the inference block 20[2] is expected to detect a human in the input image IN. If the image of the human in the input image IN is comparatively small, it is likely that only the object detector 30[1] in the inference block 20[2] detects the human. By contrast, If the image of the human in the input image IN is comparatively large, it is likely that only the object detector 30[2] in the inference block 20[2] detects the human.

In case $CS_{C11}$, the integrator 40 in the inference block 20[2] can, based on the object detection data 332[2, 1] or 332[2, 2], generate inference result data 333[2]. In the inference block 20[2], if only the object detector 30[1] of the object detectors 30[1] and 30[2] detects a human, the integrator 40 chooses the object detection data 332[2, 1] as the inference result data 333[2]. In the inference block 20[2], if only the object detector 30[2] of the object detectors 30[1] and 30[2] detects a human, the integrator 40 chooses the object detection data 332[2, 2] as the inference result data 333[2].

Depending on the image size of the human in the input image IN, both of the object detectors 30[1] and 30[2] may detect a human. In the inference block 20[2], if both of the object detectors 30[1] and 30[2] detect a human, the integrator 40 can generate the inference result data 333[2] based on the object detection data 332[2, 1] and 332[2, 2]. In this case, the inference result data 333[2] can be generated based on the IoU between, and the reliability SCR of each of, the two object detection regions set by the object detectors 30[1] and 30[2] in the inference block 20[2]. Inference result data based on an IoU and the like can be generated by any of the methods described in connection with the practical examples described above (e.g., Practical Example EX1_1 or EX1_2).

The data storer 50 generates a unit data set 334 based on the input image IN and the inference result data 333[1] and 333[2]. The data storer 50 stores the unit data set 334 in the data base DB, and thereby adds the unit data set 334 to the learning data set DS as part of it.

As described above, with respect to a single object, a plurality of image recognition models that provides high detection accuracy for different sizes are applied, and the results they yield are integrated together. In that way, it is possible to accurately detect (recognize) recognition target objects with varying image sizes. It is thus possible to obtain a satisfactory learning data set DS in terms of both quantity and quality.

Practical Example EX3_2

Practical Example EX3_2 will be described. In Practical Example EX31, it is assumed that n=2 and, as mentioned above, n may be any value of 2 or more. In Practical Example EX3_2, the technology described above in connection with Practical Example EX3_1 is generalized. In Practical Example EX3_2, a single-class configuration is adopted.

Figure 41:
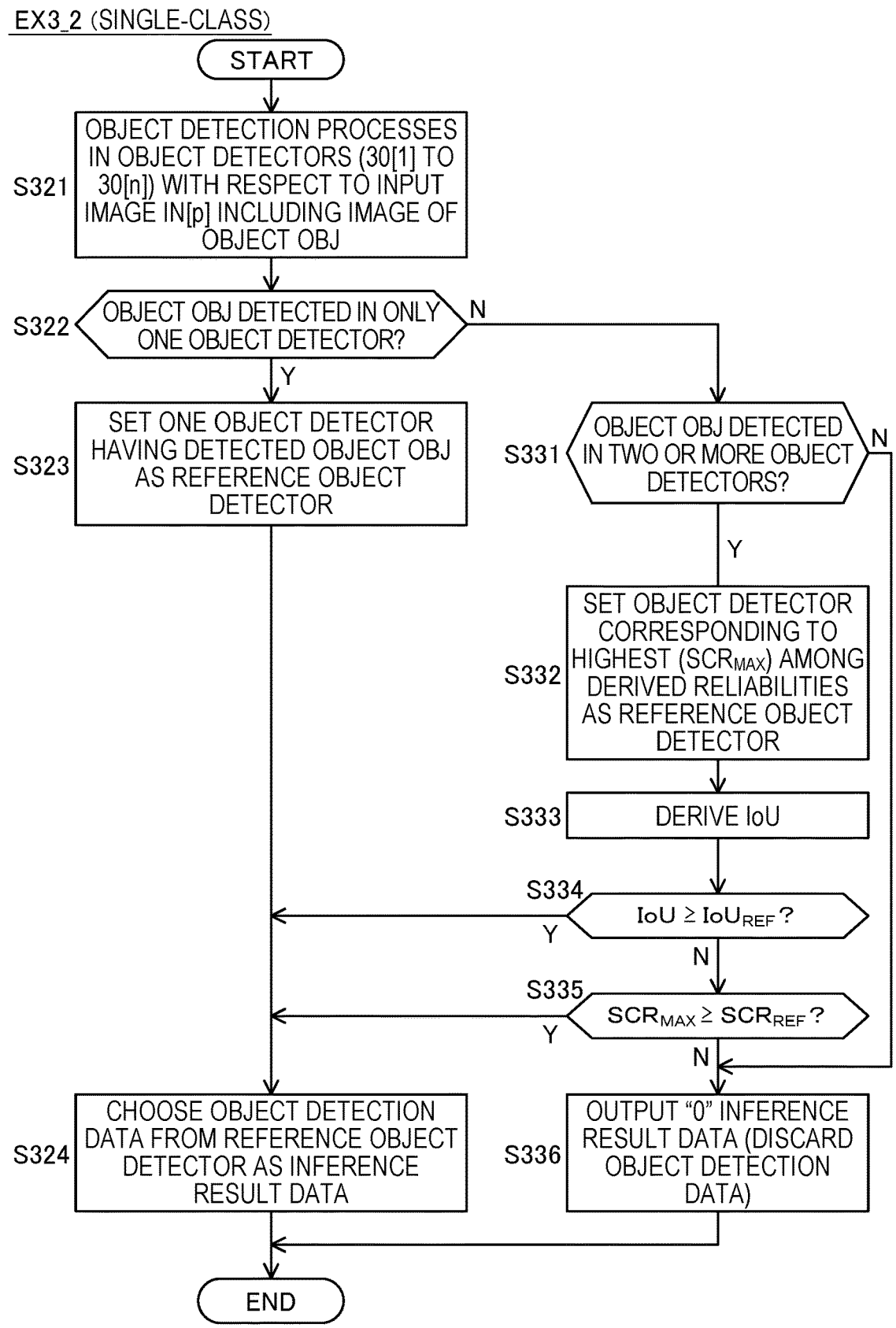
FIG. 41 is an operation flow chart of a data processing apparatus in connection with generation of inference result data according to Practical Example EX3_2 belonging to the third embodiment of the present invention.

FIG. 41 is an operation flow chart of the data processing apparatus 1 according to Practical Example EX3_2. It should be noted that the unit procedure comprising steps S321 to S324 and S331 to S336 in FIG. 41 is the procedure that is performed in one inference block 20[j] with respect to one input image IN[p] (see FIG. 8). The unit procedure is performed in each inference block 20 in the data processing apparatus 1, and is performed for each input image IN. Moreover, in Practical Example EX3_2, for the sake of concrete description, it is assumed that one input image IN[p] includes only one image of an object OBJ (FIG. 7) and in addition that the kind of the object OBJ agrees with the kind of recognition target object in each object detector 30 in the inference block 20[j]. In a case where the input image IN[p] includes images of a plurality of objects OBJ, the above unit procedure is performed for each of the objects OBJ. In the inference block 20[j], for example, if the recognition target object is a vehicle, the image recognition models in the object detectors 30[1] to 30[n] are, respectively, the image recognition models 331[1] to 331[n] described above (see FIG. 38).

First, at step S321, in the inference block 20[j], the object detectors 30[1] to 30[n] perform object detection processes on the input image IN[p]. Subsequently, at step S322, in the inference block 20[j], the integrator 40 checks, based on the object detection data from the object detectors 30[1] to 30[n], whether only one object detector 30 has detected an object OBJ. The object detection data from the object detector 30 that has detected the object OBJ includes class data CLS, position/shape data PP, and a reliability SCR. The object detection data from an object detector 30 that has not detected the object OBJ represents "0". Thus, based on the object detection data from the object detectors 30[1] to 30[n], the integrator 40 can recognize which and how many of the object detectors 30 have detected the object OBJ. If only one object detector 30 has detected the object OBJ (step S322 "Y"), an advance is made to S323; otherwise (step S322, "N"), an advance is made to S331.

At step S323, in the inference block 20[j], the integrator 40 sets the object detector 30 that has detected the object OBJ as a reference object detector 30. Step S323 is followed by step S324.

At step S324, in the inference block 20[j], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. Though not specifically shown in FIG. 41, after step S324, annotation information based on the inference result data from the integrator 40 in the inference block 20[j] is, as annotation information on the input image IN[p], included in the unit data set U_DS[p], and then the unit data set U_DS[p] is added to the learning data set DS (see FIG. 8).

At step S331, in the inference block 20[j], the integrator 40 checks, based on the object detection data from the object detectors 30[1] to 30[n], whether two or more object detectors 30 have detected the object OBJ. If two or more object detectors 30 have detected the object OBJ (step S331, "Y"), an advance is made to S332; otherwise (step S331, "N"), an advance is made to step S336.

At step S332, in the inference block 20[j], the integrator 40 sets, based on the reliabilities SCR derived (generated) by the two or more object detectors 30 that has detected the object OBJ, one of those two or more object detector 30 as a reference object detector 30. How one of a plurality of object detectors 30 is set as the reference object detector 30 is as described above. Specifically, of the two or more object detectors 30 that have detected the object OBJ, the object detector 30 that has derived the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S332, at step S333, in the inference block 20[j], the integrator 40 derives the index IoU of the two or more object detection regions set by the two or more object detectors 30 that have detected the object OBJ. Subsequently, at step S334, the integrator 40 in the inference block 20[j] checks whether the derived index IoU is equal to or higher than the overlap threshold value $IoU_{REF}$. If "$IoU \geq IoU_{REF}$" is fulfilled (step S334, "Y"), an advance is made to step S324, where the operation at step S324 described above is performed. By contrast, if "$IoU \geq IoU_{REF}$" is not fulfilled (step S334, "N"), an advance is made to step S335.

At step S335, the integrator 40 in the inference block 20[j] checks whether the reliability $SCR_{MAX}$ is equal to or higher than the reference reliability $SCR_{REF}$. If "$SCR_{MAX} \geq SCR_{REF}$" is fulfilled (step S335, "Y"), an advance is made to Step S324, where the operation described above at step S324 is performed. If "$SCR_{MAX} \geq SCR_{REF}$" is not fulfilled (step S335, "N"), an advance is made to step S336.

At step S336, in the inference block 20[j], the integrator 40 outputs "0" inference result data. In a case where step S336 is reached, the inference result data from the integrator 40 in the inference block 20[j] is not included in the unit data set U_DS[p] with respect to the input image IN[p] (in other words, it is excluded from the unit data set U_DS[p]), and thus is not reflected in the learning data set DS. That is, the operation at step S336 corresponds to discarding the object detection data generated at step S321 without reflecting it in the learning data set DS.

In the inference block 20[j], if the recognition target object is a vehicle and in addition n=2, the vehicle models 331[1, 1] and 331[1, 2] in FIG. 40 can be used as the object detectors 30[1] and 30[2] respectively. In the inference block 20[j], if the recognition target object is a human and in addition n=2, the human models 331[2, 1] and 331[2, 2] in FIG. 40 can be used as the object detectors 30[1] and 30[2] respectively.

An object detection region set in any object detector 30 functions as a candidate for an integrated inference region (i.e., a candidate region) (see FIG. 7). If only one object detector 30 sets an object detection region (in other words, detects a candidate region), the integrator 40 generates inference result data based on the result of the object detection process by (object detection data from) that one object detector 30 (via step S322, "Y" to steps S323 and S324). By contrast, if two or more object detectors 30 set object detection regions (in other words, detect candidate regions), the integrator 40 generates inference result data based on the results of the object detection processes by (object detection data from) the two or more object detectors 30 (via step S331, "Y" then steps S332 and S333 to step S324 or S336). In this case, the inference result data is generated in accordance with the index IoU.

Figure 42:
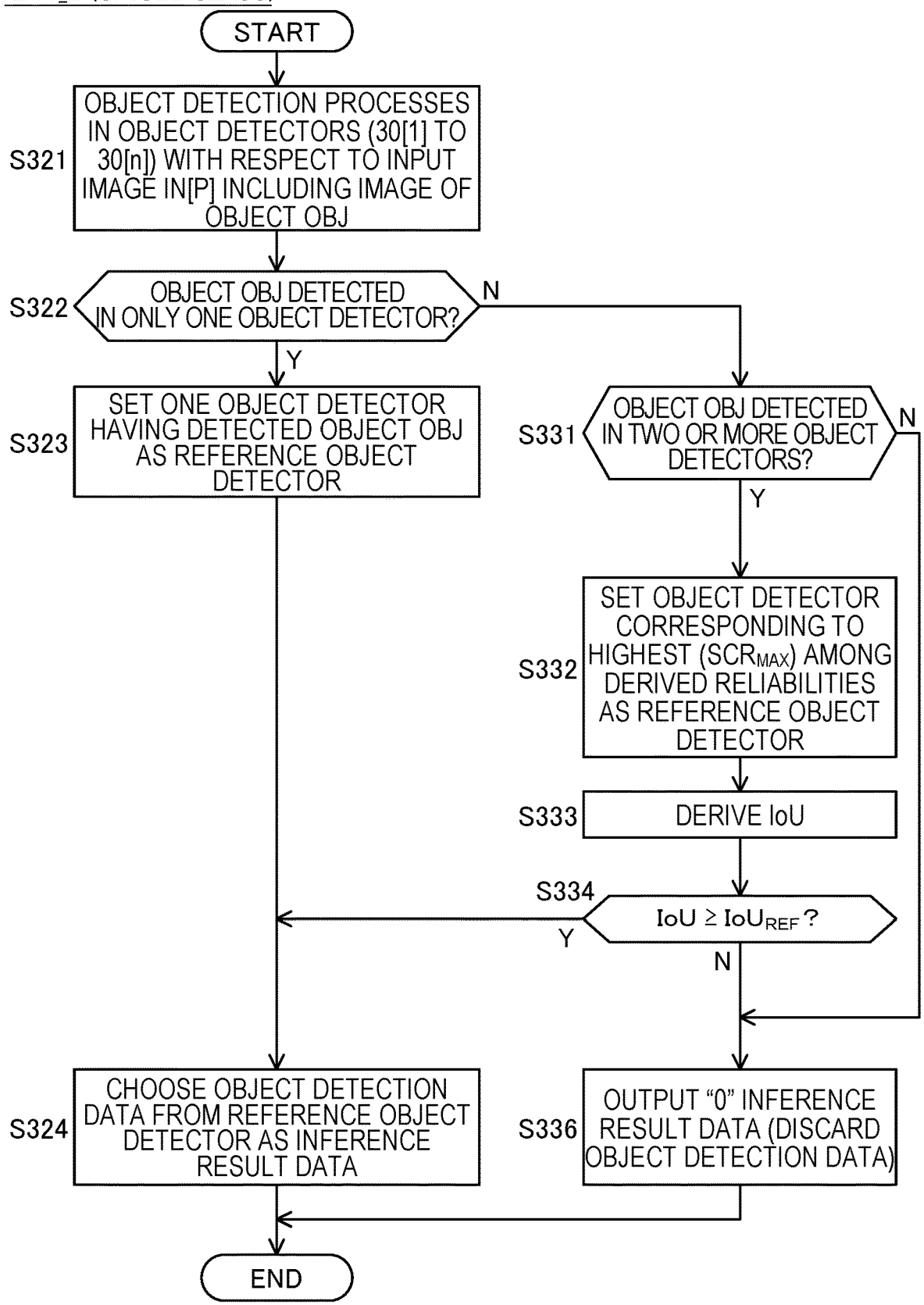
FIG. 42 is a modified operation flow chart of a data processing apparatus in connection with generation of inference result data according to Practical Example EX3_2 belonging to the third embodiment of the present invention.

A modification is possible where the operation at step S335 is omitted from the operation flow chart in FIG. 41. FIG. 42 is a so modified operation flow chart. With this modification made, if at step S334 "$IoU \geq IoU_{REF}$" is not fulfilled, a jump is always made from step S334 to step S336.

Practical Example EX3_3

Practical Example EX3_3 will be described. In Practical Example EX3_3, a multi-class configuration is adopted. The technology described above in connection with the third embodiment can be applied to a multi-class configuration, and an example where the technology is applied to a multi-class configuration will be described as Practical Example EX3_3.

Figure 43:
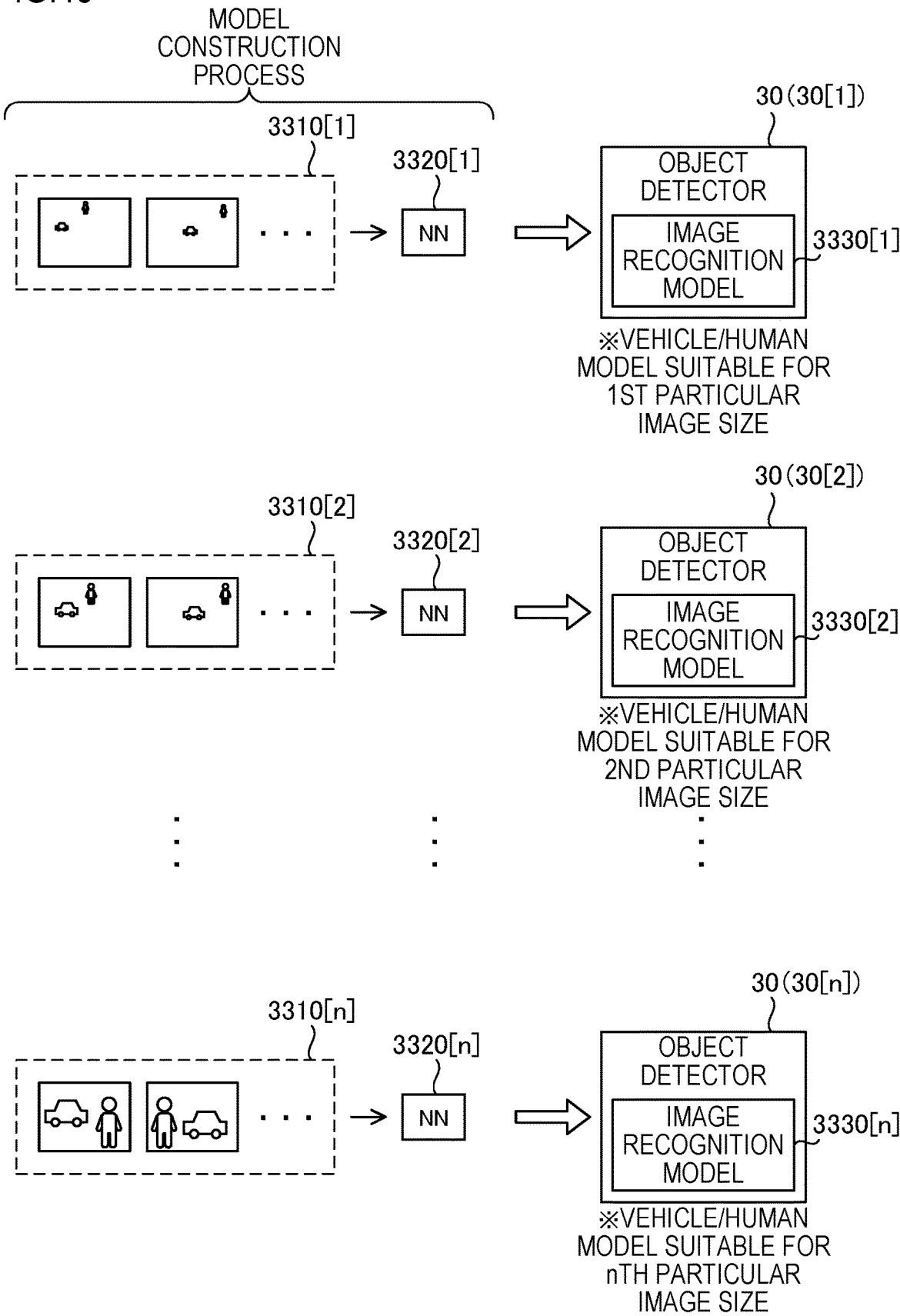
FIG. 43 is a diagram illustrating a method of constructing a plurality of image recognition models through machine learning according to Practical Example EX3_3 belonging to the third embodiment of the present invention.

First, as an example of multi-class image recognition models, referring to FIG. 43, a description will be given of how to construct multi-class image recognition models 3330[1] to 3330[n] that deal with a vehicle and a human as recognition target objects.

In a model construction process, neural networks are prepared, and the neural networks are trained through machine learning to construct the image recognition models (3330[1] to 3330[n]). The neural network from which the image recognition model 3330[i] is constructed will be identified as the NN 3320[i]. Here, i is an integer of 1 or more but n or less. The NN 3320[1] to 3320[n] are classified as deep neural networks.

In the model construction process, using existing learning data sets 3310[1] to 3310[n], the NN 3320[1] to 3320[n] are subjected to machine learning. The machine learning for the NN 3320[i] is performed using the learning data set 3310[i]. The existing learning data sets 3310[1] to 3310[n] are learning data sets separate from the learning data set DS to be created by the data processing apparatus 1, and exist at the stage preceding the building of the data processing apparatus 1.

The learning data sets 3310[1] to 3310[n] each include a plurality of training images (i.e., the image data of a plurality of training images) and annotation information on each training image. In the learning data sets 3310[1] to 3310[n], each training image includes an image of a vehicle and an image of a human as recognition target objects, and each set of annotation information identifies where in a training image an image of the vehicle and an image of the human is present. Annotation information corresponds to training data. Training data denotes correct-answer data to be referred to in machine learning. A training image that includes either an image of a vehicle or an image of a human may be included in the learning data sets 3310[1] to 3310[n].

Using the learning data set 3310[1], a machine learning unit (not illustrated) subjects the NN 3320[1] to machine learning (supervised machine learning). A learned model resulting from the NN 3320[1] undergoing machine learning corresponds to the image recognition model 3330[1]. Likewise, using the learning data set 3310[2], a machine learning unit (not illustrated) subjects the NN 3320[2] to machine learning (supervised machine learning). A learned model resulting from the NN 3320[2] undergoing machine learning corresponds to the image recognition model 3330[2]. A similar description applies to the learning data set 3310[3] and the NN 3320[3] etc. The image recognition models 3330[1] to 3330[n] can be built into the object detectors 30[1] to 30[n], respectively, in one inference block 20[j]. The learning data sets 3310[1] to 3310[n] are mutually different learning data sets, and thus the image recognition models 3330[1] to 3330[n] are constructed through machine learning in mutually different environments.

Any agent can perform the steps involved in the model construction process. The arithmetic processor 2 may perform the steps involved in the model construction process. Any arithmetic processing apparatus different from the data processing apparatus 1 may perform the steps involved in the model construction process. Of the image recognition models 3330[1] to 3330[n], any one or more may be image recognition models that exist at the time of the filing of the present application.

In Practical Example EX3_3, an ith training image denotes a training image included in the learning data set 3310[i]. The learning data set 3310[i] includes a large number of ith training images (e.g., 100000 ith training images). Each ith training image includes an image of a vehicle and an image of a human as recognition target objects, and in each ith training image the recognition target objects (here, a vehicle and a human) have an image size within a range RR[i]. Referring the FIG. 39, specifically, for example, in each first training image, the recognition target objects (here, a vehicle and a human) have an image size within the range RR[1]; in each second training image, the recognition target objects (here, a vehicle and a human) have an image size within the range RR[2]. A similar description applies to the third training image and the range RR[3], etc. As described above, the ranges RR[1] to RR[n] are ranges that are separate from each other (i.e., ranges that do not overlap each other). The range RR[i] encompasses the ith particular image size.

A particular image size denotes a specific one of the image sizes of recognition target objects in a training image or in an input image IN. The relationship of the ranges RR[1] to RR[n] with the first to nth particular image sizes is as described above.

Through machine learning using a plurality of first training images with image sizes within the range RR[1], the image recognition model 3330[1] is constructed. Thus, the image recognition model 3330[1] is a model that allows satisfactory detection of recognition target objects (here, a vehicle and a human) with the first particular image size or image sizes within the range RR[1]. The image recognition model 3330[1] can be said to be a learned model obtained through machine learning suitable for (compatible with) the detection of a recognition target object with the first particular image size or an image size within the range RR[1]. Likewise, through machine learning using a plurality of second training images with image sizes within the range RR[2], the image recognition model 3330[2] is constructed. Thus, the image recognition model 3330[2] is a model that allows satisfactory detection of recognition target objects (here, a vehicle and a human) with the second particular image size or image sizes within the range RR[2]. The image recognition model 3330[2] can be said to be a learned model obtained through machine learning suitable for (compatible with) the detection of a recognition target object with the second particular image size or an image size within the range RR[2]. A similar description applies to the image recognition model 3330[3] etc.

It is possible to build the image recognition models 3330[1] to 3330[n] described above into the object detectors 30[1] to 30[n] in one inference block 20[j] and integrate together the results of the object detection processes in the object detectors 30[1] to 30[n] to generate inference result data. In this way, it is possible, with the inference block 20[j] as a whole, to correctly detect (recognize) recognition target objects with varying image sizes.

A training image including an image of a recognition target object (here, an image of a vehicle or a human) with an image size that does not belong to the range RR[i] may be included in the learning data set 3310[i]. For example, a training image including an image of a recognition target object (here, an image of a vehicle or a human) with an image size that belongs to the range RR[2] may be included in the learning data set 3310[1]. However, it is preferable that a large part of the training images included in the learning data set 3310[i] include images of recognition target objects with image sizes that belong to the range RR[i]. More specifically, for example, let the total number of training images included in the learning data set 3310[i] be $NUM_{TOTAL2}[i]$, then it is preferable that "$NUM_2[i]/NUM_{TOTAL2}[i] \geq k$" be fulfilled. Here, $NUM_2[i]$ represents the number of training images that include images of recognition target objects (here, a vehicle and a human) with image sizes within the range RR[i] among all the training images included in the learning data set 3310[$i$]. The symbol k represents a predetermined value of 0.5 or more.

Figure 44:
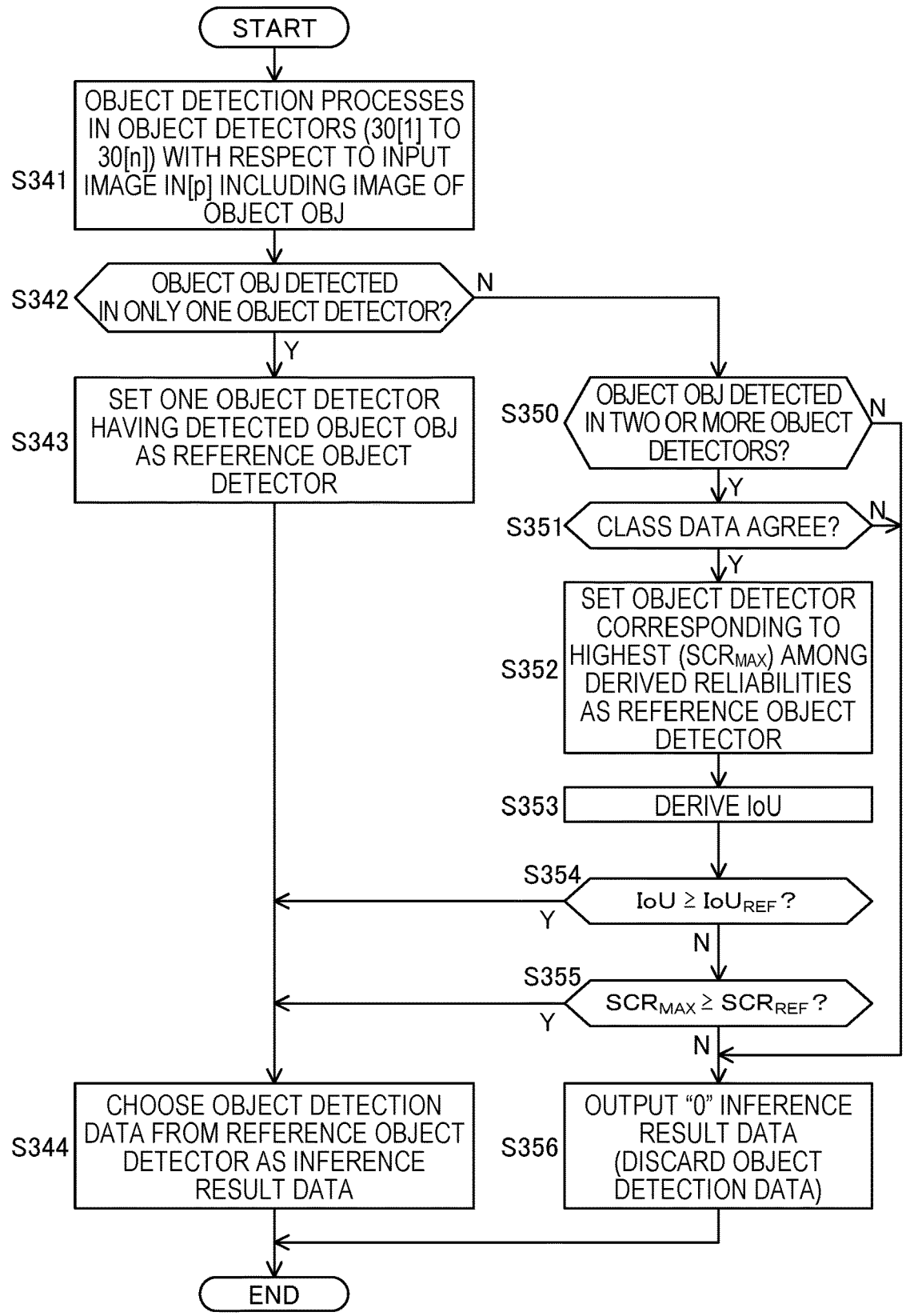
FIG. 44 is an operation flow chart of a data processing apparatus in connection with generation of inference result data according to Practical Example EX3_3 belonging to the third embodiment of the present invention.

FIG. 44 is an operation flow chart of the data processing apparatus 1 according to Practical Example EX3_3. It should be noted that the unit procedure comprising steps S341 to S344 and S350 to S356 in FIG. 44 is the procedure that is performed in one inference block 20[$j$] with respect to one input image IN[$p$] (see FIG. 8). The unit procedure is performed in each inference block 20 in the data processing apparatus 1, and is performed for each input image IN. Moreover, in Practical Example EX3_3, for the sake of concrete description, it is assumed that one input image IN[$p$] includes only one image of an object OBJ (FIG. 7) and in addition that the kind of the object OBJ belongs to the kind of recognition target object in each object detector 30 in the inference block 20[$j$]. In a case where the input image IN[$p$] includes images of a plurality of objects OBJ, the above unit procedure is performed for each of the objects OBJ. In the inference block 20[$j$], if the recognition target objects are a vehicle and a human, the image recognition models in the object detectors 30[1] to 30[$n$] are, respectively, the image recognition models 3330[1] to 3330[$n$] described above (see FIG. 43).

First, at step S341, in the inference block 20[$j$], the object detectors 30[1] to 30[$n$] perform object detection processes on the input image IN[$p$]. Subsequently, at step S342, in the inference block 20[$j$], the integrator 40 checks, based on the object detection data from the object detectors 30[1] to 30[$n$], whether only one object detector 30 has detected an object OBJ. The object detection data from the object detector 30 that has detected the object OBJ includes class data CLS, position/shape data PP, and a reliability SCR. The object detection data from an object detector 30 that has not detected the object OBJ represents "0". Thus, based on the object detection data from the object detectors 30[1] to 30[$n$], the integrator 40 can recognize which and how many of the object detectors 30 have detected the object OBJ. If only one object detector 30 has detected the object OBJ (step S342 "Y"), an advance is made to S343; otherwise (step S342, "N"), an advance is made to S350.

At step S343, in the inference block 20[$j$], the integrator 40 sets the one object detector 30 that has detected the object OBJ as a reference object detector 30. Step S343 is followed by step S344.

At step S344, in the inference block 20[$j$], the integrator 40 chooses the object detection data output from the reference object detector 30 as inference result data. That is, the integrator 40 sets the class data CLS and the position/shape data PP in the object detection data from the reference object detector 30 as the class data and the position/shape data in the inference result data from the integrator 40. Though not specifically shown in FIG. 44, after step S344, annotation information based on the inference result data from the integrator 40 in the inference block 20[$j$] is, as annotation information on the input image IN[$p$], included in the unit data set U_DS[$p$], and then the unit data set U_DS[$p$] is added to the learning data set DS (see FIG. 8).

At step S350, in the inference block 20[$j$], the integrator 40 checks, based on the object detection data from the object detectors 30[1] to 30[$n$], whether two or more object detectors 30 have detected the object OBJ. If two or more object detectors 30 have detected the object OBJ (step S350, "Y"), an advance is made to S351; otherwise (step S350, "N"), an advance is made to step S356.

At step S351, the integrator 40 in the inference block 20[$j$] checks whether the class data CLS on the two or more object detection regions set by the two or more object detectors 30 that have detected the object OBJ agree. If the class data CLS on the two or more object detection regions agree (step S351, "Y"), an advance is made to S352; otherwise (step S351, "N"), an advance is made to step S356.

For example, consider a case where the object detectors 30[1] and 30[2] have detected the object OBJ. In this case, either none of the object detectors 30[3] to 30[$n$] have detected the object OBJ, or n=2 and thus there exist no object detectors identified by 30[3] to 30[$n$]. In this case, if the class data CLS on the two object detection regions set in the object detectors 30[1] and 30[2] both indicate a vehicle, an advance is made to step S352. This corresponds to the object detectors 30[1] and 30[2] both recognizing the objects in the object detection regions to be vehicles. By contrast, if, for example, while the class data CLS on the object detection region set in the object detector 30[1] indicates a vehicle, the class data CLS on the object detection region set in the object detector 30[2] indicates a human, an advance is made to step S356. This corresponds to the object detectors 30[1] and 30[2] recognizing an object common to them to be a vehicle and a human respectively. In this case, the result of the object detection process by at least one of the object detectors 30[1] and 30[2] contains an error. Since it is undesirable to mix an erroneous result of an object detection process in the learning data set DS, at step S356, the object detection data is discarded.

At step S352, in the inference block 20[$j$], the integrator 40 sets, based on the reliabilities SCR derived (generated) by the two or more object detectors 30 that have detected the object OBJ, one of those two or more object detectors 30 as a reference object detector 30. How one of a plurality of object detectors 30 is set as the reference object detector 30 is as described above. Specifically, of the two or more object detectors 30 that have detected the object OBJ, the object detector 30 that has derived the maximum reliability SCR is set as the reference object detector 30. The reliability SCR derived by the reference object detector 30 (i.e., the reliability SCR in the object detection data output from the reference object detector 30) will be identified by the symbol "$SCR_{MAX}$".

Subsequently to step S352, at step S353, in the inference block 20[$j$], the integrator 40 derives the index IoU of the two or more object detection regions set by the two or more object detectors 30 that have detected the object OBJ. Subsequently, at step S354, the integrator 40 in the inference block 20[$j$] checks whether the derived index IoU is equal to or higher than the overlap threshold value $IoU_{REF}$. If "$IoU \geq IoU_{REF}$" is fulfilled (step S354, "Y"), an advance is made to step S344, where the operation at step S344 described above is performed. By contrast, if "$IoU \geq IoU_{REF}$" is not fulfilled (step S354, "N"), an advance is made to step S355.

At step S355, the integrator 40 in the inference block 20[$j$] checks whether the reliability $SCR_{MAX}$ is equal to or higher than the reference reliability $SCR_{REF}$. If "$SCR_{MAX} \geq SCR_{REF}$" is fulfilled (step S355, "Y"), an advance is made to S344, where the at step S344 described above is performed. If "$SCR_{MAX} \geq SCR_{REF}$" is not fulfilled (step S355, "N"), an advance is made to step S356.

At step S356, in the inference block 20[$j$], the integrator 40 outputs "0" inference result data. In a case where step S356 is reached, the inference result data from the integrator 40 in the inference block 20[$j$] is not included in the unit data set U_DS[$p$] with respect to the input image IN[$p$] (in other words, it is excluded from the unit data set U_DS[$p$]), and thus is not reflected in the learning data set DS. That is, the operation at step S356 corresponds to discarding the object detection data generated at step S341 without reflecting it in the learning data set DS.

An object detection region set in any object detector 30 functions as a candidate for an integrated inference region (candidate region) (see FIG. 7). If only one object detector 30 sets an object detection region (in other words, detects a candidate region), the integrator 40 generates inference result data based on the result (object detection data) of the object detection process by that one object detector 30 (via step S342, "Y" to steps S343 and S344). By contrast, if two or more object detectors 30 set object detection regions (in other words, detect candidate regions), under the condition that the class data agree, the integrator 40 generates inference result data based on the results (object detection data) of the object detection processes by the two or more object detectors 30 (via step S351, "Y" then via steps S352 and S353 to steps S344 or S356). In this case, the inference result data is generated in accordance with the index IoU.

Figure 45:
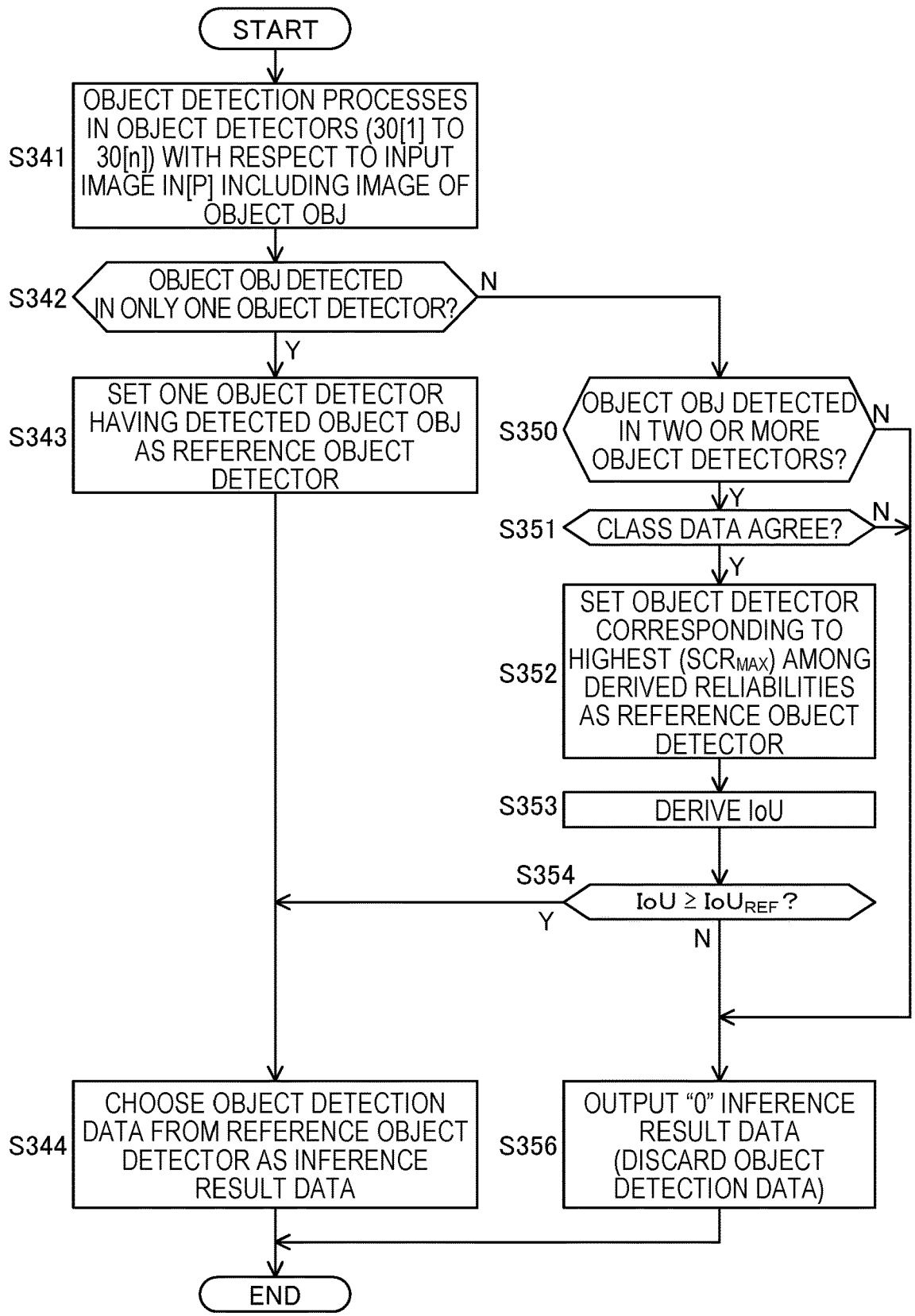
FIG. 45 is a modified operation flow chart of a data processing apparatus in connection with generation of inference result data according to Practical Example EX3_3 belonging to the third embodiment of the present invention.

A modification is possible where the operation at step S355 is omitted from the operation flow chart in FIG. 44. FIG. 45 is a so modified operation flow chart. With this modification made, if "IoU≥IoU$_{REF}$" is not fulfilled, a jump is always made from step S354 to step S356.

Practical Example EX3_4

Practical Example EX3_4 will be described. In Practical Example EX3_4, it is assumed that, typically, a single-class configuration is adopted (though a multi-class configuration may be adopted). The data processing apparatus 1 has the advantages of easy expansion of model functions and easy addition of training data with respect to a new kind of object to the learning data set DS. These aspects are as discussed in connection with Practical Example EX1_4, and Practical Example EX1_4 described above can be applied to the data processing apparatus 1 according to the third embodiment.

Specifically, as shown in FIG. 22, the data processing apparatus 1 can be additionally provided with an operation controller 60. The configuration, operation, and functions of the operation controller 60 are as described in connection with Practical Example EX1_4. The operator of the data processing apparatus 1 can feed selection instruction information 61 to the data processing apparatus 1 via the interface 4, and in accordance with the selection instruction information 61, the operation controller 60 performs a block selection process. As described above, by the block selection process, the operation controller 60 can control whether to operate the inference blocks 20[1] to 20[n] individually.

Moreover, the operation controller 60 according to Practical Example EX3_4 may be configured to be able to perform an individual selection process (in other words, individual selection control) to control whether to operate the object detectors 30 individually. In a case where n object detectors 30 are provided in each inference block 20, a total of (m×n) object detectors 30 are provided in the data processing apparatus 1. By the individual selection process, whether to operate the (m×n) object detectors 30 is controlled individually. Which object detectors 30 to operate or not to operate is specified in the selection instruction information 61 that the operator of the data processing apparatus 1 enters into the data processing apparatus 1 via the interface 4. For example, in a case where the configuration in FIG. 40 is adopted, suppose that a unit data set on a vehicle with a comparatively small image size has to be added to the learning data set DS. In that case, it suffices to specify in the selection instruction information 61 that only an object detector 30 that has the vehicle model 331[1, 1] will be operated. This permits only the object detector 30 that has the vehicle model 331[1, 1] to operate.

The individual selection process is particularly suitable for a data processing apparatus 1 that employs a single-class configuration, but may be applied to a data processing apparatus 1 that employs a multi-class configuration.

With focus placed on one inference block 20[j], the arithmetic processor 2 can be said to be able to separately perform first selection operation and second selection operation as described below. Specifically, in the first selection operation, the arithmetic processor 2 performs object detection process using all of the n image recognition models in the object detectors 30[1] to 30[n] (for example, the vehicle models 331[1, 1] and 331[1, 2] in FIG. 40). In the second selection operation, the arithmetic processor 2 performs object detection processes using, through the individual selection process, selectively some of the n image recognition models in the object detectors 30[1] to 30[n] (for example, the vehicle model 331[1, 1] in FIG. 40). Allowing the individual selection process makes it possible to operate only those object detectors 30 which are necessary, and this helps reduce the cost (power consumption, processing time, and the like) involved in arithmetic operations.

Practical Example EX3_5

Practical Example EX3_5 will be described. In Practical Examples EX3_1 to EX3_3 described above, attention is paid to one object OBJ in one input image IN[p]. In reality, however, one input image IN[p] may include a plurality of images of recognition target objects. In that case, any of the methods described in connection with Practical Examples EX3_1 to EX3_3 may be implemented for each recognition target object.

Fourth Embodiment

A fourth embodiment of the present invention will be described. The fourth embodiment deals with applied technologies, supplemental features, and the like connected with the embodiments described above.

A data processing apparatus (1 or 1A) includes an image recognition apparatus. The image recognition apparatus includes a processor (hereinafter referred to as the processor PR for convenience' sake) that makes an inference to recognize a recognition target object in an input image IN. The processor PR corresponds to the entirety or part of the arithmetic processor 2. The processor PR may be one implemented using cloud computing. The inference blocks 20[1] to 20[n] can be understood to constitute an image recognition apparatus, or one inference block 20[j] can be understood to constitute an image recognition apparatus. While in the embodiments described above an image recognition apparatus is used to generate a learning data set DS, its use is not limited to the generation of a learning data set DS. An apparatus that includes an image recognition apparatus can be mounted as a vehicle-mounted apparatus on any types of vehicles including automobiles. Examples of vehicle-mounted apparatuses include drive recorders.

A data processing apparatus (1 or 1A) includes a learning data set generation apparatus. The data processing apparatus (1 or 1A) itself may function as a learning data set generation apparatus. The learning data set generation apparatus includes an image recognition apparatus as mentioned above, and generates a learning data set DS using a plurality of input images IN and inference result data on each of those input images IN. A leaned model trained using a learning data set DS generated by a learning data set generation apparatus can be provided in a vehicle-mounted apparatus. In that case, the vehicle-mounted apparatus performs image recognition using that leaned model.

A programs that makes a computer perform any of the methods described in connection with the embodiments of the present invention, and a recording medium to which such a program is recorded and that is a machine-readable non-volatile recording medium, are encompassed in the scope of the embodiments of the present invention. Any of the different processes in the embodiments of the present invention may be implemented in the form of hardware such as a semiconductor integrated circuit, or software like a program as mentioned above, or a combination of hardware and software.

The embodiments of the present invention can be modified in many ways as necessary without departure from the scope of the technical concepts defined in the appended claims. The embodiments described herein are merely examples of how the present invention can be implemented, and what is meant by any of the terms used to describe the present invention and its constituent elements is not limited to that mentioned in connection with the embodiments. The specific values mentioned in the above description are merely illustrative and needless to say can be modified to different values.

<<First Notes>>

To follow are first notes in connection with the present invention of which specific examples of configuration have been described by way of embodiments above. The first notes correspond to, in particular, the first embodiment.

According to one aspect of the present invention, in an image recognition apparatus (see FIGS. 1, 17, etc.) including a processor (2) configured to make an inference to recognize a recognition target object in an input image (IN), the processor is configured to: perform, based on the input image and using a plurality of mutually different image recognition models, a plurality of object detection processes to detect as an object detection region a region in the input image where the recognition target object is judged to be present (corresponding to object detectors 30[1] to 30[n]); and generate inference result data indicating the result of the inference in accordance with the degree of overlap (IoU) among a plurality of object detection regions detected in the plurality of object detection processes. (Hereinafter referred to as configuration $W_{A1}$).

By generating inference result data based on the results of a plurality of object detection processes using a plurality of mutually different image recognition models, it is possible to obtain a satisfactory inference result (inference result data) with consideration given to the results of the plurality of object detection processes. In so doing, by giving consideration to the degree of overlap mentioned above, it is possible to secure satisfactory accuracy in the inference result.

In the image recognition apparatus according to configuration $W_{A1}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a single-class object detection process dealing with a single kind of object as the recognition target object, and the recognition target objects of the plurality of object detection processes may be of the same kind. The processor may be configured to identify the maximum reliability ($SCR_{MAX}$) among the plurality of reliabilities derived in the plurality of object detection processes, and generate the inference result data based on the object detection data corresponding to the maximum reliability if the degree of overlap (IoU) is equal to or higher than a predetermined overlap threshold value ($IoU_{REF}$) (e.g., S124, "Y"; see FIG. 17 or 18). (Hereinafter referred to as configuration $W_{A2}$).

If the degree of overlap is equal to or higher than the overlap threshold value, it is inferred that the results of the object detection processes are accordingly probable. By generating the inference result data based on, of those detection results, the object detection data corresponding to the maximum reliability, it is possible to obtain a satisfactory inference result (inference result data).

In the image recognition apparatus according to configuration $W_{A2}$ described above, the processor may be configured to generate the inference result data based on the object detection data corresponding to the maximum reliability if the degree of overlap is equal to or higher than the overlap threshold value, or if the degree of overlap is lower than the overlap threshold value and in addition the maximum reliability is equal to or higher than a predetermined reference reliability (e.g., S124, "Y", or via S124 "N" to S126, "Y"; see FIG. 17). (Hereinafter referred to as configuration $W_{A3}$).

Even if the degree of overlap is lower than the overlap threshold value, if the maximum reliability is equal to or higher than the reference reliability, it is inferred that the result of the object detection process corresponding to the maximum reliability is accordingly probable. Thus, by generating the inference result data based on the object detection data corresponding to the maximum reliability, it is possible to obtain a satisfactory inference result (inference result data).

In the image recognition apparatus according to configuration $W_{A3}$ described above, the processor may be configured to set particular data as the inference result data if the degree of overlap is lower than the overlap threshold value and in addition the maximum reliability is lower than the reference reliability (e.g., via S124, "N" to S126, "N"; see FIG. 17). (Hereinafter referred to as configuration $W_{A4}$).

If the degree of overlap is lower than the overlap threshold value and in addition the maximum reliability is lower than the reference reliability, it is inferred that the probability of the results of the object detection processes is low (they are likely to be erroneous). In this case, inference result data is not generated based on the object detection data corresponding to the maximum reliability; instead, by setting particular data as inference result data, it is possible to suppress generation of inference result data that is likely to be erroneous.

In the image recognition apparatus according to configuration $W_{A1}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a multi-class object detection process dealing with a plurality of kinds of object as the recognition target object. The processor may be configured to identify the maximum reliability ($SCR_{MAX}$) among a plurality of reliabilities derived in the plurality of object detection processes, and generate the inference result data based on the object detection data corresponding to the maximum reliability if the degree of overlap (IoU) is equal to or higher than a predetermined overlap threshold value (IoU$_{REF}$) (e.g., S134, "Y"; see FIG. 19 or 20) in a case where a plurality of regions where through the plurality of object detection processes the same kind of object is judged to be present are the plurality of object detection regions. (Hereinafter referred to as configuration W$_{A5}$).

In a case where, through a plurality of object detection processes, the same kind of object is judged to be present, if the degree of overlap is equal to or higher than the overlap threshold value, it is inferred that the results of the object detection processes are accordingly probable. By generating the inference result data based on, of those detection results, the object detection data corresponding to the maximum reliability, it is possible to obtain a satisfactory inference result (inference result data).

In the image recognition apparatus according to configuration W$_{A5}$ described above, the processor may be configured to generate the inference result data based on the object detection data corresponding to the maximum reliability if the degree of overlap is equal to or higher than the overlap threshold value, or if the degree of overlap is lower than the overlap threshold value and in addition the maximum reliability is equal to or higher than a predetermined reference reliability (e.g., S134, "Y", or via S134, "N" to S136, "Y"; see FIG. 19), in a case where a plurality of regions where through the plurality of object detection processes the same kind of object is judged to be present are the plurality of object detection regions. (Hereinafter referred to as configuration W$_{A6}$).

Even if the degree of overlap is lower than the overlap threshold value, if the maximum reliability is equal to or higher than the reference reliability, it is inferred that the result of the object detection process corresponding to the maximum reliability is accordingly probable. Thus, by generating the inference result data based on the object detection data corresponding to the maximum reliability, it is possible to obtain a satisfactory inference result (inference result data).

In the image recognition apparatus according to configuration W$_{A6}$ described above, the processor may be configured to set particular data as the inference result data if the degree of overlap is lower than the overlap threshold value and in addition the maximum reliability is lower than the reference reliability (e.g., via S134, "N" to S136 "N; see FIG. 19) in a case where a plurality of regions where through the plurality of object detection processes the same kind of object is judged to be present are the plurality of object detection regions. (Hereinafter referred to as configuration W$_{A7}$).

If the degree of overlap is lower than the overlap threshold value and in addition the maximum reliability is lower than the reference reliability, it is inferred that the probability of the results of the object detection processes is low (they are likely to be erroneous). In this case, inference result data is not generated based on the object detection data corresponding to the maximum reliability; instead, by setting particular data as inference result data, it is possible to suppress generation of inference result data that is likely to be erroneous.

In the image recognition apparatus according to any of configurations W$_{A1}$ to W$_{A7}$ described above, the plurality of image recognition models may employ mutually different algorithms for detecting the recognition target object; or each image recognition model may be constructed as a neural network, and the plurality of image recognition models may be constructed as neural networks having mutually different configurations; or the plurality of image recognition models may be constructed through machine learning in mutually different environments. (Hereinafter referred to as configuration W$_{A8}$).

Thus, the plurality of image recognition models differ in detection characteristics or detection performance.

According to another aspect of the present invention, a learning data set generation apparatus includes an image recognition apparatus according to any of configurations W$_{A1}$ to W$_{A8}$ described above. The learning data set generation apparatus is configured to generate a learning data set (DS) using a plurality of input images and the inference result data with respect to each input image. (Hereinafter referred to as configuration W$_{A9}$).

By generating a learning data set using a satisfactory inference result (inference result data), it is possible to obtain a high-quality learning data set.

According to yet another aspect of the present invention, an image recognition method is one that involves making an inference to recognize a recognition target object in an input image, and the method includes: performing, based on the input image and using a plurality of mutually different image recognition models, a plurality of object detection processes to detect as an object detection region a region in the input image where the recognition target object is judged to be present; and generating inference result data indicating the result of the inference in accordance with the degree of overlap among a plurality of object detection regions detected in the plurality of object detection processes. (Hereinafter referred to as configuration Waco).

<<Second Notes>>

To follow are second notes in connection with the present invention of which specific examples of configuration have been described by way of embodiments above. The second notes correspond to, in particular, the second embodiment.

According to one aspect of the present invention, in an image recognition apparatus (see FIGS. 24, 25, 32, etc.) including a processor (2) configured to make an inference to recognize a recognition target object in an input image (IN), the processor is configured to: perform, based on the input image and using a plurality of mutually different image recognition models, a plurality of object detection processes to detect as an object detection region a region in the input image where the recognition target object is judged to be present (corresponding to object detectors 30[1] to 30[$n$]); generate inference result data indicating the result of the inference based on the results of the plurality of object detection processes (corresponding to the integrator 40); and be capable of attaching attention information to the result of each object detection process in accordance with the degree of overlap (IoU) among a plurality of object detection regions detected in the plurality of object detection processes. (Hereinafter referred to as configuration W$_{B1}$).

By generating inference result data based on the results of a plurality of object detection processes using a plurality of mutually different image recognition models, it is possible to obtain a satisfactory inference result (inference result data) with consideration given to the results of the plurality of object detection processes. The results of the object detection processes may contain an error, and whether they contain one can be inferred based on the degree of overlap mentioned above. Accordingly, a capability is provided to attach attention information in accordance with the degree of overlap. Attention information serves as an indicator that suggests a possibility of the results of the object detection processes containing an error. By attaching attention information to the result of an object detection process that is inferred to be comparatively likely to contain an error, it is possible, for example, to perform confirmation operation later by human operation based on the attention information.

In the image recognition apparatus according to configuration $W_{B1}$ described above, the processor may be configured to determine whether to attach the attention information to the results of the object detection processes in accordance with the result of comparison of the degree of overlap (IoU) described above with a predetermined overlap threshold value (IoU$_{REF}$). (Hereinafter referred to as configuration $W_{B2}$).

The likelihood of an error is considered to depend on the degree of overlap; thus, by comparing the degree of overlap with the overlap threshold value, it is possible to infer the likelihood of an error. Accordingly, based on the result of comparison of the degree of overlap with the overlap threshold value, whether to attach attention information is determined. In this way, it is possible to attach attention information to the result of an object detection process that is inferred to be comparatively likely to contain an error, and this makes it possible, for example, to perform confirmation operation later by human operation based on the attention information.

In the image recognition apparatus according to configuration $W_{B2}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a single-class object detection process dealing with a single kind of object as the recognition target object, and the recognition target objects of the plurality of object detection processes may be of the same kind. The processor may be configured to identify the maximum reliability (SCR$_{MAX}$) among the plurality of reliabilities derived in the plurality of object detection processes. The processor may be configured to generate the inference result data based on the object detection data corresponding to the maximum reliability if the degree of overlap (IoU) is equal to or higher than the overlap threshold value (IoU$_{REF}$) (e.g., S224, "Y"; see FIG. 32). The processor may be configured to attach the attention information to the results of the object detection processes if the degree of overlap is lower than the overlap threshold value (e.g., S224, "N"; see FIG. 32) (Hereinafter referred to as configuration $W_{B3}$).

If the degree of overlap is equal to or higher than the overlap threshold value, it is inferred that the probability of the results of the object detection processes is comparatively high. By generating the inference result data based on, of those detection results, the object detection data corresponding to the maximum reliability, it is possible to obtain a satisfactory inference result (inference result data). If the degree of overlap is lower than the overlap threshold value, it is inferred that the probability of the results of the object detection processes is comparatively low. By attaching attention information if the degree of overlap is lower than the overlap threshold value, it possible, for example, to perform confirmation operation later by human operation based on the attention information.

In the image recognition apparatus according to configuration $W_{B2}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a single-class object detection process dealing with a single kind of object as the recognition target object, and the recognition target objects of the plurality of object detection processes may be of the same kind. The processor may be configured to identify the maximum reliability (SCR$_{MAX}$) among the plurality of reliabilities derived in the plurality of object detection processes. The processor may be configured to generate the inference result data based on the object detection data corresponding to the maximum reliability if the degree of overlap is equal to or higher than the overlap threshold value, or if the degree of overlap is lower than the overlap threshold value and in addition the maximum reliability is equal to or higher than a predetermined reference reliability (e.g., S224, "Y", or via S224 "N" to S228, "Y"; see FIG. 33). The processor may be configured to attach the attention information to the results of the object detection processes if the degree of overlap is lower than the overlap threshold value and in addition the maximum reliability is lower than the reference reliability (e.g., via S224, "N" to S228, "N"; see FIG. 33) (Hereinafter referred to as configuration $W_{B4}$).

If the degree of overlap is equal to or higher than the overlap threshold value, it is inferred that the probability of the results of the object detection processes is comparatively high. Even if the degree of overlap is lower than the overlap threshold value, if the maximum reliability is equal to or higher than the reference reliability, it is inferred that the result of the object detection process corresponding to the maximum reliability is accordingly probable. Thus, if the degree of overlap is equal to or higher than the overlap threshold value, or if the degree of overlap is lower than the overlap threshold value and in addition the maximum reliability is equal to or higher than the reference reliability, inference result data is generated based on the object detection data corresponding to the maximum reliability. In this way, it is possible to obtain a satisfactory inference result (inference result data). By contrast, if the degree of overlap is lower than the overlap threshold value and in addition the maximum reliability is lower than the reference reliability, it is inferred that the probability of the results of the object detection processes is comparatively low. In this case, by attaching attention information, it possible, for example, to perform confirmation operation later by human operation based on the attention information.

In the image recognition apparatus according to configuration $W_{B2}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a multi-class object detection process dealing with a plurality of kinds of object as the recognition target object. The processor may be configured to identify the maximum reliability (SCR$_{MAX}$) among a plurality of reliabilities derived in the plurality of object detection processes. The processor may be configured to generate the inference result data based on the object detection data corresponding to the maximum reliability if the degree of overlap is equal to or higher than the overlap threshold value (e.g., S244, "Y"; see FIG. 34) in a case where a plurality of regions where through the plurality of object detection processes the same kind of object is judged to be present are the plurality of object detection regions. The processor may be configured to attach the attention information to the results of the object detection processes if the degree of overlap is lower than the overlap threshold value (e.g., S244, "N"; see FIG. 34) in a case where a plurality of regions where through the plurality of object detection processes the same kind of object is judged to be present are the plurality of object detection regions. (Hereinafter referred to as configuration $W_{B5}$).

In a case where through the plurality of object detection processes the same kind of object is judged to be present, if the degree of overlap is equal to or higher than the overlap threshold value, it is inferred that the probability of the results of the object detection processes is comparatively high. By generating inference result data based on, of those detection results, the object detection data corresponding to the maximum reliability, it is possible to obtain a satisfactory inference result (inference result data). By contrast, if the degree of overlap is lower than the overlap threshold value, it is inferred that the probability of the results of the object detection processes is comparatively low. By attaching attention information if the degree of overlap is lower than the overlap threshold value, it possible, for example, to perform confirmation operation later by human operation based on the attention information.

In the image recognition apparatus according to configuration $W_{B2}$ described above, the processor may be configured to generate, in each object detection process, object detection data including class data indicating the kind of an object in the object detection region, position/shape data of the object detection region, and the reliability of the result of the object detection process (see FIG. 4). Each object detection process may be a multi-class object detection process dealing with a plurality of kinds of object as the recognition target object. The processor may be configured to identify the maximum reliability ($SCR_{MAX}$) among a plurality of reliabilities derived in the plurality of object detection processes. The processor may be configured to generate the inference result data based on the object detection data corresponding to the maximum reliability if the degree of overlap is equal to or higher than the overlap threshold value, or if the degree of overlap is lower than the overlap threshold value and in addition the maximum reliability is equal to or higher than a predetermined reference reliability (e.g., S244, "Y", or via S244, "N" to S248, "Y"; see FIG. 35), in a case where a plurality of regions where through the plurality of object detection processes the same kind of object is judged to be present are the plurality of object detection regions. The processor may be configured to attach the attention information to the results of the object detection processes if the degree of overlap is lower than the overlap threshold value and in addition the maximum reliability is lower than the reference reliability (e.g., via S244, "N" to S248, "N"; see FIG. 35) in the case where the plurality of regions where through the plurality of object detection processes the same kind of object is judged to be present are the plurality of object detection regions. (Hereinafter referred to as configuration $W_{B6}$).

In a case where through the plurality of object detection processes the same kind of object is judged to be present, if the degree of overlap is equal to or higher than the overlap threshold value, it is inferred that the probability of the results of the object detection processes is comparatively high. Even if the degree of overlap is lower than the overlap threshold value, if the maximum reliability is equal to or higher than the reference reliability, it is inferred that the result of the object detection process corresponding to the maximum reliability is accordingly probable. Thus, if the degree of overlap is equal to or higher than the overlap threshold value, or if the degree of overlap is lower than the overlap threshold value and in addition the maximum reliability is equal to or higher than the reference reliability, inference result data is generated based on the object detection data corresponding to the maximum reliability. In this way, it is possible to obtain a satisfactory inference result (inference result data). By contrast, if the degree of overlap is lower than the overlap threshold value and in addition the maximum reliability is lower than the reference reliability, it is inferred that the probability of the results of the object detection processes is comparatively low. In this case, by attaching attention information, it possible, for example, to perform confirmation operation later by human operation based on the attention information.

In the image recognition apparatus according to any of configurations $W_{B1}$ to $W_{B6}$ described above, the plurality of image recognition models may employ mutually different algorithms for detecting the recognition target object; or each image recognition model may be constructed as a neural network, and the plurality of image recognition models may be constructed as neural networks having mutually different configurations; or the plurality of image recognition models may be constructed through machine learning in mutually different environments. (Hereinafter referred to as configuration $W_{B7}$).

Thus, the plurality of image recognition models differ in detection characteristics or detection performance.

According to another aspect of the present invention, a learning data set generation apparatus includes an image recognition apparatus according to any of configurations $W_{B1}$ to $W_{B7}$ described above. The learning data set generation apparatus is configured to generate a learning data set (DS) using a plurality of input images and the inference result data with respect to each input image. (Hereinafter referred to as configuration $W_{B8}$).

By generating a learning data set using a satisfactory inference result (inference result data), it is possible to obtain a high-quality learning data set.

In the learning data set generation apparatus according to configuration $W_{B8}$ described above, the attention information may be information for inquiring of a judge whether the results of the object detection processes are correct. The learning data set generation apparatus may include an answer acquirer (74) configured to acquire answer data from the judge in response to the inquiry based on the attention information. The processor is configured such that, if the attention information is attached to the results of the object detection processes on a particular input image among the plurality of input images, the processor includes in the learning data set a data set based on the particular input image and the answer data. (Hereinafter referred to as configuration $W_{B9}$).

In this way, it is possible to generate a data set based on answer data as to the attention information-attached results of the object detection processes, and thus to obtain a satisfactory learning data set in terms of quality and quantity.

According to yet another aspect of the present invention, an image recognition method is one that involves making an inference to recognize a recognition target object in an input image, and the method includes: performing, based on the input image and using a plurality of mutually different image recognition models, a plurality of object detection processes to detect as an object detection region a region in the input image where the recognition target object is judged to be present; generating inference result data indicating the result of the inference based on the results of the plurality of object detection processes; and attaching attention information to the results of the object detection processes in accordance with the degree of overlap among a plurality of object detection regions detected in the plurality of object detection processes. (Hereinafter referred to as configuration $W_{B10}$).

<<Third Notes>>

To follow are third notes in connection with the present invention of which specific examples of configuration have been described by way of embodiments above. The third notes correspond to, in particular, the third embodiment.

According to one aspect of the present invention, in an image recognition apparatus (see FIGS. 1, 38 to 41, etc.) including a processor (2) configured to make an inference to recognize a recognition target object in an input image (IN), the processor is configured to: perform, based on the input image and using a plurality of image recognition models, a plurality of object detection processes to detect as an object detection region a region in the input image where the recognition target object is judged to be present (corresponding to object detectors 30[1] to 30[n]); and generate inference result data indicating the result of the inference based on the results of the plurality of object detection processes (corresponding to the integrator 40). Each of the image recognition models is a model capable of detecting the recognition target object with a particular image size. The plurality of image recognition models are directed to mutually different particular image sizes. (Hereinafter referred to as configuration $W_{C1}$).

It is thus possible to recognize recognition target objects with varying image sizes with satisfactory accuracy.

In the image recognition apparatus according to configuration $W_{C1}$ described above, the processor may be configured such that, if the object detection region is detected only in one object detection process among the plurality of object detection processes (e.g., S322, "Y" or S342, "Y"; see FIG. 41, 42, 44, or 45), the processor generates the inference result data based on the result of that one object detection process. (Hereinafter referred to as configuration $W_{C2}$).

The recognition target object is expected to be detected in an object detection process (image recognition model) that suits the image size of the recognition target object in the input image. Thus, if the object detection region is detected only in one object detection process (i.e., if the recognition target object is detected only in one object detection process), inference result data can be generated based on the result of that one object detection process, and it is thus possible to obtain satisfactory inference result data.

In the image recognition apparatus according to configuration $W_{C1}$ or $W_{C2}$ described above, the processor may be configured such that, if the object detection region is detected in two or more object detection processes among the plurality of object detection processes (e.g., S331, "Y" or S350, "Y"; see FIG. 41, 42, 44, or 45), the processor generates the inference result data based on the results of those two or more object detection processes. (Hereinafter referred to as configuration $W_{C3}$).

Depending on, for example, the image size of the recognition target object in the input image, the object detection region may be detected in two or more object detection processes (i.e., the recognition target object may be detected in two or more object detection processes). In that case, by generating inference result data based on the results of the two or more object detection processes, it is possible to obtain satisfactory inference result data with consideration given to the results of the two or more object detection processes.

In the image recognition apparatus according to configuration $W_{C3}$ described above, the processor may be configured such that, if the object detection region is detected in two or more object detection processes, the processor generates the inference result data in accordance with the degree of overlap (IoU) among the two or more object detection regions detected in those two or more object detection processes. (Hereinafter referred to as configuration $W_{C4}$).

The results of the object detection processes may contain an error, and whether they contain an error can be inferred based on the degree of overlap mentioned above. By generating inference result data in accordance with the degree of overlap, it is possible to secure satisfactory accuracy in the inference result.

In the image recognition apparatus according to any of configurations $W_{C1}$ to $W_{C4}$ described above, the plurality of image recognition models may be constructed through machine learning in mutually different environments. (Hereinafter referred to as configuration $W_{C5}$).

It is thus possible, for example, to construct a plurality of image recognition models good at different detection sizes. It is thus possible to recognize recognition target objects with varying image sizes with satisfactory accuracy.

In the image recognition apparatus according to any of configurations $W_{C1}$ to $W_{C5}$ described above (see FIGS. 38 and 39), the plurality of image recognition models may include a first to an nth image recognition model (where n is an integer of two or more), and the first to nth image recognition models may be learned models constructed through machine learning suitable for detection of the recognition target object with a first to an nth particular image size respectively. (Hereinafter referred to as configuration $W_{C6}$).

It is thus possible, for example, to construct a plurality of image recognition models good at different detection sizes. It is thus possible to recognize recognition target objects with varying image sizes with satisfactory accuracy.

In the image recognition apparatus according to configuration $W_{C6}$ described above (see FIGS. 38 and 39), the ith image recognition model may be obtained through machine learning using a plurality of ith training images (where i is a natural number of n or less). Each ith training image may include an image of the recognition target object. In each ith training image, the recognition target object may have an image size within an ith range that encompasses the ith particular image size. A first to an nth range may be mutually different. (Hereinafter referred to as configuration $W_{C7}$).

It is thus possible, for example, to construct a plurality of image recognition models good at different detection sizes. It is thus possible to recognize recognition target objects with varying image sizes with satisfactory accuracy.

In the image recognition apparatus according to configuration $W_{C7}$ described above (see FIG. 39), the first to nth ranges may be mutually separate ranges. (Hereinafter referred to as configuration $W_{C8}$).

It is thus possible, for example, to construct a plurality of image recognition models good at different detection sizes. It is thus possible to recognize recognition target objects with varying image sizes with satisfactory accuracy.

According to another aspect of the present invention, a learning data set generation apparatus includes an image recognition apparatus according to any of configurations $W_{C1}$ to $W_{C8}$ described above. The learning data set generation apparatus is configured to generate a learning data set (DS) using a plurality of input images and the inference result data with respect to each input image. (Hereinafter referred to as configuration $W_{C9}$).

By generating a learning data set using a satisfactory inference result (inference result data), it is possible to obtain a high-quality learning data set.

In the learning data set generation apparatus according to configuration $W_{C9}$ described above (see Practical Example EX3_4), the processor may be configured to be capable of performing first operation and second operation such that, in the first operation, the processor performs the object detection processes using all of the plurality of image recognition models and that, in the second operation, the processor performs the object detection processes using selectively part of the plurality of image recognition models. (Hereinafter referred to as configuration $W_{C10}$).

It is thus possible to update the learning data set using only the results of the object detection processes employing part of the image recognition models. Thus, only the necessary parts are operated, and this is expected to reduce the cost involved in arithmetic operations.

According to yet another aspect of the present invention, an image recognition method is one that involves making an inference to recognize a recognition target object in an input image, and the method includes: performing, based on the input image and using a plurality of image recognition models, a plurality of object detection processes to detect as an object detection region a region in the input image where the recognition target object is judged to be present; and generating inference result data indicating the result of the inference based on the results of the plurality of object detection processes. Each of the image recognition models is a model capable of detecting the recognition target object with a particular image size. The plurality of image recognition models are directed to mutually different particular image sizes. (Hereinafter referred to as configuration $W_{C11}$).

What is claimed is:

1. An image recognition apparatus comprising a processor configured to make an inference to recognize a recognition target object in an input image, wherein
the processor is configured to
perform, based on the input image and using a plurality of mutually different image recognition models, a plurality of object detection processes to detect as an object detection region a region in the input image where the recognition target object is judged to be present, and
generate inference result data indicating a result of the inference in accordance with a degree of overlap among a plurality of object detection regions detected in the plurality of object detection processes,
the processor is configured to generate, in each object detection process, object detection data including
class data indicating a kind of an object in the object detection region,
position/shape data of the object detection region, and
a reliability of the result of the object detection process,
each object detection process is a single-class object detection process dealing with a single kind of object as the recognition target object, the recognition target objects of the plurality of object detection processes being of a same kind, and
the processor is configured to
identify a maximum reliability among a plurality of reliabilities derived in the plurality of object detection processes and
set to the inference result data the class data and the position/shape data corresponding to the maximum reliability if the degree of overlap is equal to or higher than a predetermined overlap threshold value.

2. The image recognition apparatus according to claim 1, wherein
the processor is configured to set to the inference result data the class data and the position/shape data of the object detection data corresponding to the maximum reliability
if the degree of overlap is equal to or higher than the overlap threshold value or
if the degree of overlap is lower than the overlap threshold value and in addition the maximum reliability is equal to or higher than a predetermined reference reliability.

3. The image recognition apparatus according to claim 2, wherein
the processor is configured to set particular data as the inference result data if the degree of overlap is lower than the overlap threshold value and in addition the maximum reliability is lower than the reference reliability.

4. The image recognition apparatus according to claim 1, wherein
the plurality of image recognition models employ mutually different algorithms for detecting the recognition target object, or
each image recognition model is constructed as a neural network, the plurality of image recognition models being constructed as neural networks having mutually different configurations, or
the plurality of image recognition models are constructed through machine learning in mutually different environments.

5. A learning data set generation apparatus comprising the image recognition apparatus according to claim 1, wherein
the learning data set generation apparatus is configured to generate a learning data set using a plurality of input images and the inference result data with respect to each input image.

6. An image recognition apparatus comprising a processor configured to make an inference to recognize a recognition target object in an input image, wherein
the processor is configured to
perform, based on the input image and using a plurality of mutually different image recognition models, a plurality of object detection processes to detect as an object detection region a region in the input image where the recognition target object is judged to be present, and
generate inference result data indicating a result of the inference in accordance with a degree of overlap among a plurality of object detection regions detected in the plurality of object detection processes,
the processor is configured to generate, in each object detection process, object detection data including
class data indicating a kind of an object in the object detection region,
position/shape data of the object detection region, and
a reliability of the result of the object detection process,
each object detection process is a multi-class object detection process dealing with a plurality of kinds of object as the recognition target object, and
the processor is configured to
identify a maximum reliability among a plurality of reliabilities derived in the plurality of object detection processes and
set to the inference result data the class data and the position/shape data of the object detection data corresponding to the maximum reliability if the degree of overlap is equal to or higher than a predetermined overlap threshold value in a case where a plurality of regions where through the plurality of object detection processes a same kind of object is judged to be present are the plurality of object detection regions.

7. The image recognition apparatus according to claim 6, wherein
the processor is configured to set to the inference result data the class data and the position/shape data of the object detection data corresponding to the maximum reliability
if the degree of overlap is equal to or higher than the overlap threshold value or
if the degree of overlap is lower than the overlap threshold value and in addition the maximum reliability is equal to or higher than a predetermined reference reliability
in the case where the plurality of regions where through the plurality of object detection processes the same kind of object is judged to be present are the plurality of object detection regions.

8. The image recognition apparatus according to claim 7, wherein
the processor is configured to set particular data as the inference result data if the degree of overlap is lower than the overlap threshold value and in addition the maximum reliability is lower than the reference reliability in the case where the plurality of regions where through the plurality of object detection processes the same kind of object is judged to be present are the plurality of object detection regions.

9. The image recognition apparatus according to claim 6, wherein
the plurality of image recognition models employ mutually different algorithms for detecting the recognition target object, or
each image recognition model is constructed as a neural network, the plurality of image recognition models being constructed as neural networks having mutually different configurations, or
the plurality of image recognition models are constructed through machine learning in mutually different environments.

10. A learning data set generation apparatus comprising the image recognition apparatus according to claim 6, wherein
the learning data set generation apparatus is configured to generate a learning data set using a plurality of input images and the inference result data with respect to each input image.

11. An image recognition method involving making an inference to recognize a recognition target object in an input image, the method comprising:
performing, based on the input image and using a plurality of mutually different image recognition models, a plurality of object detection processes to detect as an object detection region a region in the input image where the recognition target object is judged to be present; and
generating inference result data indicating a result of the inference in accordance with a degree of overlap among a plurality of object detection regions detected in the plurality of object detection processes,
generating, in each object detection process, object detection data including
class data indicating a kind of an object in the object detection region,
position/shape data of the object detection region, and
a reliability of the result of the object detection process,
each object detection process being a single-class object detection process dealing with a single kind of object as the recognition target object, the recognition target objects of the plurality of object detection processes being of a same kind,
identifying a maximum reliability among a plurality of reliabilities derived in the plurality of object detection processes and
setting to the inference result data the class data and the position/shape data of the object detection data corresponding to the maximum reliability if the degree of overlap is equal to or higher than a predetermined overlap threshold value.

12. An image recognition method involving making an inference to recognize a recognition target object in an input image, the method comprising:
performing, based on the input image and using a plurality of mutually different image recognition models, a plurality of object detection processes to detect as an object detection region a region in the input image where the recognition target object is judged to be present; and
generating inference result data indicating a result of the inference in accordance with a degree of overlap among a plurality of object detection regions detected in the plurality of object detection processes,
generating, in each object detection process, object detection data including
class data indicating a kind of an object in the object detection region,
position/shape data of the object detection region, and
a reliability of the result of the object detection process,
each object detection process being a multi-class object detection process dealing with a plurality of kinds of object as the recognition target object, and
identifying a maximum reliability among a plurality of reliabilities derived in the plurality of object detection processes and
setting to the inference result data the class data and the position/shape data of the object detection data corresponding to the maximum reliability if the degree of overlap is equal to or higher than a predetermined overlap threshold value in a case where a plurality of regions where through the plurality of object detection processes a same kind of object is judged to be present are the plurality of object detection regions.

* * * * *